United States Patent
Kondo et al.

(10) Patent No.: US 7,412,075 B2
(45) Date of Patent: Aug. 12, 2008

(54) PICTURE PROCESSING APPARATUS FOR PROCESSING PICTURE DATA IN ACCORDANCE WITH BACKGROUND INFORMATION

(75) Inventors: Tetsujiro Kondo, Tokyo (JP); Junichi Ishibashi, Saitama (JP); Takashi Sawao, Tokyo (JP); Takahiro Nagano, Kanagawa (JP); Naoki Fujiwara, Tokyo (JP); Toru Miyake, Tokyo (JP); Seiji Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 612 days.

(21) Appl. No.: 10/240,377

(22) PCT Filed: Feb. 1, 2002

(86) PCT No.: PCT/JP02/00819

§ 371 (c)(1),
(2), (4) Date: Jun. 27, 2003

(87) PCT Pub. No.: WO02/061685

PCT Pub. Date: Aug. 8, 2002

(65) Prior Publication Data
US 2004/0022448 A1    Feb. 5, 2004

(30) Foreign Application Priority Data
Feb. 1, 2001    (JP) ............................... 2001-258847

(51) Int. Cl.
G06K 9/00 (2006.01)
G06K 9/34 (2006.01)
G06K 9/36 (2006.01)
(52) U.S. Cl. .................... 382/103; 382/173; 382/238
(58) Field of Classification Search .................. 382/173
See application file for complete search history.

(56) References Cited

U.S. PATENT DOCUMENTS 5,034,986 A * 7/1991 Karmann et al. ............ 382/103

(Continued)

FOREIGN PATENT DOCUMENTS

| JP | 5-153493 | 6/1993 |
| JP | 7-336688 | 12/1995 |
| JP | 10-164436 | 6/1998 |
| JP | 2001-250119 | 9/2001 |

OTHER PUBLICATIONS

Ismail Haritaoglu, David Harwood, and Larry Davis, "W4: Real-Time Surveillance of People and Their Activities", IEEE Trans. On Pattern Analysis and Machine Intelligence, vol. 22, No. 9, Aug. 2000, pp. 809-830.*

(Continued)

*Primary Examiner*—Bhavesh Mehta
*Assistant Examiner*—Yuzhen Ge
(74) *Attorney, Agent, or Firm*—Frommer Lawrence & Haug LLP; William S. Frommer; Thomas F. Presson

(57) ABSTRACT

The present invention relates to a picture processing apparatus that allows detection of an area in which a plurality of objects, such as a background picture and a picture of a moving object, is mixed. A background picture generation unit 121 generates a background picture based on picture data. A binary object picture extraction unit 121 detects a correlation value between each pixel in picture data of a frame under consideration and a pixel in the background picture at a position corresponding to the pixel in the picture data of the frame under consideration. A temporal change detection unit 123 detects a mixed area in the frame under consideration, in which a plurality of real-world objects is mixed, based on a temporal change of the correlation value at each pixel position. The present invention can be applied to a picture processing apparatus that takes difference between a signal detected by a sensor and the real world into consideration.

11 Claims, 68 Drawing Sheets

U.S. PATENT DOCUMENTS

| | | | | |
|---|---|---|---|---|
| 5,394,196 | A | * | 2/1995 | Robert .................... 348/699 |
| 5,787,203 | A | * | 7/1998 | Lee et al. ................ 382/232 |
| 5,946,419 | A | * | 8/1999 | Chen et al. .............. 382/243 |
| 6,008,865 | A | * | 12/1999 | Fogel ..................... 348/700 |
| 6,075,875 | A | * | 6/2000 | Gu ......................... 382/107 |
| 6,631,212 | B1 | * | 10/2003 | Luo et al. ............... 382/228 |
| 6,731,799 | B1 | * | 5/2004 | Sun et al. ................ 382/173 |
| 6,954,498 | B1 | * | 10/2005 | Lipton ................ 375/240.08 |
| 6,977,664 | B1 | * | 12/2005 | Jinzenji et al. .......... 345/629 |

OTHER PUBLICATIONS

Ismail Haritaoglu, David Harwood, and Larry Davis, "W4: Real-Time Surveillance of People and Their Activities", IEEE Trans. On Pattern Analysis and Machine Intelligence, vol. 22, No. 9, Aug. 2000, pp. 809-830.*

"Automatic moving object and background separation", A. Neri, S. Colonnese, G. Russo, P. Talone, Signal Processing 66 (1998), pp. 219-232.*

Ismail Haritaoglu, David Harwood, and Larry Davis, "W4: Real-Time Surveillance of People and Their Activities", IEEE Trans. On Pattern Analysis and Machine Intelligence, vol. 22, No. 9, Aug. 2000, pp. 809-830.*

"Automatic moving object and background separation", A. Neri, S. Colonnese, G. Russo, P. Talone, Signal Processing 66 (1998), pp. 219-232.*

* cited by examiner

FIG. 5
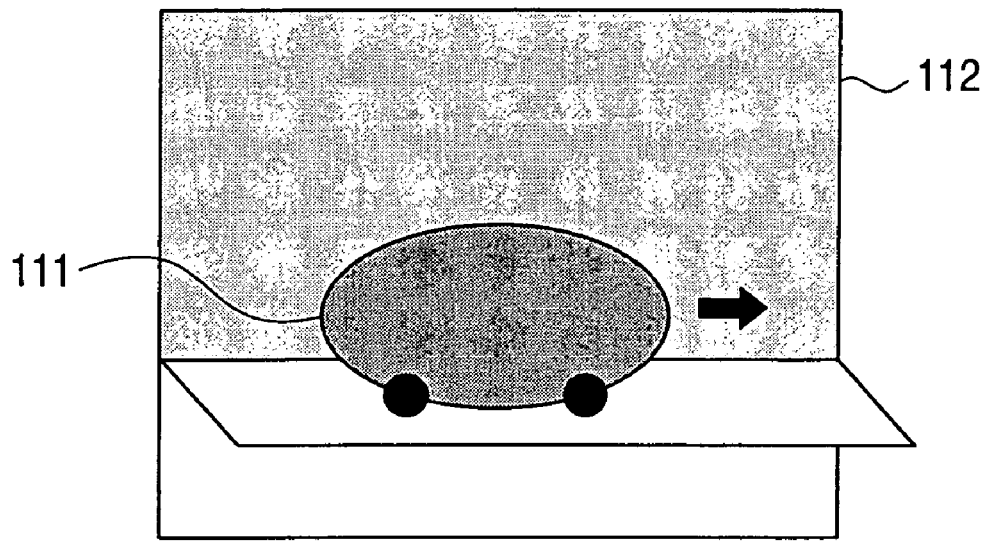
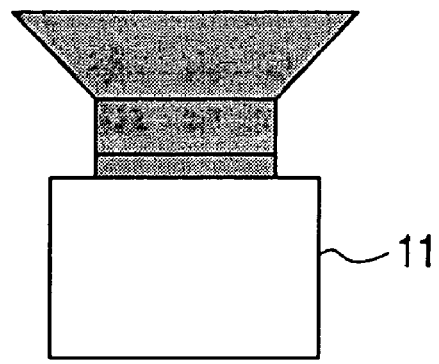

| AREA | | DESCRIPTION |
|---|---|---|
| BACKGROUND AREA | | STILL PORTION |
| FOREGROUND AREA | | MOVING PORTION |
| MIXED AREA | COVERED BACKGROUND AREA | PORTION CHANGING FROM BACKGROUND TO FOREGROUND |
| | UNCOVERED BACKGROUND AREA | PORTION CHANGING FROM FOREGROUND TO BACKGROUND |

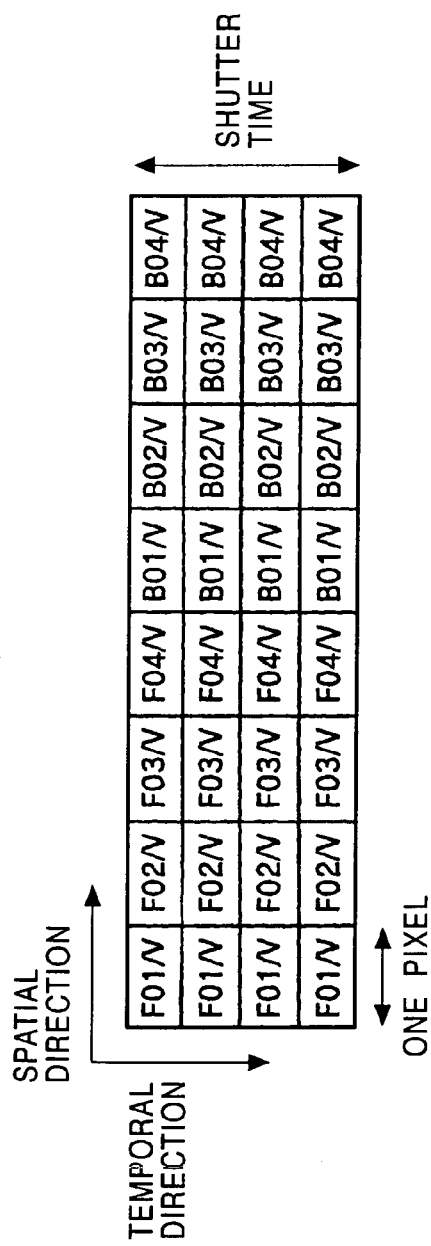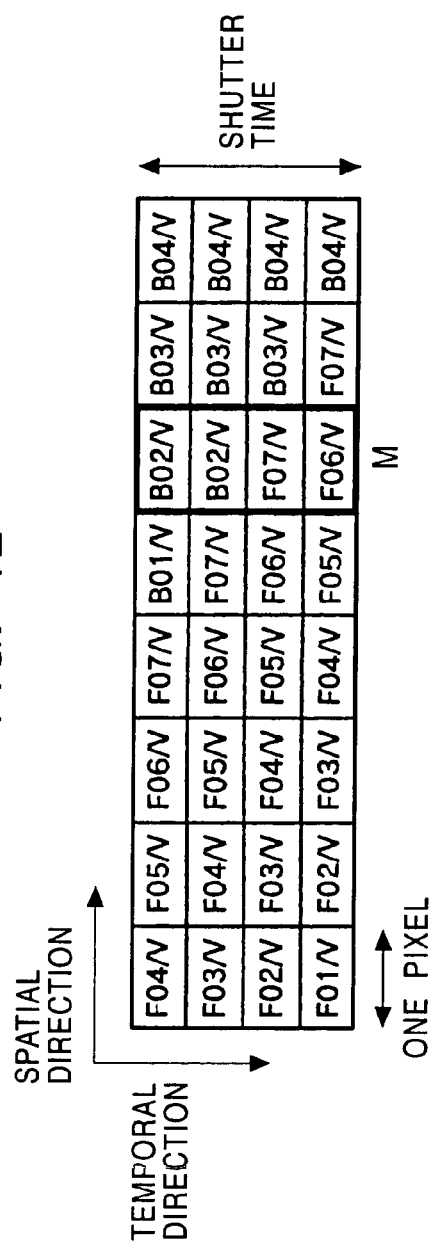

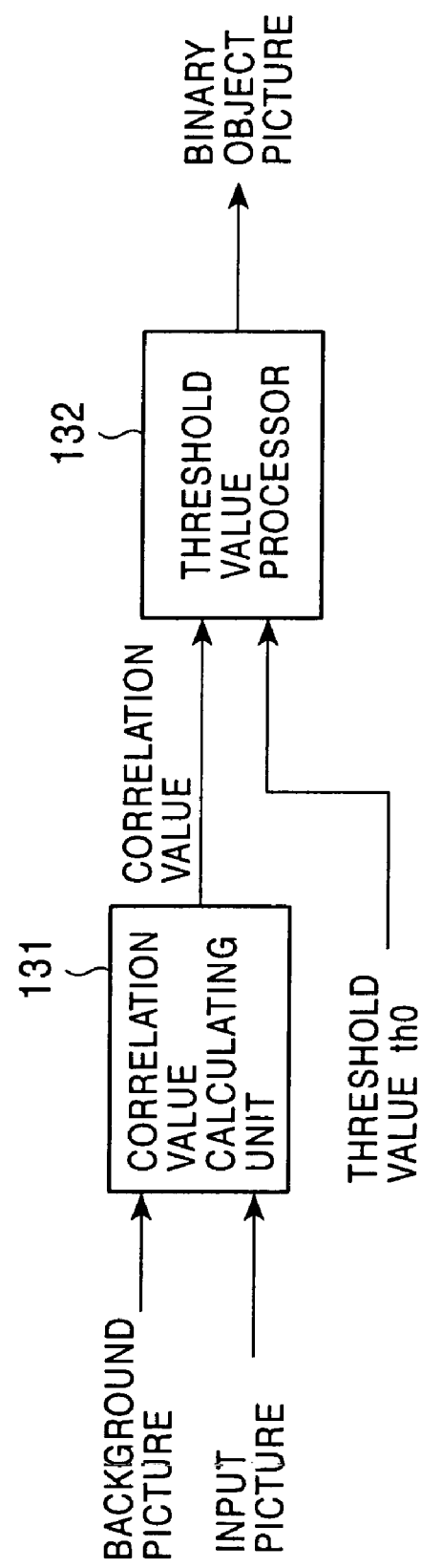

FIG. 26A

| $X_0$ | $X_1$ | $X_2$ |
|---|---|---|
| $X_3$ | $X_4$ | $X_5$ |
| $X_6$ | $X_7$ | $X_8$ |

FIG. 26B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 27A

| $X_0$ | $X_1$ | $X_2$ |
|---|---|---|
| $X_3$ | $X_4$ | $X_5$ |
| $X_6$ | $X_7$ | $X_8$ |

FIG. 27B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 30

| | BACKGROUND AREA | FOREGROUND AREA | COVERED BACKGROUND AREA | UNCOVERED BACKGROUND AREA |
|---|---|---|---|---|
| FRAME #n-1 | — | 1 | 0 | — |
| FRAME #n | 0 | 1 | 1 | 1 |
| FRAME #n+1 | — | 1 | — | 0 |

FIG. 52A
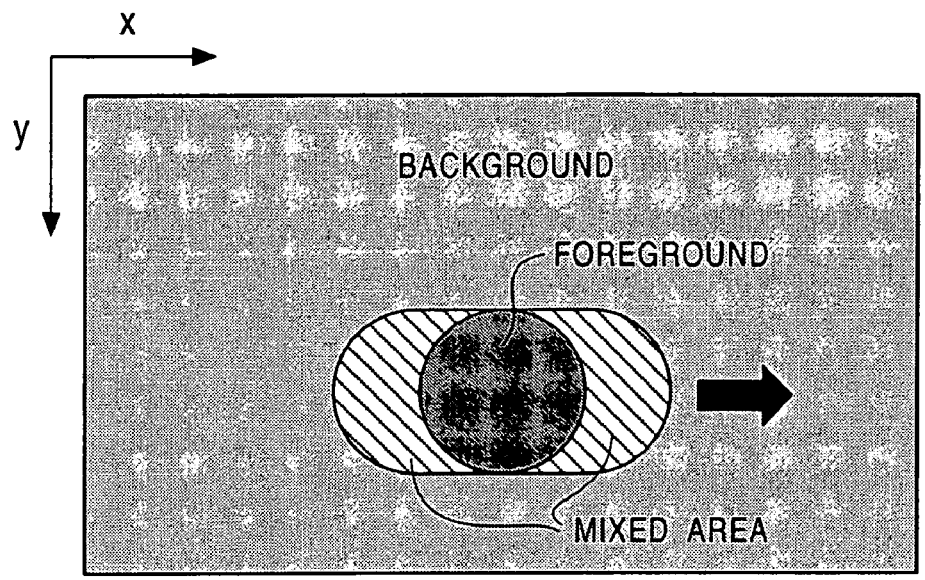
SEPARATE FOREGROUND/ BACKGROUND
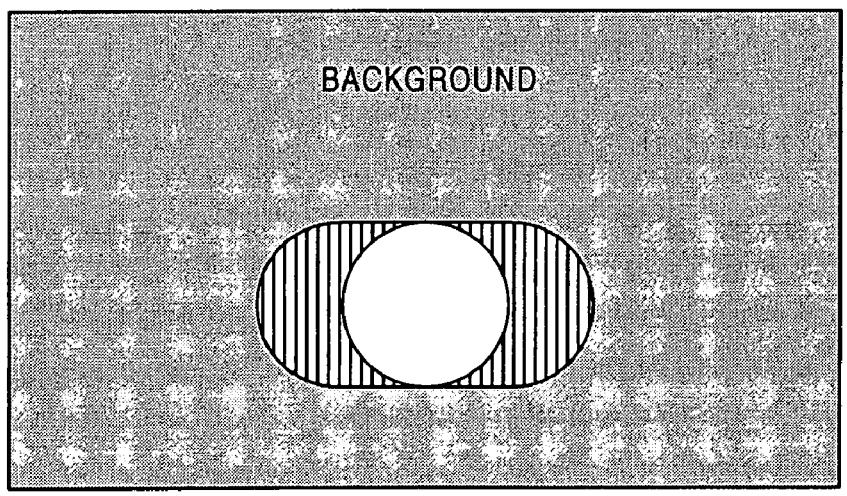
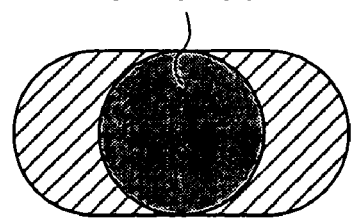

PICTURE PROCESSING APPARATUS FOR PROCESSING PICTURE DATA IN ACCORDANCE WITH BACKGROUND INFORMATION

TECHNICAL FIELD

The present invention relates to picture processing apparatuses, and more particularly to a picture processing apparatus that takes difference between a signal detected by a sensor and the real world into consideration.

BACKGROUND ART

The techniques of detecting events in the real world by sensors and processing sampling data output by the sensors, such as data associated with pictures, speech, temperature, pressure, acceleration, or odor, are widely used.

For example, a picture acquired by imaging an object moving in front of a predetermined still background using a video camera is subject to motion blurring if the velocity of the movement of the object is faster than the shutter speed.

When an object moves in front of a still background, in addition to motion blurring caused by mixing of pictures of the moving object itself, mixing of a background picture and a picture of the moving object also occurs.

Consideration has not hitherto been given to detection of an area in which a background picture and a picture of a moving object are mixed.

DISCLOSURE OF INVENTION

The present invention has been made in view of the above, and an object thereof is to allow detection of an area in which a plurality of objects, such as a background picture and a picture of a moving object, is mixed.

A first picture processing apparatus according to the present invention includes background picture generation means for generating a background picture based on picture data; correlation value detection means for detecting a correlation value between each pixel in picture data of a frame under consideration and a pixel in the background picture at a position corresponding to the pixel in the picture data of the frame under consideration; and mixed area detection means for detecting a mixed area in the frame under consideration, in which a plurality of real-world objects is mixed, based on a temporal change of the correlation value at each pixel position.

The correlation value detection means may detect the correlation value based on pixels surrounding a pixel under consideration in the picture data of the frame under consideration and pixels in the background picture at positions corresponding to the surrounding pixels.

The correlation value detection means may detect, as the correlation value, a differential value between pixels surrounding a pixel under consideration in the picture data of the frame under consideration and pixels in the background picture at positions corresponding to the surrounding pixels.

The picture processing apparatus may further include binarization means for binarizing the correlation value by comparing the correlation value with a threshold value, so that the mixed area detection means detects the mixed area in the frame under consideration based on the binarized correlation value.

The mixed area detection means may further detect a covered background area or an uncovered background area based on a temporal change of the correlation value at each pixel position.

The picture processing apparatus may further include mixing ratio detection means for detecting a mixing ratio by which the plurality of objects is mixed in the detected mixed area.

The picture processing apparatus may further include separation means for separating the objects based on the mixed area and the mixing ratio.

The picture processing apparatus may further include adjustment means for adjusting the amount of motion blurring included in the separated objects.

A first picture processing method according to the present invention includes a background picture generation step for generating a background picture based on picture data; a correlation value detection step for detecting a correlation value between each pixel in picture data of a frame under consideration and a pixel in the background picture at a position corresponding to the pixel in the picture data of the frame under consideration; and a mixed area detection step for detecting a mixed area in the frame under consideration, in which a plurality of real-world objects is mixed, based on a temporal change of the correlation value at each pixel position.

A program in a first recording medium according to the present invention includes a background picture generation step for generating a background picture based on picture data; a correlation value detection step for detecting a correlation value between each pixel in picture data of a frame under consideration and a pixel in the background picture at a position corresponding to the pixel in the picture data of the frame under consideration; and a mixed area detection step for detecting a mixed area in the frame under consideration, in which a plurality of real-world objects is mixed, based on a temporal change of the correlation value at each pixel position.

A second picture processing apparatus according to the present invention includes background picture generation means for generating a background picture based on picture data; correlation value detection means for detecting a correlation value between each pixel in picture data of each frame and a pixel in the background picture at a position corresponding to the pixel in the picture data of the frame; motion compensation means for motion-compensating, based on a motion vector of a frame in the vicinity of a frame under consideration, the correlation value of the frame in the vicinity of the frame under consideration; accumulation means for accumulating the correlation value of the frame under consideration and the correlation value of the frame in the vicinity of the frame under consideration, having been motion-compensated by the motion compensation means; and mixed area detection means for detecting a mixed area in the frame under consideration, in which a plurality of real-world objects is mixed, based on a temporal change of an output of the accumulation means at each pixel position.

The picture processing apparatus may further include motion vector detection means for detecting the motion vector.

The correlation value detection means may detect the correlation value based on pixels surrounding a pixel under consideration in the picture data of the frame under consideration and pixels in the background picture at positions corresponding to the surrounding pixels.

The correlation value detection means may detect, as the correlation value, a differential value between pixels surrounding a pixel under consideration in the picture data of the frame under consideration and pixels in the background picture at positions corresponding to the surrounding pixels.

The picture processing apparatus may further include binarization means for binarizing the correlation value by comparing the correlation value with a threshold value; and weighting means for weighting the binarized correlation value; so that the motion compensation means motion-compensates the binarized correlation value in the frame in the vicinity of the frame under consideration, and the accumulation means accumulates the correlation value of the frame in the vicinity of the frame under consideration, having been motion-compensated and weighted.

The mixed area detection means may further detect a covered background area or an uncovered background area based on a temporal change of the correlation value at each pixel position.

The picture processing apparatus may further include mixing ratio detection means for detecting a mixing ratio by which the plurality of objects is mixed in the detected mixed area.

The picture processing apparatus may further include separation means for separating the objects based on the mixed area and the mixing ratio.

The picture processing apparatus may further include adjustment means for adjusting the amount of motion blurring included in the separated objects.

A second picture processing method according to the present invention includes a background picture generation step for generating a background picture based on picture data; a correlation value detection step for detecting a correlation value between each pixel in picture data of each frame and a pixel in the background picture at a position corresponding to the pixel in the picture data of the frame; a motion compensation step for motion-compensating, based on a motion vector of a frame in the vicinity of a frame under consideration, the correlation value of the frame in the vicinity of the frame under consideration; an accumulation step for accumulating the correlation value of the frame under consideration and the correlation value of the frame in the vicinity of the frame under consideration, having been motion-compensated in the motion compensation step; and a mixed area detection step for detecting a mixed area in the frame under consideration, in which a plurality of real-world objects is mixed, based on a temporal change of an output in the accumulation step at each pixel position.

A program in a second recording medium according to the present invention includes a background picture generation step for generating a background picture based on picture data; a correlation value detection step for detecting a correlation value between each pixel in picture data of each frame and a pixel in the background picture at a position corresponding to the pixel in the picture data of the frame; a motion compensation step for motion-compensating, based on a motion vector of a frame in the vicinity of a frame under consideration, the correlation value of the frame in the vicinity of the frame under consideration; an accumulation step for accumulating the correlation value of the frame under consideration and the correlation value of the frame in the vicinity of the frame under consideration, having been motion-compensated in the motion compensation step; and a mixed area detection step for detecting a mixed area in the frame under consideration, in which a plurality of real-world objects is mixed, based on a temporal change of an output in the accumulation step at each pixel position.

An imaging apparatus according to the present invention includes means for outputting, as picture data made up of a predetermined number of pixel data, a picture of a target captured by an imaging device having the predetermined number of pixels each having a temporal integration effect; background picture generation means for generating a background picture based on the picture data; correlation value detection means for detecting a correlation value between each pixel in picture data of a frame under consideration and a pixel in the background picture at a position corresponding to the pixel in the picture data of the frame under consideration; and mixed area detection means for detecting a mixed area in the frame under consideration, in which a plurality of real-world objects is mixed, based on a temporal change of the correlation value at each pixel position.

The correlation value detection means may detect the correlation value based on pixels surrounding a pixel under consideration in the picture data of the frame under consideration and pixels in the background picture at positions corresponding to the surrounding pixels.

The correlation value detection means may detect, as the correlation value, a differential value between pixels surrounding a pixel under consideration in the picture data of the frame under consideration and pixels in the background picture at positions corresponding to the surrounding pixels.

The imaging apparatus may further include binarization means for binarizing the correlation value by comparing the correlation value with a threshold value, so that the mixed area detection means detects the mixed area in the frame under consideration based on the binarized correlation value.

The mixed area detection means may further detect a covered background area or an uncovered background area based on a temporal change of the correlation value at each pixel position.

The imaging apparatus may further include mixing ratio detection means for detecting a mixing ratio by which the plurality of objects is mixed in the detected mixed area.

The imaging apparatus may further include separation means for separating the objects based on the mixed area and the mixing ratio.

The imaging apparatus may further include adjustment means for adjusting the amount of motion blurring included in the separated objects.

BRIEF DESCRIPTION OF THE DRAWINGS

FIG. 5 shows imaging by a sensor.

FIG. 11 is a model diagram in which pixel values are expanded along the temporal direction and in which a period corresponding to a shutter time is split.

FIG. 12 is a model diagram in which pixel values are expanded along the temporal direction and in which a period corresponding to a shutter time is split.

FIG. 25 is a block diagram showing a construction of a binary object picture extraction unit 122.

FIG. 26A is a diagram showing calculation of a correlation value.

FIG. 26B is a diagram showing calculation of a correlation value.

FIG. 27A is a diagram showing calculation of a correlation value.

FIG. 27B is a diagram showing calculation of a correlation value.

FIG. 30 is a diagram showing a decision by an area decision unit 142.

FIG. 52A is a diagram showing an input picture, a foreground component picture, and a background component picture.

BEST MODE FOR CARRYING OUT THE INVENTION

Figure 1:
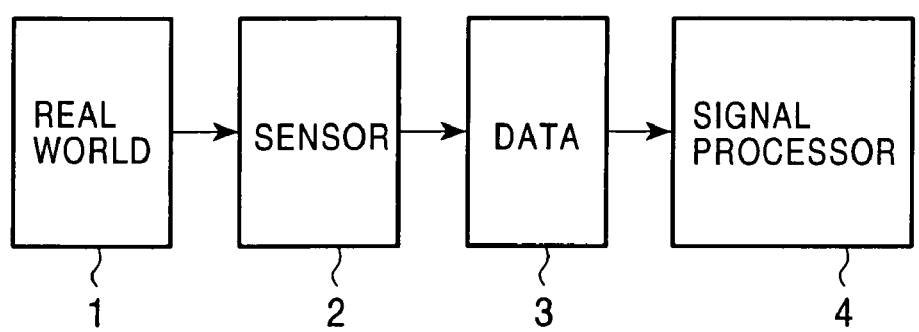
FIG. 1 is a diagram showing the principle of the present invention.

FIG. 1 shows the principle of the present invention. As shown in the figure, a first signal, which serves as information of a real world 1 having a spatial axis and a temporal axis, is acquired by a sensor 2, and is formed into data. A detection signal, or data 3 acquired by the sensor 2, is information obtained by projecting the information of the real world 1 onto a time-space of a lower dimension than the real world 1. Therefore, the information obtained by the projection includes a distortion ascribable to the projection. That is, the data 3 output by the sensor 2 is distorted relative to the information of the real world 1. Although the data 3 includes a distortion as a result of the projection, it also includes significant information for correcting the distortion.

Thus, according to the present invention, the data output by the sensor 2 is processed by a signal processor 4, whereby the distortion is removed, reduced, or adjusted. Alternatively, according to the present invention, the data output by the sensor 2 is processed by the signal processor 4 to extract significant information.

Figure 2:
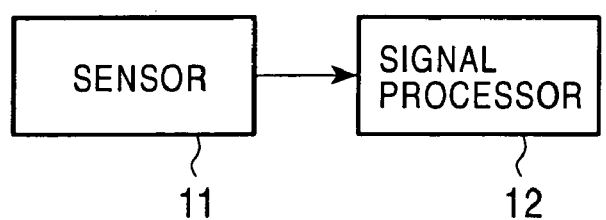
FIG. 2 is a block diagram showing an example construction of a system according to the present invention.

FIG. 2 shows an example structure of a signal processing apparatus according to the present invention. A sensor 11 is implemented, for example, by a video camera, and it captures a picture of the real world and outputs acquired picture data to the signal processor 12. The signal processor 12 is implemented, for example, by a personal computer, etc., and it processes the data input from the sensor 11, adjusting the amount of distortion caused by projection, specifying an area that includes significant information buried by the projection. Furthermore, it also extracts the significant information from the specified area, and processes the input data based on the extracted significant information.

The significant information is herein, for example, mixing ratio, which will be described later.

Also, information indicating an area that includes significant information buried by projection may also be deemed as significant information. Here, area information, which will be described later, corresponds to the significant information.

The area that includes significant information is herein, for example, a mixed area, which will be described later.

Figure 3:
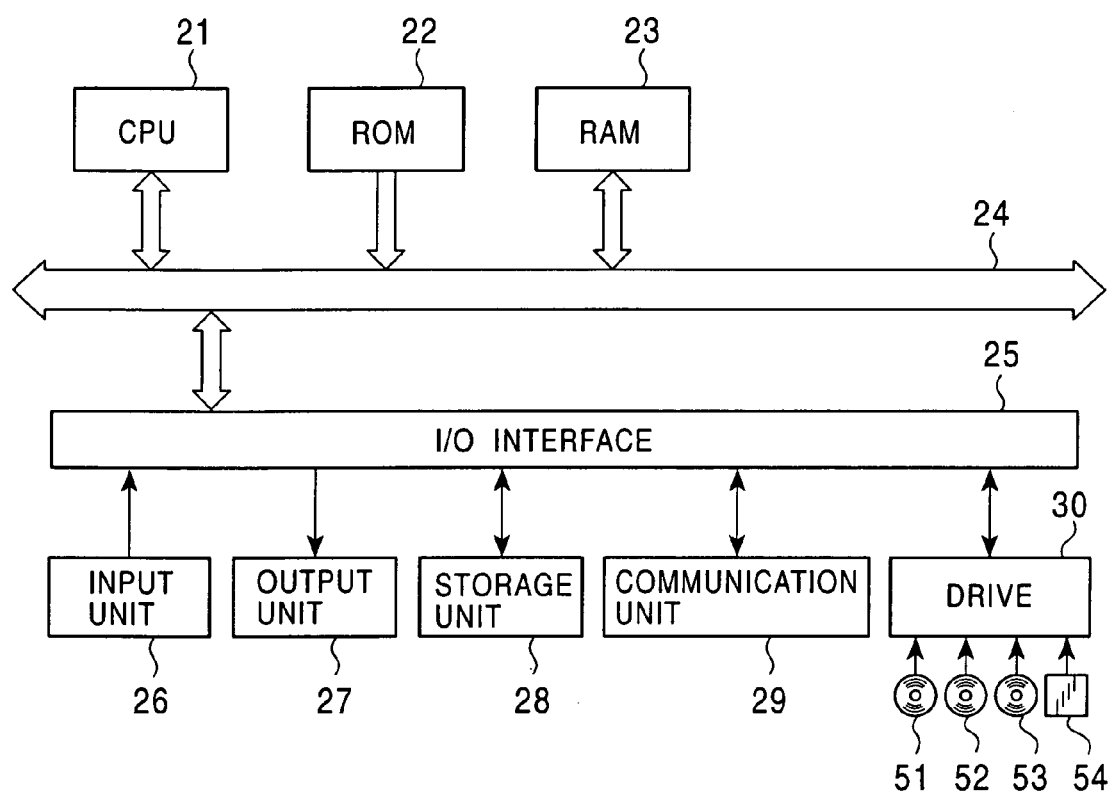
FIG. 3 is a block diagram showing an example construction of a signal processor in FIG. 2.

The signal processor 12 is configured, for example, as shown in FIG. 3. A CPU (Central Processing Unit) 21 executes various processes according to programs stored in a ROM (Read Only Memory) 22 or in a storage unit 28. In a RAM (Random Access Memory) 23, programs to be executed by the CPU 21, data, etc. are stored as required. The CPU 21, the ROM 22, and the RAM 23 are connected to each other via a bus 24.

Furthermore, to the CPU 21, an input/output interface 25 is connected via the bus 24. To the input/output interface 25, an input unit 26 including a keyboard, a mouse, a microphone, etc., and an output unit 27 including a display, a speaker, etc. are connected. The CPU 21 executes various processes in response to commands input from the input unit 26. The CPU 21 then outputs a picture, speech, etc. obtained by the processes to the output unit 27.

The storage unit 28, connected to the input/output interface 25, is implemented, for example, by a hard disc, and it stores program to be executed by the CPU 21 and various data. A communication unit 29 communicates with external apparatuses via the Internet or other networks. In this example, the communication unit 29 functions as an acquisition unit for acquiring an output of the sensor 11.

Furthermore, programs may also be acquired via the communication unit 29 and stored in the storage unit 28.

A driver 30, connected to the input/output interface 25, drives a magnetic disc 51, an optical disc 52, a magneto-optical disc 53, a semiconductor memory 54, etc. when they are loaded, acquiring programs, data, etc. recorded therein. The programs and the data thus acquired are, as required, transferred to the storage unit 28 and stored therein.

Now, a more specific example of a signal processing apparatus for identifying an area in which significant information is buried and extracting the buried significant information from data acquired from a sensor will now described. In the following example, a CCD line sensor or a CCD area sensor corresponds to the sensor, area information or mixing ratio corresponds to the significant information, and a mixing of foreground and background or motion blurring corresponds to distortion.

Figure 4:
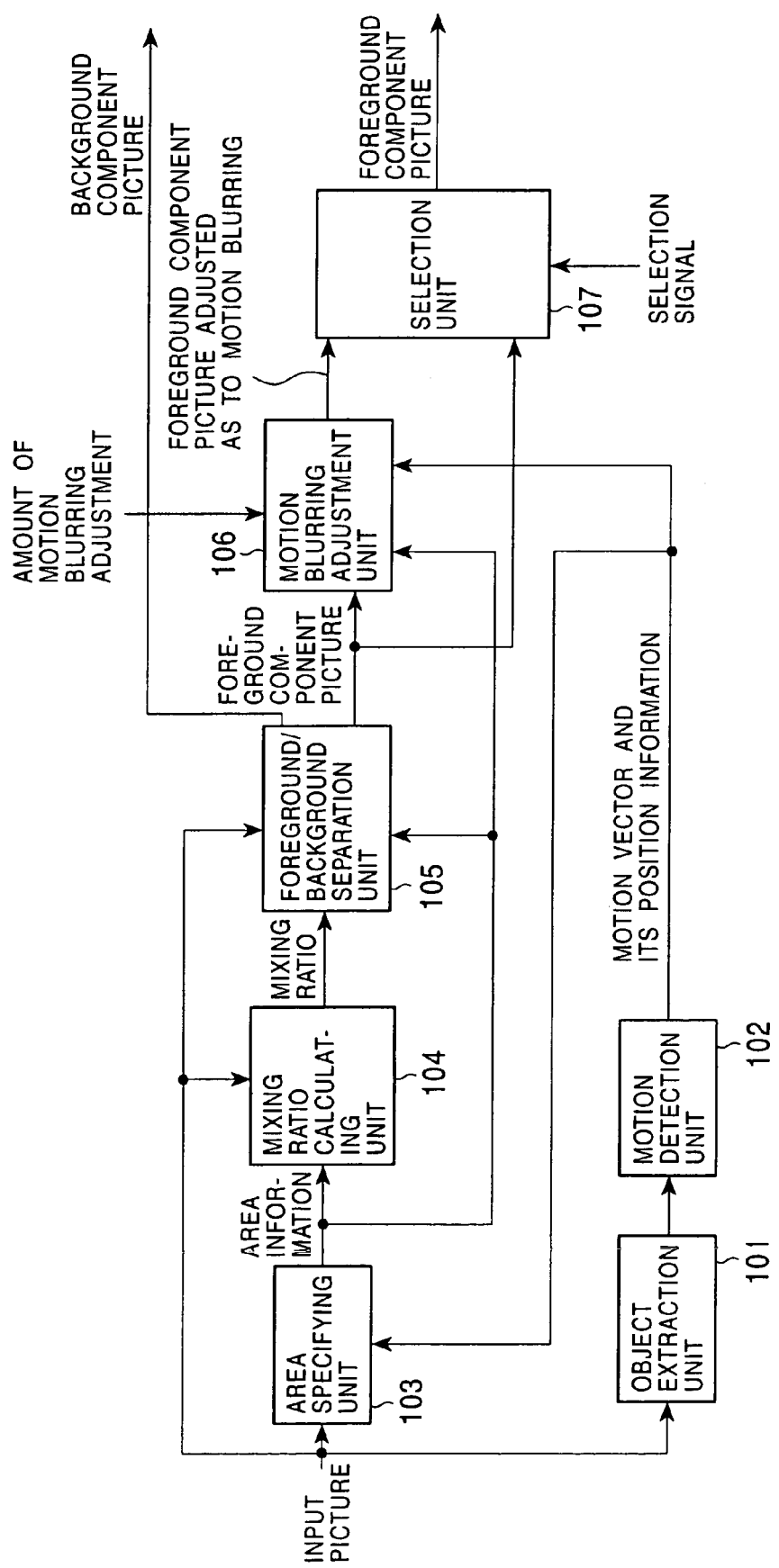
FIG. 4 is a block diagram showing a signal processor 12.

FIG. 4 is a block diagram showing the signal processor 12.

The functions of the signal processor 12 may be implemented either in hardware or in software. That is, block diagrams in this specification may be deemed as either block diagrams of hardware or functional block diagrams of software.

Motion blurring herein refers to distortion included in a picture corresponding to a moving object in the real world under imaging, caused by movement of the object and imaging characteristics of the sensor 11.

In this specification, a picture corresponding to an object in the real world under imaging will be referred to as a picture object.

An input picture supplied to the signal processor 12 is supplied to an object extraction unit 101, an area specifying unit 103, a mixing ratio calculating unit 104, and to a foreground/background separation unit 105.

The object extraction unit 101 roughly extracts a picture object corresponding to a foreground object included in the input picture, and supplies the extracted picture object to a motion detection unit 102. The object extraction unit 101 roughly extracts the picture object corresponding to the foreground object included in the input picture by, for example, detecting a contour of the picture object corresponding to the foreground object.

The object extraction unit 101 roughly extracts a picture object corresponding to a background object included in the input picture, and supplies the extracted picture object to the motion detection unit 102. The object extraction unit 101 roughly extracts the picture object corresponding to the background object based on, for example, the difference between the input picture and the extracted picture object corresponding to the foreground object.

Alternatively, the object extraction unit 101 may roughly extract a picture object corresponding to the foreground object and a picture object corresponding to the background object based on, for example, the difference between a background picture stored in an internal background memory and the input picture.

The motion detection unit 102 calculates a motion vector of the roughly extracted picture object corresponding to the foreground object by, for example, a technique such as block matching method, gradient method, phase correlation method, and Pel-Recursive method, and supplies the motion vector thus calculated and position information of the motion vector (information specifying the positions of pixels corresponding to the motion vector) to the area specifying unit 103 and the motion blurring extraction unit 106.

The motion vector output by the motion detection unit 102 includes information corresponding to an amount of movement v.

Furthermore, in addition to the pixel position information specifying the pixels in picture objects, the motion detection unit 102 may also output, for example, a motion vector for each object to the motion blurring adjustment unit 106.

The amount of movement v is a value representing a change in the position of a picture corresponding to a moving object by the unit of a pixel pitch. For example, if a picture of an object corresponding to a foreground has been moved so as to be displayed at a position with a distance of four pixels in a frame with respect to an immediately preceding frame, the amount of movement v of the object corresponding to the foreground is four.

The object extraction unit 101 and the motion detection unit 102 are needed when the amount of motion blurring associated with a moving object is adjusted.

The area specifying unit 103 specifies each pixel in the input picture as being in one of a foreground area, a background area, and a mixed area, and supplies information indicating to which of the foreground area, the background area, and the mixed area each pixel belongs (hereinafter referred to as area information) to the mixing ratio calculating unit 104, the foreground/background separation unit 105, and to the motion blurring adjustment unit 106.

The mixing ratio calculating unit 104 calculates a mixing ratio for pixels included in the mixed area 63 (hereinafter referred to as mixing ratio $\alpha$) based on the input picture and the area information supplied from the area specifying unit 103, and supplies the mixing ratio thus calculated to the foreground/background separation unit 105.

The mixing ratio $\alpha$ is a value representing the proportion of picture components corresponding to the background object (hereinafter also referred to as background components) in the pixel values, as indicated in equation (3) to be described later.

The foreground/background separation unit 105 separates the input picture into a foreground component picture made up only of picture components associated with the foreground object (hereinafter also referred to as foreground components), and a background component picture made up only of background components, based on the area information supplied from the area specifying unit 103 and the mixing ratio $\alpha$ supplied from the mixing ratio calculating unit 104, and it supplies the foreground component picture to the motion blurring adjustment unit 106 and to a selection unit 107. Alternatively, the separated foreground component picture may serve as final output. Compared with the conventional method in which foreground and background are separated simply at certain pixel positions in a mixed area, foreground and background can be determined more accurately.

The motion blurring adjustment unit 106 determines a processing unit indicating one or more pixels included in the foreground component picture, based on the amount of movement v, found from the motion vector, and the area information. The processing unit is data specifying a set of pixels to be processed for adjustment of the amount of motion blurring.

The motion blurring adjustment unit 106 adjusts the amount of motion blurring included in the foreground component picture, for example, removes motion blurring included in the foreground component picture, reduces the amount of motion blurring, or increases the amount of motion blurring, based on an amount of motion blurring adjustment input to the signal processor 12, the foreground component picture supplied from the foreground/background separation unit 105, the motion vector and its position information supplied from the motion detection unit 102, and the processing unit, thereby outputting a foreground component picture in which the amount of motion blurring is adjusted to the selection unit 107. The motion vector and its position information are not necessarily used.

The selection unit 107 selects one of the foreground component picture supplied from the foreground/background separation unit 105 and the foreground component picture supplied from the motion blurring adjustment unit 106, adjusted as to the amount of motion blurring, based on a selection signal according to a user's selection, outputting the selected foreground component picture.

Now, with reference to FIGS. 5 to 20, an input picture supplied to the signal processor 12 will be described.

FIG. 5 is a diagram showing imaging by a sensor. The sensor 11 is implemented, for example, by a CCD (Charge-Coupled device) video camera incorporating a CCD area sensor, which is a solid state imaging device. A real-world object 111 corresponding to a foreground is moved between a real-world object 112 corresponding to a background and the sensor 11, for example, horizontally from left to right as viewed in the figure.

The sensor 11 images the object 111 corresponding to the foreground together with the object 112 corresponding to the background. The sensor 11 outputs the captured picture on a frame basis. For example, the sensor 11 outputs a picture consisting of 30 frames per second. The exposure time of the sensor 11 is set to 1/30 second. The exposure time is a period between when the sensor 11 starts converting input light into electric charges and when the conversion of the input light into electric charges is finished. The exposure time will hereinafter also be referred to as shutter time.

Figure 6:
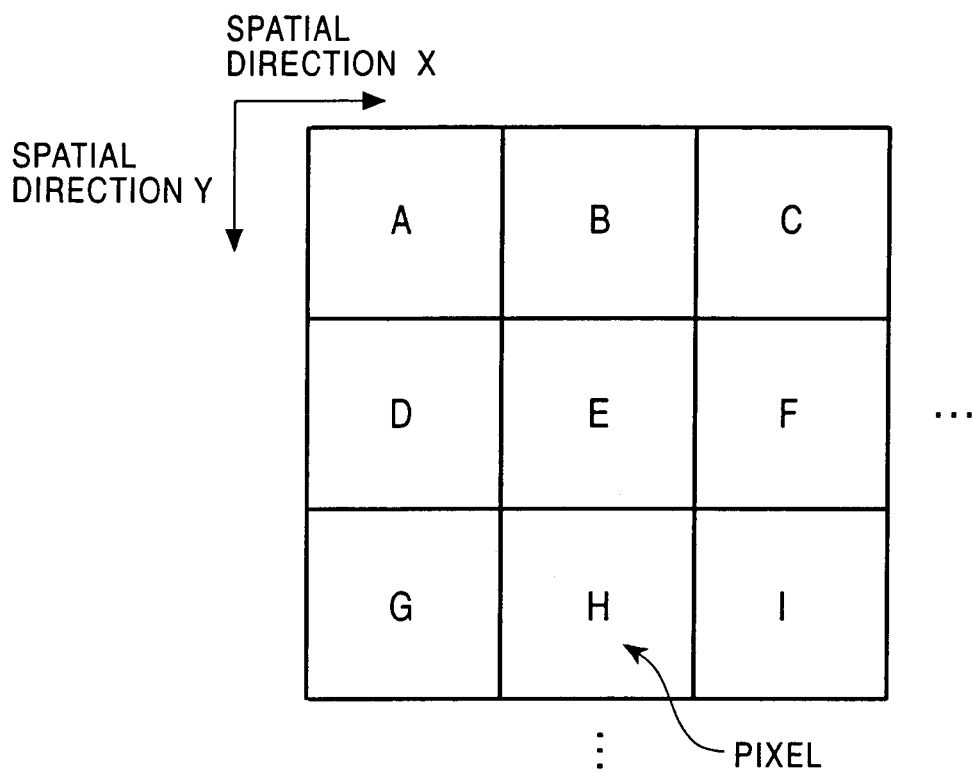
FIG. 6 is a diagram showing an arrangement of pixels.

FIG. 6 is a diagram showing an arrangement of pixels. In FIG. 6, A to I denote individual pixels. The pixels are arranged on a plane corresponding to a picture. One detection element associated with one pixel is arranged on the sensor 11. When the sensor 11 captures a picture, one detection element outputs a pixel value associated with one pixel constituting the picture. For example, the position of a detection element along the X direction corresponds to a position on the picture in the horizontal direction, and the position of a detection element along the Y direction corresponds to a position on the picture in the vertical direction.

Figure 7:
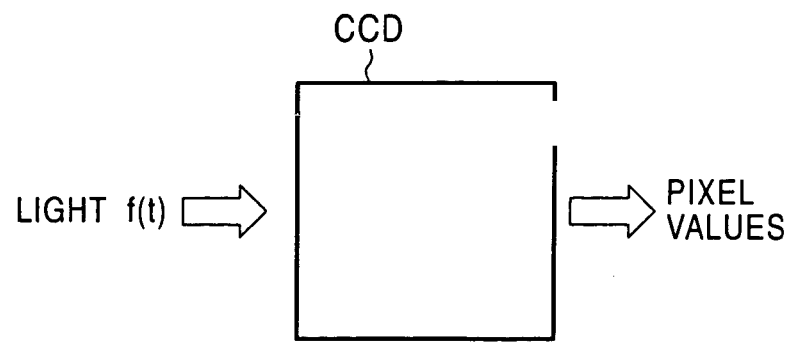
FIG. 7 is a diagram showing the operation of a detection device.

For example, as shown in FIG. 7, a CCD detection device converts input light into electric charges and accumulates the converted electric charges during a period corresponding to a shutter time. The amount of the electric charges is substantially proportional to the intensity of the input light and the duration of the input of light. The detection device adds electric charges converted from input light to electric charges having been accumulated, during the period corresponding to the shutter time. That is, the detection device integrates input light during the period corresponding to the shutter time, accumulating an amount of electric charges corresponding to the integrated light. In other words, the detection device has an integrating effect with respect to time.

The charges accumulated in the detection device are converted into voltage values by a circuit not shown, and the voltage values are in turn converted into pixel values such as digital data for output. Thus, each individual pixel value output by the sensor 11 is a value of a spatially extended portion of an object corresponding to a foreground or a background as projected onto a one-dimensional space, obtained by integrating with respect to the shutter time.

By the accumulating operation of the sensor 11 as such, the signal processor 12 extracts significant information buried in the output signal, for example, the mixing ratio α. The signal processor 12 adjusts the amount of distortion, such as the amount of motion blurring, caused by a mixing of foreground picture objects with each other. The signal processor 12 also adjusts the amount of distortion caused by a mixing of a foreground picture object with a background picture object.

Figure 8A:
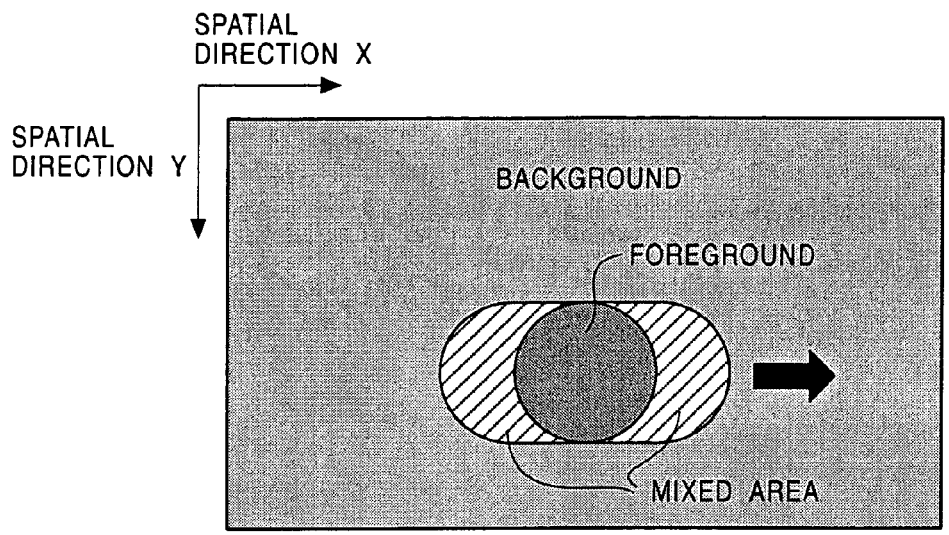
FIG. 8A shows a picture acquired by imaging an object corresponding to a moving foreground and an object corresponding to a still background.

FIG. 8A shows a picture obtained by imaging an object corresponding to a moving object corresponding to a foreground and a still object corresponding to a background. In an example shown in FIG. 8A, the object corresponding to the foreground is moving horizontally from left to right with respect to the screen.

Figure 8B:
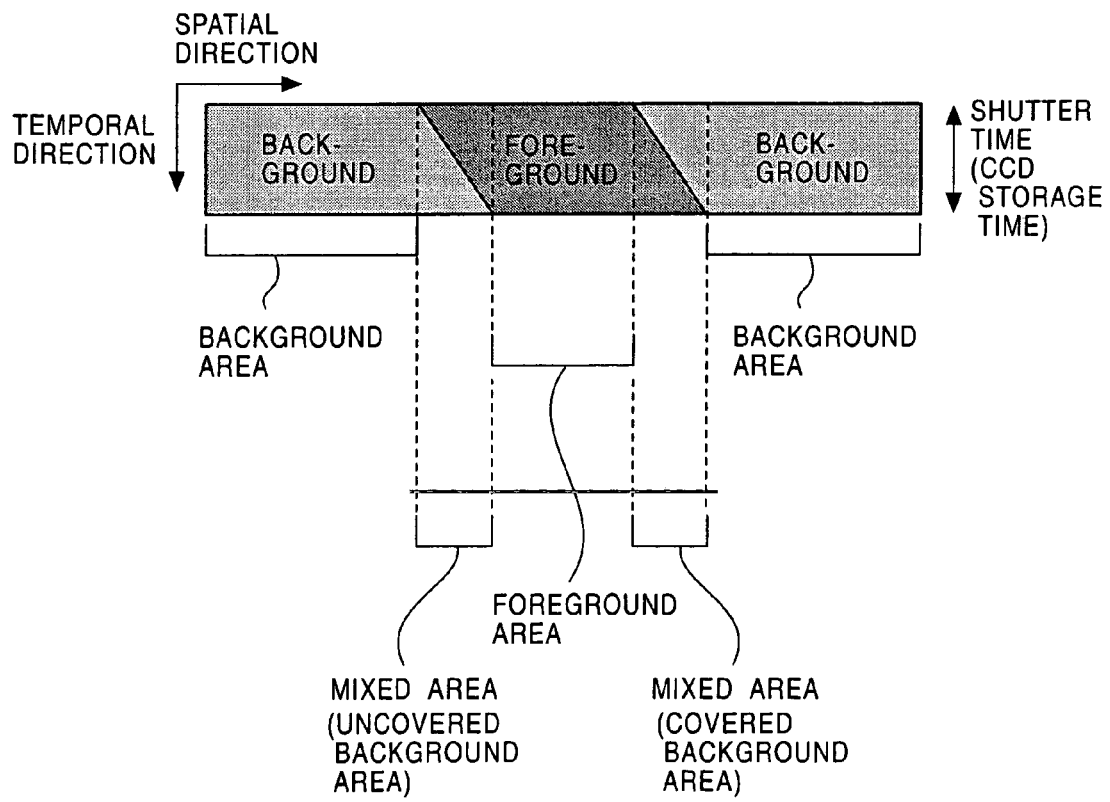
FIG. 8B is a diagram showing a model associated with the picture acquired by imaging an object corresponding to a moving foreground and an object corresponding to a still background.

FIG. 8B is a model diagram in which the pixel values corresponding to a line of the picture shown in FIG. 8A are expanded along the temporal direction. The horizontal direction in FIG. 8B corresponds to the spatial direction X in FIG. 8A.

The pixel values of the pixels in the background area made up only of background components, that is, components of a picture corresponding to a background object. The pixel values of the pixels in the foreground area made up only of foreground components, that is, components of a picture corresponding to a foreground.

The pixel values of the pixels in the mixed area are constituted of background and foreground components. Since the pixel values of the pixels in the mixed area are constituted of background and foreground components, the mixed area can be said to be a distorted area. Furthermore, the mixed area is classified into a covered background area and an uncovered background area.

The covered background area is a mixed area at a position associated with, in relation to the foreground area, the leading edge portion of the foreground object in the direction of progression thereof, in which the background components are covered by the foreground as the time passes.

On the other hand, the uncovered background area is a mixed area associated with, in relation to the foreground area, the trailing edge portion of the foreground object in the direction of progression thereof, in which the background components appear as the time passes.

The picture constituted of the foreground area, the background area, or the covered background area or the uncovered background area as above is input to the area specifying unit 103, the mixing ratio calculating unit 104, and to the foreground/background separation unit 105 as an input picture.

Figures 9, 10:
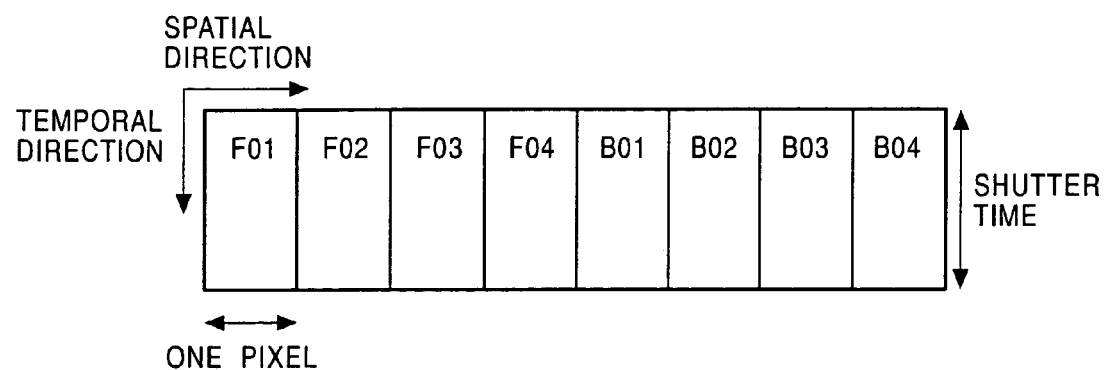
FIG. 9 is a diagram showing a background area, a foreground area, a mixed area, a covered background area, and an uncovered background area.
FIG. 10 is a model diagram in which the pixel values of pixels contiguously arranged in a line in a picture acquired by imaging an object corresponding to a still foreground and an object corresponding to a still are expanded along the temporal direction.

FIG. 9 is a diagram for explaining the background area, the foreground area, the mixed area, the covered background area, and the uncovered background area described above. In relation to the picture shown in FIG. 8B, the background area is a still portion, the foreground area is a moving portion, the covered background area in the mixed area is a portion changing from background to foreground, and the uncovered background area in the mixed area is a portion changing from foreground to background.

FIG. 10 is a model diagram in which the pixel values of pixels contiguously arranged in a line in a picture acquired by imaging a still object corresponding to a foreground and a still object corresponding to a background are expanded along the temporal direction. For example, pixels arranged in a line of the screen can be selected as the pixels contiguously arranged in a line.

The pixel values of F01 to F04 shown in FIG. 10 are those of pixels associated with the still foreground object. The pixel values of B01 to B04 shown in FIG. 10 are those of pixels associated with the still background object.

With respect to the vertical direction in FIG. 10, the time passes from top to bottom as viewed in the figure. The position of an upper side of a rectangle in FIG. 10 corresponds to a time when the sensor 11 starts converting input light into the electric charges, and the position of a lower side of the rectangle in FIG. 10 corresponds to a time when the sensor 11 finishes the conversion of input light into electric charges. That is, the distance from the upper side to the lower side of the rectangle in FIG. 10 corresponds to a shutter time.

The horizontal direction in FIG. 10 corresponds to the spatial direction X shown in FIG. 8A. More specifically, in the example shown in FIG. 10, the distance from the left side of a rectangle denoted as "F01" to the right side of a rectangle denoted as "B04" in FIG. 10 is eight times the pixel pitch, that is, it corresponds to a span of eight contiguous pixels.

When the foreground object and the background object are still, the light input to the sensor 11 does not change during a period corresponding to a shutter time.

The period corresponding to the shutter time is now split into two or more periods of the same duration. For example, assuming a virtual split number of four, the diagram shown in FIG. 10 can be expressed as a model diagram FIG. 11. The virtual split number is set, for example, in accordance with the amount of movement v of the object corresponding to the foreground. For example, if the amount of movement v is four, in accordance therewith, the virtual split number is set to four, so that the period corresponding to the shutter time is split into four.

The uppermost row in the figure corresponds to the first split period upon an opening the shutter. The second row from the top as viewed in the figure corresponds to the second split period upon the opening of the shutter. The third row from the top as viewed the figure corresponds to the third split period upon the opening of the shutter. The fourth row from the top as viewed in the figure corresponds to the fourth split period upon the opening of the shutter.

The shutter time split in accordance with the amount of movement v will hereinafter be also referred to as shutter time/v.

When the object corresponding to the foreground is still, the light input to the sensor 11 does not change, and thus a foreground component F01/v is equal to the pixel value F01 divided by the virtual split number. Similarly, when the object corresponding to the foreground is still, a foreground component F02/v is equal to the pixel value F02 divided by the virtual split number, a foreground component F03/v is equal to the pixel value F03 divided by the virtual split number, and a foreground component F04/v is equal to the pixel value F04 divided by the virtual split number.

When the object corresponding to the background is still, the light input to the sensor 11 does not change, and thus a background component B01/v is equal to the pixel value B01 divided by the virtual split number. Similarly, when the object corresponding to the background is still, a background component B02/v is equal to the pixel value B02 divided by the virtual split number, B03/v is equal to the pixel value B03 divided by the virtual split number, and B04/v is equal to the pixel value B04 divided by the virtual split number.

That is, when the object corresponding to the foreground is still, the light input to the sensor 11 in association with the foreground object does not change during the period corresponding to the shutter time. Thus, a foreground component F01/v associated with the first shutter time/v upon the opening of the shutter, a foreground component F01/v associated with the second shutter time/v upon the opening of the shutter, a foreground component F01/v associated with the third shutter time/v upon the opening of the shutter, and a foreground component F01/v associated with the fourth shutter time/v upon the opening of the shutter have the same value. Similar relationships are true of F02/v to F04/v.

When the object corresponding to the background is still, the light input to the sensor 11 in association with the background object does not change during the period corresponding to the shutter time. Thus, a background component B01/v associated with the first shutter time/v upon the opening of the shutter, a background component B01/v associated with the second shutter time/v upon the opening of the shutter, a background component B01/v associated with the third shutter time/v upon the opening of the shutter, and a background component B01/v associated with the fourth shutter time/v upon the opening of the shutter have the same value. Similar relationships are true of B02/v to B04/v.

Next, a case where the object corresponding to the foreground is moving and the object corresponding to the background is still.

FIG. 12 is a model diagram of a case where an object corresponding to a foreground moves towards the right as viewed in the figure, in which the pixel values of pixels on a line including a covered background area are expanded along the temporal direction. In FIG. 12, the amount of movement v of foreground is four. Since a single frame is a short period of time, the object corresponding to the foreground can be assumed as a rigid body moving at a constant velocity. In FIG. 12, a picture of the object corresponding to the foreground is moved so as to be displayed four pixels rightward in a frame with respect to an immediately preceding frame.

In FIG. 12, the leftmost pixel to the fourth pixel from the left belong to a foreground area. In FIG. 12, the fifth to the seventh pixels from the left in FIG. 12 belong to a mixed area that constitutes a covered background area. In FIG. 12, the rightmost pixel belongs to a background area.

The object corresponding to the foreground moves so as to cover the object corresponding to the background as the time passes. Thus, the components included in the pixel values of the pixels belonging to the covered background area are switched from background components to foreground components at a certain point of time in the period corresponding to the shutter time.

For example, a pixel value M, shown in a thick-line frame in FIG. 12, is expressed by equation (1):

$$M = B02/v + B02/v + F07/v + F06/v \qquad (1)$$

For example, the fifth pixel from the left includes a background component corresponding to one shutter time/v and foreground components corresponding to three shutter time/v, and thus the mixing ratio α for the fifth pixel from the left is ¼. The sixth pixel from the left includes background components corresponding to two shutter time/v and foreground components corresponding to two shutter time/v, and thus the mixing ratio α for the sixth pixel from the left is ½. The seventh pixel from the left includes background components corresponding to three shutter time/v and a foreground component corresponding to one shutter time/v, and thus the mixing ratio α for the seventh pixel from the left is ¾.

Since the object corresponding to the foreground can be assumed as a rigid body moving at such a constant velocity that the foreground picture will be displayed four pixels rightwards in the next frame, for example, a foreground component F07/v of the fourth pixel from the left in FIG. 12 in the first shutter time/v upon the opening of the shutter is equal to a foreground component of the fifth pixel from the left in FIG. 12 associated with the second shutter time/v upon the opening of the shutter. Similarly, the foreground component F07/v is equal to a foreground component of the sixth pixel from the left in FIG. 12 associated with the third shutter time/v upon the opening of the shutter and to a foreground component of the seventh pixel from the left in FIG. 12 associated with the fourth shutter time/v upon the opening of the shutter.

Since the object corresponding to the foreground can be assumed as a rigid body moving at such a constant velocity that the foreground picture will be displayed four pixels rightwards in the next frame, for example, a foreground component F06/v of the third pixel from the left in FIG. 12 in the first shutter time/v upon the opening of the shutter is equal to a foreground component of the fourth pixel from the left in FIG. 12 associated with the second shutter time/v upon the opening of the shutter. Similarly, the foreground component F06/v is equal to a foreground component of the fifth pixel from the left in FIG. 12 associated with the third shutter time/v upon the opening of the shutter and to a foreground component of the sixth pixel from the left in FIG. 12 associated with the fourth shutter time/v upon the opening of the shutter.

Since the object corresponding to the foreground can be assumed as a rigid body moving at such a constant velocity that the foreground picture will be displayed four pixels rightwards in the next frame, for example, a foreground component F05/v of the second pixel from the left in FIG. 12 in the first shutter time/v upon the opening of the shutter is equal to a foreground component of the third pixel from the left in FIG. 12 associated with the second shutter time/v upon the opening of the shutter. Similarly, the foreground component F05/v is equal to a foreground component of the fourth pixel from the left in FIG. 12 associated with the third shutter time/v upon the opening of the shutter and to a foreground component of the fifth pixel from the left in FIG. 12 associated with the fourth shutter time/v upon the opening of the shutter.

Since the object corresponding to the foreground can be assumed as a rigid body moving at such a constant velocity that the foreground picture will be displayed four pixels rightwards in the next frame, for example, a foreground component F04/v of the leftmost pixel in FIG. 12 in the first shutter time/v upon an opening of the shutter is equal to a foreground component of the second pixel from the left in FIG. 12 associated with the second shutter time/v upon the opening of the shutter. Similarly, the foreground component F04/v is equal to a foreground component of the third pixel from the left in FIG. 12 associated with the third shutter time/v upon the opening of the shutter and to a foreground component of the fourth pixel from the left in FIG. 12 associated with the fourth shutter time/v upon the opening of the shutter.

The foreground area corresponding to the moving object, since it includes motion blurring as described above, can be said to be a distorted area.

Figure 13:
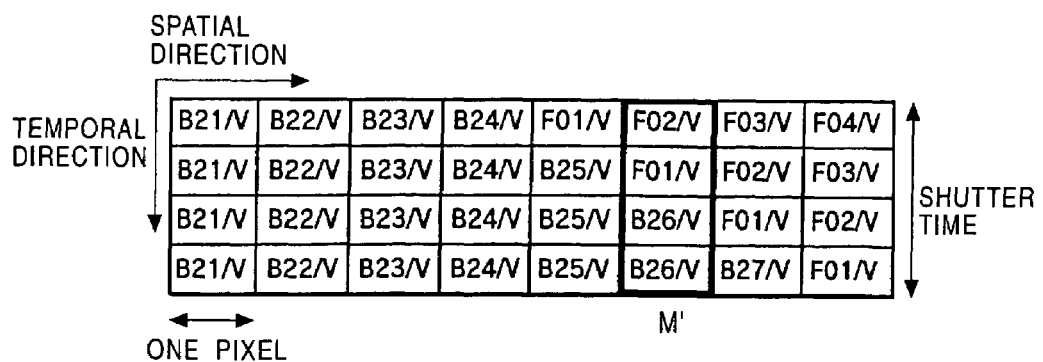
FIG. 13 is a model diagram in which pixel values are expanded along the temporal direction and in which a period corresponding to a shutter time is split.

FIG. 13 is a model diagram of a case where foreground moves towards the right as viewed in the figure, in which the pixel values of pixels on a line including an uncovered background area are expanded along the temporal direction. In FIG. 13, the amount of movement v of foreground is four. Since a single frame is a short period of time, the object corresponding to the foreground can be assumed as a rigid body moving at a constant velocity. In FIG. 13, a picture of the object corresponding to the foreground is moved four pixels rightward in a frame with respect to an immediately preceding frame.

In FIG. 13, the leftmost pixel to the fourth pixel from the left belong to a background area. In FIG. 13, the fifth to the seventh pixels from the left in FIG. 13 belong to a mixed area that constitutes an uncovered background. In FIG. 13, the rightmost pixel belongs to a foreground area.

The object corresponding to the foreground, by which an object corresponding to a background has been covered, moves so as to be removed from the front of the object corresponding to the background as the time passes. Thus, the components included in the pixel values of the pixels belonging to the uncovered background area are switched from background components to foreground components at a certain point of time in the period corresponding to the shutter time.

For example, a pixel value M', shown in a thick-line frame in FIG. 13, is expressed by equation (2):

$$M' = F02/v + F01/v + B26/v + B26/v \quad (2)$$

For example, the fifth pixel from the left includes background components corresponding to three shutter time/v and a foreground component corresponding to one shutter time/v, and thus the mixing ratio α for the fifth pixel from the left is ¾. The sixth pixel from the left includes background components corresponding to two shutter time/v and foreground components corresponding to two shutter time/v, and thus the mixing ratio α for the sixth pixel from the left is ½. The seventh pixel from the left includes a background component corresponding to one shutter time/v and foreground components corresponding to three shutter time/v, and thus the mixing ratio α for the seventh pixel from the left is ¼.

In a more generalized form of equations (1) and (2), a pixel value M is expressed by equation (3):

$$M = \alpha \cdot B + \sum_i Fi/v \quad (3)$$

where α is a mixing ratio. B is a pixel value of background, and Fi/v is a foreground component.

Since the object corresponding to the foreground can be assumed as a rigid body moving at a constant velocity and the amount of movement v is four, for example, a foreground component F01/v of the fifth pixel from the left in FIG. 13 in the first shutter time/v upon the opening of the shutter is equal to a foreground component of the sixth pixel from the left in FIG. 13 associated with the second shutter time/v upon the opening of the shutter. Similarly, the foreground component F01/v is equal to a foreground component of the seventh pixel from the left in FIG. 13 associated with the third shutter time/v upon the opening of the shutter and to a foreground component of the eighth pixel from the left in FIG. 13 associated with the fourth shutter time/v upon the opening of the shutter.

Since the object corresponding to the foreground can be assumed as a rigid body moving at a constant velocity and the virtual split number is four, for example, a foreground component F02/v of the sixth pixel from the left in FIG. 13 in the first shutter time/v upon the opening of the shutter is equal to a foreground component of the seventh pixel from the left in FIG. 13 associated with the second shutter time/v upon the opening of the shutter. Similarly, the foreground component F02/v is equal to a foreground component of the eighth pixel from the left in FIG. 13 associated with the third shutter time/v upon the opening of the shutter.

Since the object corresponding to the foreground can be assumed as a rigid body moving at a constant velocity and the amount of movement v is four, for example, a foreground component F03/v of the seventh pixel from the left in FIG. 13 in the first shutter time/v upon the opening of the shutter is equal to a foreground component of the eighth pixel from the left in FIG. 1e associated with the second shutter time/v upon the opening of the shutter.

Although description has been made as to FIGS. 11 to 13 with an assumption that the virtual split number is four, the virtual split number is in accordance with the amount of movement v. The amount of movement v generally corresponds to the velocity of movement of an object corresponding to a foreground. For example, if the object corresponding to the foreground is moving so as to be displayed four pixels rightwards in a frame with respect to an immediately preceding frame, the amount of movement v is four. In accordance with the amount of movement v, the virtual split number is four. Similarly, for example, if the object corresponding to the foreground is moving so as to be displayed six pixels leftwards in a frame with respect to an immediately preceding frame, the amount of movement v is six, and the virtual split number is six.

Figure 14:
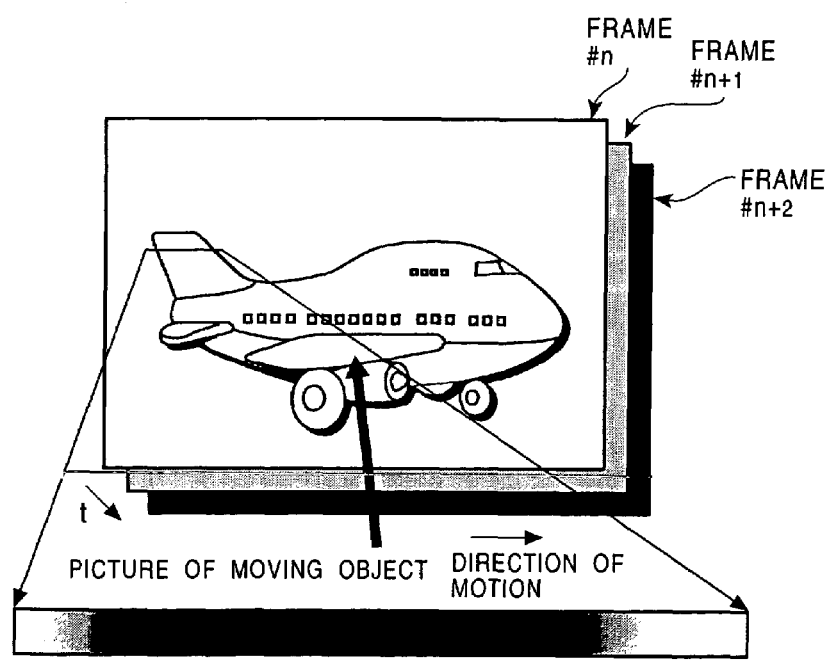
FIG. 14 is a diagram showing an example of pixels extracted from a foreground area, a background area, and a mixed area.
Figure 15:
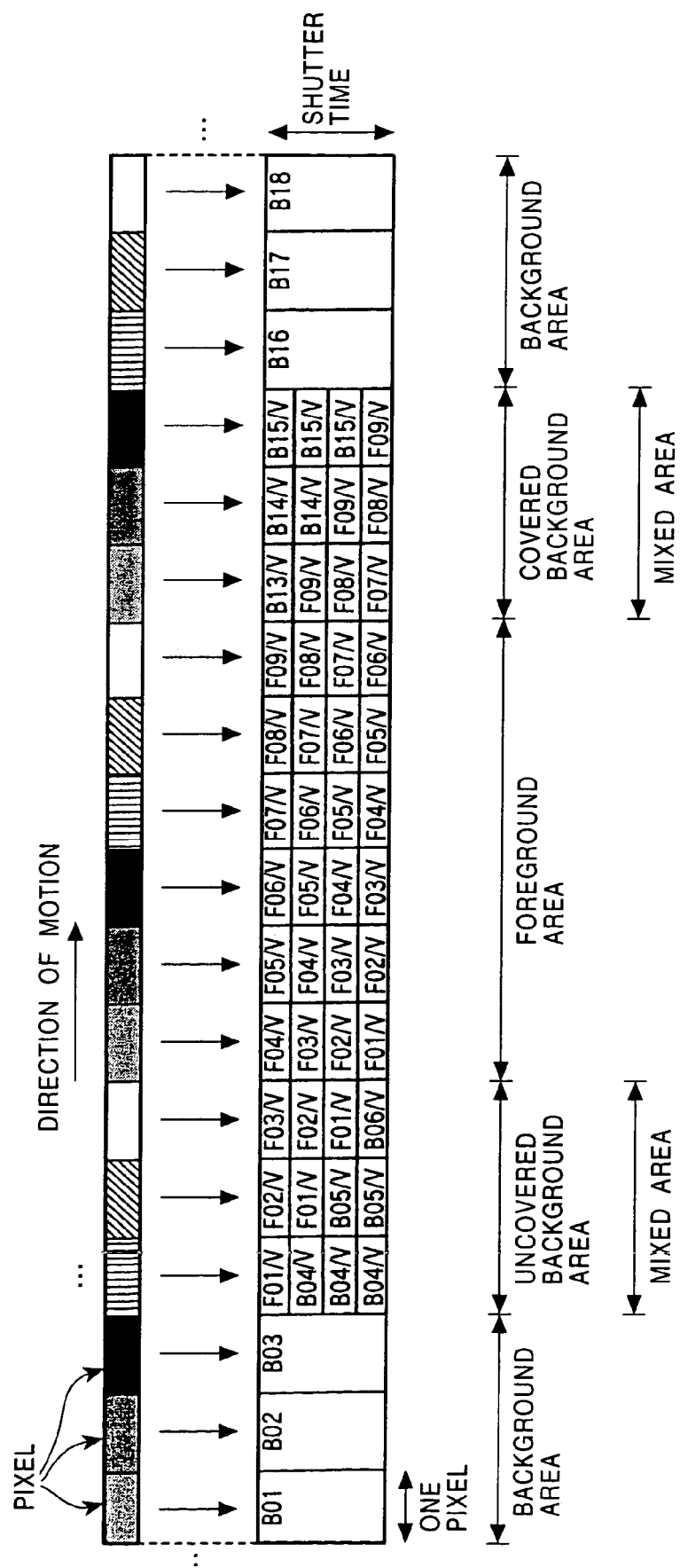
FIG. 15 is a diagram showing the correspondence between pixels and a model in which pixel values are expanded along the temporal direction.

FIGS. 14 and 15 show relationships between foreground area, background area, mixed area constituted of covered background area or uncovered background area, and foreground and background components corresponding to split shutter times, which have been described above.

FIG. 14 shows an example in which the pixels of a foreground area, a background area, and a mixed area are extracted from a picture including a foreground corresponding to an object moving in front of a still background. In the example shown in FIG. 14, the object corresponding to the foreground is moving horizontally with respect to the screen.

A frame #n+1 is next to a frame #n, and a frame #n+2 is next to the frame #n+1.

FIG. 15 is a model diagram in which the pixels of a foreground area, a background area, and a mixed area extracted from one of the frames #n to #n+2 are extracted and in which the pixels values of the extracted pixels are expanded along the temporal direction while assuming that the amount of movement v is four.

Since the object corresponding to the foreground moves, a pixel value of the foreground area consists of four different foreground components corresponding to periods of the shutter time/v. For example, the leftmost one of the pixels in the foreground area shown in FIG. 15 consists of F01/v, F02/v, F03/v, and F04/v. That is, the pixels in the foreground area include motion blurring.

Since the object corresponding to the background is still, the light input to the sensor 11 in association with the background does not change during the period corresponding to the shutter time. In this case, the pixel values of the background do not include motion blurring.

The pixel values of the pixels belonging to the mixed area, constituted of a covered background area or an uncovered background area, made up of foreground components and background components.

Next, a model will be described in which, with regard to a moving picture corresponding to an object, the pixel values in a plurality of frames, of pixels contiguously arranged in a line and at the same positions in the frames, are expanded along the temporal direction. For example, if the picture corresponding to the object is moving horizontally with respect to the screen, pixels arranged on a line of the screen can be selected as the pixels contiguously arranged in a line.

Figure 16:
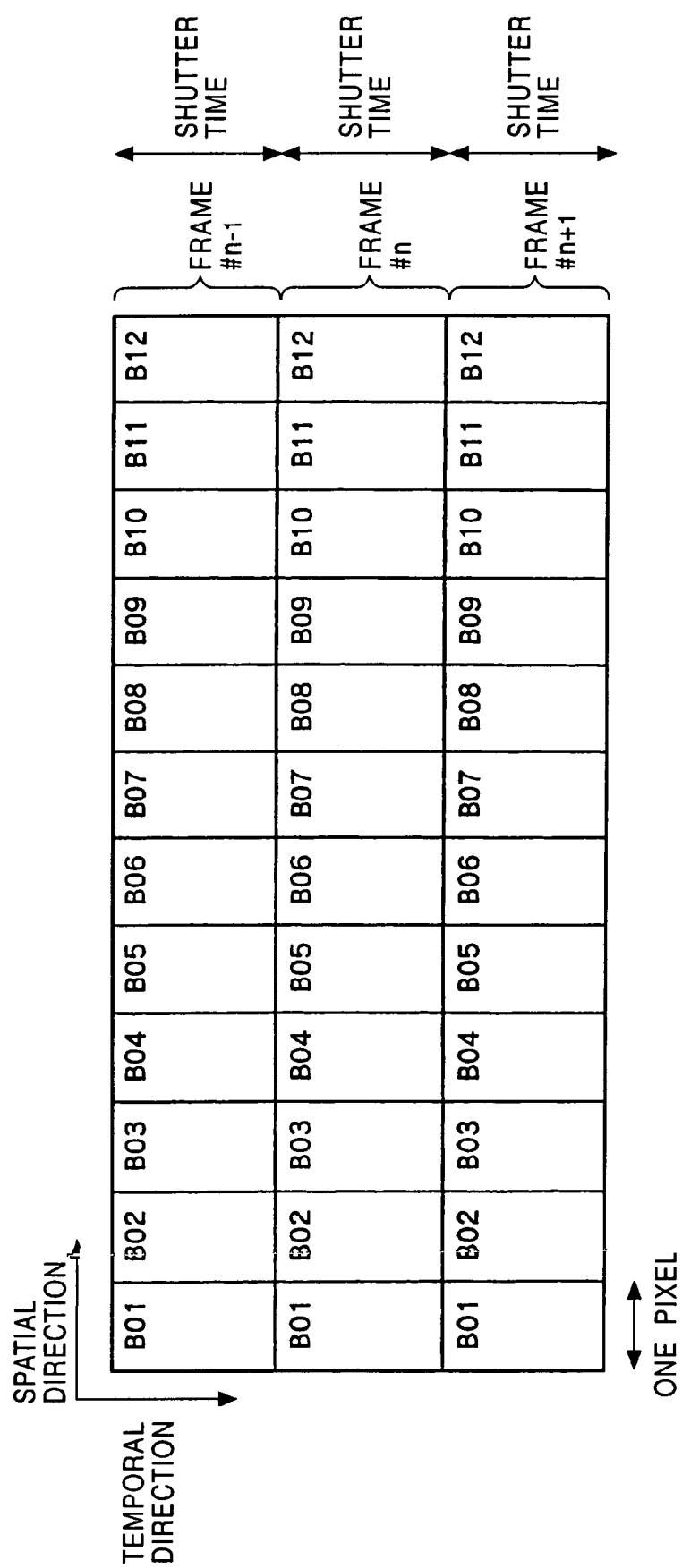
FIG. 16 is a model diagram in which pixel values are expanded along the temporal direction and in which a period corresponding to a shutter time is split.

FIG. 16 is a model diagram in which the pixel values in three frames of a picture acquired by imaging a still object corresponding to a background, of pixels contiguously arranged in a line and at the same positions in the frames, are expanded along the temporal direction. A frame #n is next to a frame #n−1, and a frame #n+1 is next to the frame #n. Other frames will be similarly referred to.

The pixel values of B01 to B12 shown in FIG. 16 are those of pixels corresponding to the still object in the background. Since the object corresponding to the background is still, the pixel values of the corresponding pixels in the frames #n−1 to the frame n+1 do not change. For example, each of the pixel in the frame #n and the pixel in the frame #n+1 corresponding to the position of the pixel with a pixel value of B05 in the frame #n−1 has a pixel value of B05.

Figure 17:
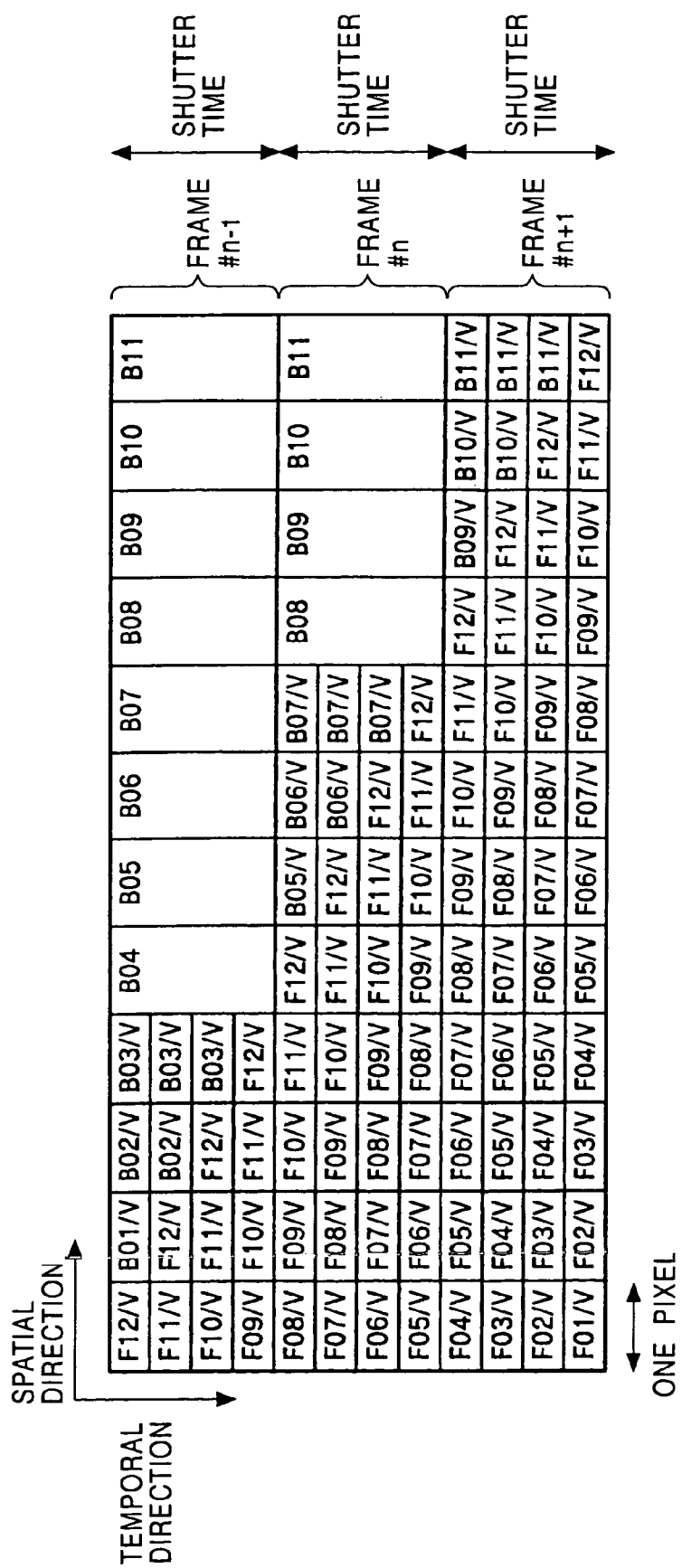
FIG. 17 is a model diagram in which pixel values are expanded along the temporal direction and in which a period corresponding to a shutter time is split.

FIG. 17 is a model diagram in which the pixel values in three frames of a picture acquired by imaging, together with a still object corresponding to a background, an object corresponding to a foreground moving rightwards as viewed in the figure, of pixels contiguously arranged in a line and at the same positions in the frames, are expanded along the temporal direction. The model shown in FIG. 17 includes a covered background area.

In FIG. 17, the object corresponding to the foreground can be assumed as a rigid body moving at a constant velocity, and the foreground picture moves so as to be displayed four pixels rightwards in the next frame. Thus, the amount of movement v of the foreground is four, and the virtual split number is four.

For example, the foreground component of the leftmost pixel in the frame #n−1 in FIG. 17 in the first shutter time/v upon the opening of the shutter is F12/v, and the foreground component of the second pixel from the left in FIG. 17 in the second shutter time/v upon the opening of the shutter is also F12/v. The foreground component of the third pixel from the left in FIG. 17 in the third shutter time/v upon the opening of the shutter, and the foreground component of the fourth pixel from the left in FIG. 17 in the fourth shutter time/v upon the opening of the shutter are F12/v.

The foreground component of the leftmost pixel in the frame #n−1 in FIG. 17 in the second shutter time/v upon the opening of the shutter is F11/v, and the foreground component of the second pixel from the left in FIG. 17 in the third shutter time/v upon the opening of the shutter is also F11/v. The foreground component of the third pixel from the left in FIG. 17 in the fourth shutter time/v upon the opening of the shutter is F11/v.

The foreground component of the leftmost pixel in the frame #n−1 in FIG. 17 in the third shutter time/v upon the opening of the shutter is F10/v, and the foreground component of the second pixel from the left in FIG. 17 in the fourth shutter time/v upon the opening of the shutter is also F10/v. The foreground component of the leftmost pixel in the frame #n−1 in FIG. 17 in the fourth shutter time/v upon the opening of the shutter is F09/v.

Since the object corresponding to the background is still, the background component of the second pixel from the left in the frame #n−1 in FIG. 17 in the first shutter time/v upon the opening of the shutter is B01/v. The background component of the third pixel from the left in the frame #n−1 in FIG. 17 in the first and the second shutter time/v upon the opening of the shutter is B02/v. The background component of the fourth pixel from the left in the frame #n−1 in FIG. 17 in the first to the third shutter time/v upon the opening of the shutter is B03/v.

In the frame #n−1 in FIG. 17, the leftmost pixel belongs to a foreground area, while the second to the fourth pixels from the left belong to a mixed area constituting a covered background area.

The fifth to the twelfth pixels from the left in the frame #n−1 in FIG. 17 belong to a background area, the pixel values thereof being B04 to B11, respectively.

The first to the fifth pixels from the left in the frame #n in FIG. 17 belong to a foreground area. The foreground component of the foreground area in the frame #n in a shutter time/v is one of F05/v to F12/v.

The object corresponding to the foreground can be assumed as a rigid body moving at a constant velocity, and the foreground picture moves so as to be displayed four pixels rightwards in the next frame. Thus, the foreground component of the fifth pixel from the left in the frame #n in FIG. 17 in the first shutter time/v upon the opening of the shutter is F12/v, and the foreground component of the sixth pixel from the left in FIG. 17 in the second shutter time/v upon the opening of the shutter is also F12/v. The foreground component of the seventh pixel from the left in FIG. 17 in the third shutter time/v upon the opening of the shutter, and the foreground component of the eighth pixel from the left in FIG. 17 in the fourth shutter time/v upon the opening of the shutter are F12/v.

The foreground component of the fifth pixel from the left in the frame #n in FIG. 17 in the second shutter time/v upon the opening of the shutter is F11/v, and the foreground component of the sixth pixel from the left in FIG. 17 in the third shutter time/v upon the opening of the shutter is also F11/v. The foreground component of the seventh pixel from the left in FIG. 17 in the fourth shutter time/v upon the opening of the shutter is F11/v.

The foreground component of the fifth pixel from the left in the frame #n in FIG. 17 in the third shutter time/v upon the opening of the shutter is F10/v, and the foreground component of the sixth pixel from the left in FIG. 17 in the fourth shutter time/v upon the opening of the shutter is also F10/v. The foreground component of the fifth pixel from the left in the frame #n in FIG. 17 in the fourth shutter time/v upon the opening of the shutter is F09/v.

Since the object corresponding to the background is still, the background component of the sixth pixel from the left in the frame #n in FIG. 17 in the first shutter time/v upon the opening of the shutter is B05/v. The background component of the seventh pixel from the left in the frame #n in FIG. 17 in the first and the second shutter time/v upon the opening of the shutter is B06/v. The background component of the eighth pixel from the left in the frame #n in FIG. 17 in the first to the third shutter time/v upon the opening of the shutter is B07/v.

In the frame #n in FIG. 17, the sixth to the eighth pixels from the left belong to a mixed area constituting a covered background area.

The ninth to the twelfth pixels from the left in the frame #n in FIG. 17 belong to a background area, the pixel values thereof being B08 to B11, respectively.

The first to the ninth pixels from the left in the frame #n+1 in FIG. 17 belong to a foreground area. The foreground component of the foreground area in the frame #n+1 in a shutter time/v is one of F01/v to F12/v.

The object corresponding to the foreground can be assumed as a rigid body moving at a constant velocity, and the foreground picture moves so as to be displayed four pixels rightwards in the next frame. Thus, the foreground component of the ninth pixel from the left in the frame #n+1 in FIG. 17 in the first shutter time/v upon the opening of the shutter is F12/v, and the foreground component of the tenth pixel from the left in FIG. 17 in the second shutter time/v upon the opening of the shutter is also F12/v. The foreground component of the eleventh pixel from the left in FIG. 17 in the third shutter time/v upon the opening of the shutter, and the foreground component of the twelfth pixel from the left in FIG. 17 in the fourth shutter time/v upon the opening of the shutter are F12/v.

The foreground component of the ninth pixel from the left in the frame #n+1 in FIG. 17 in the second shutter time/v upon the opening of the shutter is F11/v, and the foreground component of the tenth pixel from the left in FIG. 17 in the third shutter time/v upon the opening of the shutter is also F11/v. The foreground component of the eleventh pixel from the left in FIG. 17 in the fourth shutter time/v upon the opening of the shutter is F11/v.

The foreground component of the ninth pixel from the left in the frame #n+1 in FIG. 17 in the third shutter time/v upon the opening of the shutter is F10/v, and the foreground component of the tenth pixel from the left in FIG. 17 in the fourth shutter time/v upon the opening of the shutter is also F10/v. The foreground component of the ninth pixel from the left in the frame #n+1 in FIG. 17 in the fourth shutter time/v upon the opening of the shutter is F09/v.

Since the object corresponding to the background is still, the background component of the tenth pixel from the left in the frame #n+1 in FIG. 17 in the first shutter time/v upon the opening of the shutter is B09/v. The background component of the eleventh pixel from the left in the frame #n+1 in FIG. 17 in the first and the second shutter time/v upon the opening of the shutter is B10/v. The background component of the twelfth pixel from the left in the frame #n+1 in FIG. 17 in the first to the third shutter time/v upon the opening of the shutter is B11/v.

In the frame #n+1 in FIG. 17, the tenth to the twelfth pixels from the left correspond to a mixed area constituting a covered background area.

Figure 18:
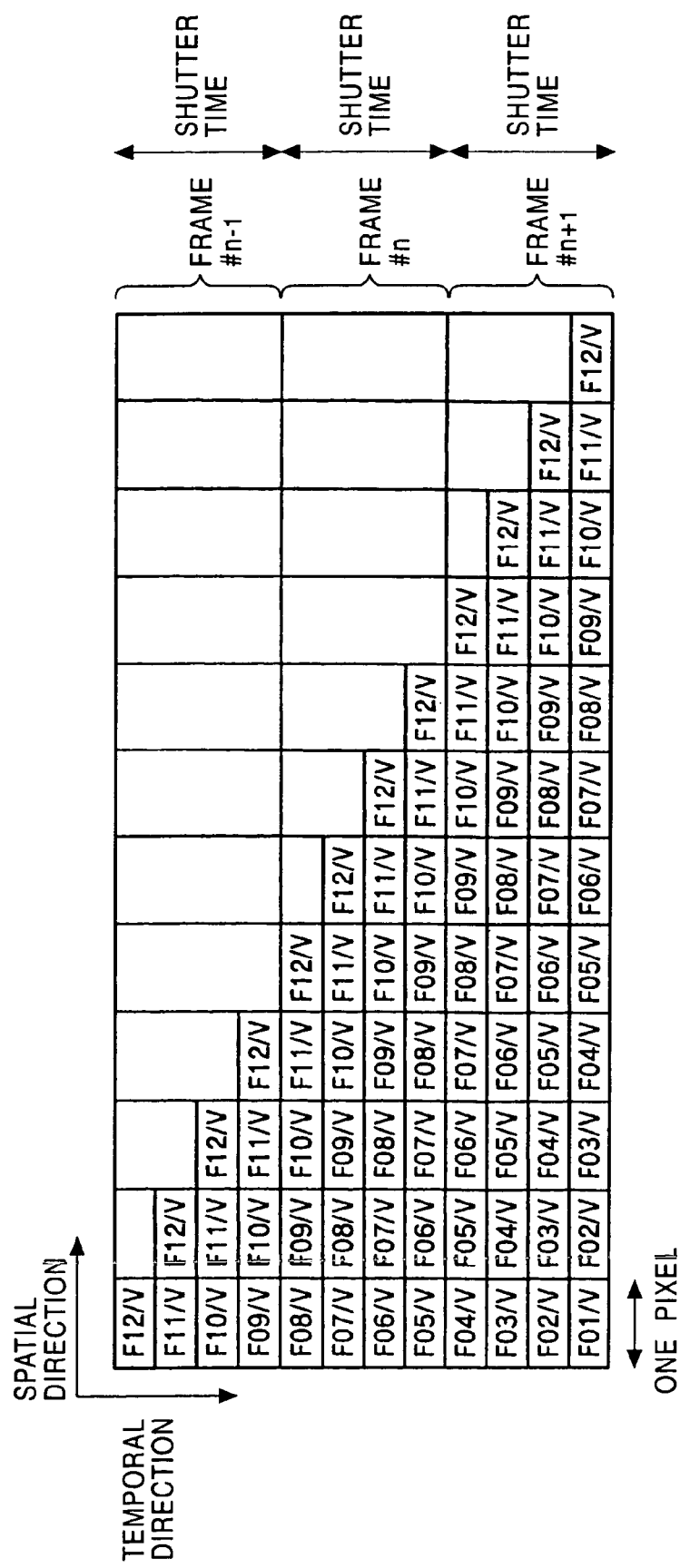
FIG. 18 is a model diagram in which pixel values are expanded along the temporal direction and in which a period corresponding to a shutter time is split.

FIG. 18 is a model diagram of a picture obtained by extracting the foreground components from the pixel values shown in FIG. 17.

Figure 19:
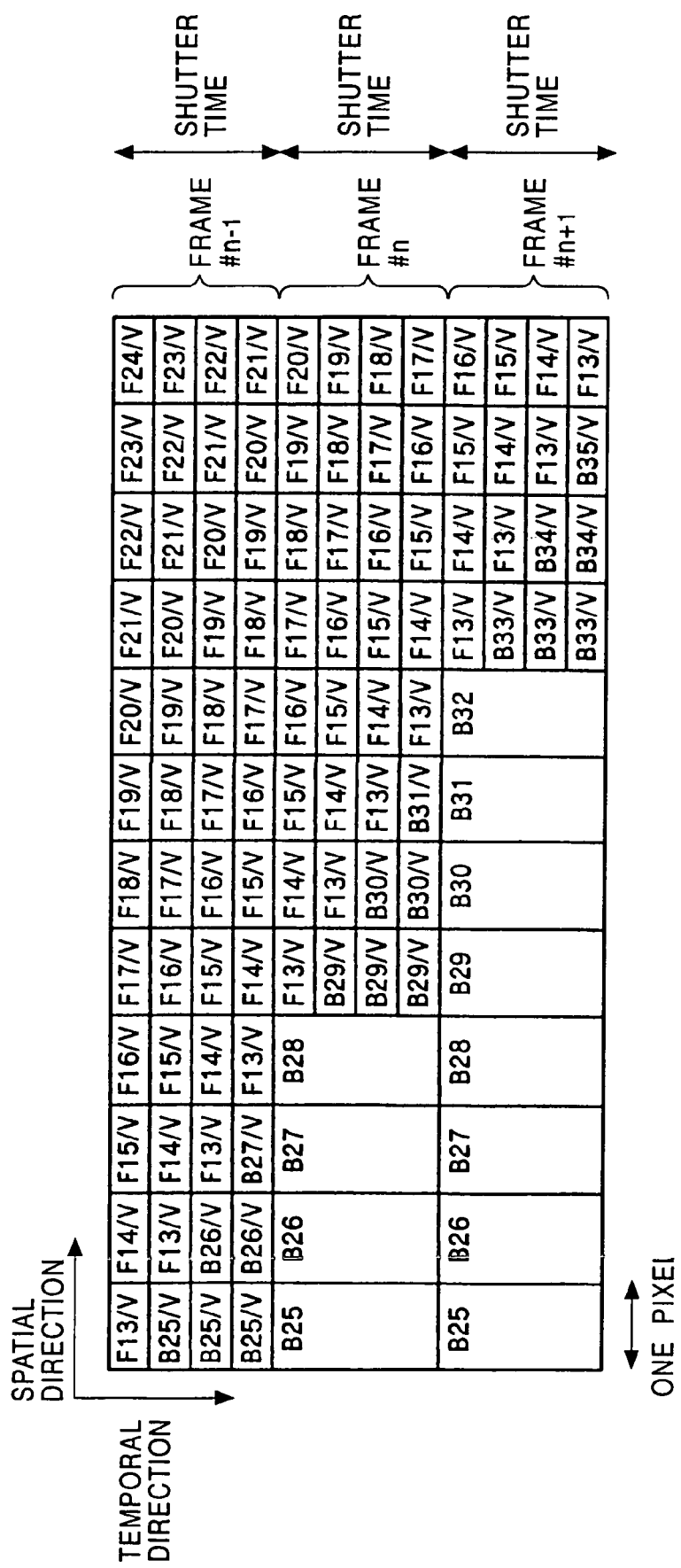
FIG. 19 is a model diagram in which pixel values are expanded along the temporal direction and in which a period corresponding to a shutter time is split.

FIG. 19 is a model diagram in which the pixel values in three frames of a picture acquired by imaging, together with a still background, a foreground corresponding to an object moving rightwards as viewed in the figure, of pixels contiguously arranged in a line and at the same positions in the frames, are expanded along the temporal direction. In FIG. 19, an uncovered background area is included.

In FIG. 19, the object corresponding to the foreground can be assumed as a rigid body moving at a constant velocity. Since the object corresponding to the foreground moves so as to be displayed four pixels rightwards in the next frame, the amount of movement v is four.

For example, the foreground component of the leftmost pixel in the frame #n−1 in FIG. 19 in the first shutter time/v upon the opening of the shutter is F13/v, and the foreground component of the second pixel from the left in FIG. 19 in the second shutter time/v upon the opening of the shutter is also F13/v. The foreground component of the third pixel from the left in FIG. 19 in the third shutter time/v upon the opening of the shutter, and the foreground component of the fourth pixel from the left in FIG. 19 in the fourth shutter time/v upon the opening of the shutter are F13/v.

The foreground component of the second pixel from the left in the frame #n−1 in FIG. 19 in the first shutter time/v upon the opening of the shutter is F14/v, and the foreground component of the third pixel from the left in FIG. 19 in the second shutter time/v upon the opening of the shutter is also F14/v. The foreground component of the third pixel from the left in FIG. 19 in the first shutter time/v upon the opening of the shutter is F15/v.

Since the object corresponding to the background is still, the background component of the leftmost pixel in the frame #n−1 in FIG. 19 in the second to the fourth shutter time/v upon the opening of the shutter is B25/v. The background component of the second pixel from the left in the frame #n−1 in FIG. 19 in the third and the fourth shutter time/v upon the opening of the shutter is B26/v. The background component of the third pixel from the left in the frame #n−1 in FIG. 19 in the fourth shutter time/v upon the opening of the shutter is B27/v.

In the frame #n−1 in FIG. 19, the leftmost pixel to the third pixel from the left belong to a mixed area constituting an uncovered background area.

The fourth to the twelfth pixels from the left in the frame #n−1 in FIG. 19 belong to a foreground area. A foreground component of the frame is one of F13/v to F24/v.

The leftmost pixel to the fourth pixel from the left in the frame #n in FIG. 19 belong to a background area, the pixel values thereof being B25 to B28, respectively.

The object corresponding to the foreground can be assumed as a rigid body moving at a constant velocity, and the foreground picture moves so as to be displayed four pixels rightwards in the next frame. Thus, the foreground component of the fifth pixel from the left in the frame #n in FIG. 19 in the first shutter time/v upon the opening of the shutter is F13/v, and the foreground component of the sixth pixel from the left in FIG. 19 in the second shutter time/v upon the opening of the shutter is also F13/v. The foreground component of the seventh pixel from the left in FIG. 19 in the third shutter time/v upon the opening of the shutter, and the foreground component of the eighth pixel from the left in FIG. 19 in the fourth shutter time/v upon the opening of the shutter are F13/v.

The foreground component of the sixth pixel from the left in the frame #n in FIG. 19 in the first shutter time/v upon the opening of the shutter is F14/v, and the foreground component of the seventh pixel from the left in FIG. 19 in the second shutter time/v upon the opening of the shutter is also F14/v. The foreground component of the eighth pixel from the left in FIG. 19 in the first shutter time/v upon the opening of the shutter is F15/v.

Since the object corresponding to the background is still, the background component of the fifth pixel from the left in the frame #n in FIG. 19 in the second to the fourth shutter time/v upon the opening of the shutter is B29/v. The background component of the sixth pixel from the left in the frame n in FIG. 19 in the third and the fourth shutter time/v upon the opening of the shutter is B30/v. The background component of the seventh pixel from the left in the frame #n in FIG. 19 in the fourth shutter time/v upon the opening of the shutter is B31/v.

In the frame #n in FIG. 19, the fifth to the seventh pixels from the left belong to a mixed area constituting an uncovered background area.

The eighth to the twelfth pixels from the left in the frame #n in FIG. 19 belong to a foreground area. The value in the foreground area in the frame #n corresponding to a period of shutter time/v is one of F13/v to F20/v.

The leftmost pixel to the eighth pixel from the left in the frame #n+1 in FIG. 19 belong to a background area, the pixel values thereof being B25 to B32, respectively.

The object corresponding to the foreground can be assumed as a rigid body moving at a constant velocity, and the foreground picture moves so as to be displayed four pixels rightwards in the next frame. Thus, the foreground component of the ninth pixel from the left in the frame #n+1 in FIG. 19 in the first shutter time/v upon the opening of the shutter is F13/v, and the foreground component of the tenth pixel from the left in FIG. 19 in the second shutter time/v upon the opening of the shutter is also F13/v. The foreground component of the eleventh pixel from the left in FIG. 19 in the third shutter time/v upon the opening of the shutter, and the foreground component of the twelfth pixel from the left in FIG. 19 in the fourth shutter time/v upon the opening of the shutter are F13/v.

The foreground component of the tenth pixel from the left in the frame #n+1 in FIG. 19 in the first shutter time/v upon the opening of the shutter is F14/v, and the foreground component of the eleventh pixel from the left in FIG. 19 in the second shutter time/v upon the opening of the shutter is also F14/v. The foreground component of the twelfth pixel from the left in FIG. 19 in the first shutter time/v upon the opening of the shutter is F15/v.

Since the object corresponding to the background is still, the background component of the ninth pixel from the left in the frame #n+1 in FIG. 19 in the second to the fourth shutter time/v upon the opening of the shutter is B33/v. The background component of the tenth pixel from the left in the frame #n+1 in FIG. 19 in the third and the fourth shutter time/v upon the opening of the shutter is B34/v. The background component of the eleventh pixel from the left in the frame #n+1 in FIG. 19 in the fourth shutter time/v upon the opening of the shutter is B35/v.

In the frame #n+1 in FIG. 19, the ninth to the eleventh pixels from the left belong to a mixed area constituting an uncovered background area.

The twelfth pixel from the left in the frame #n+1 in FIG. 19 belongs to a foreground area. The foreground component of the foreground area in the frame #n+1 in a shutter time/v is one of F13/v to F16/v.

Figure 20:
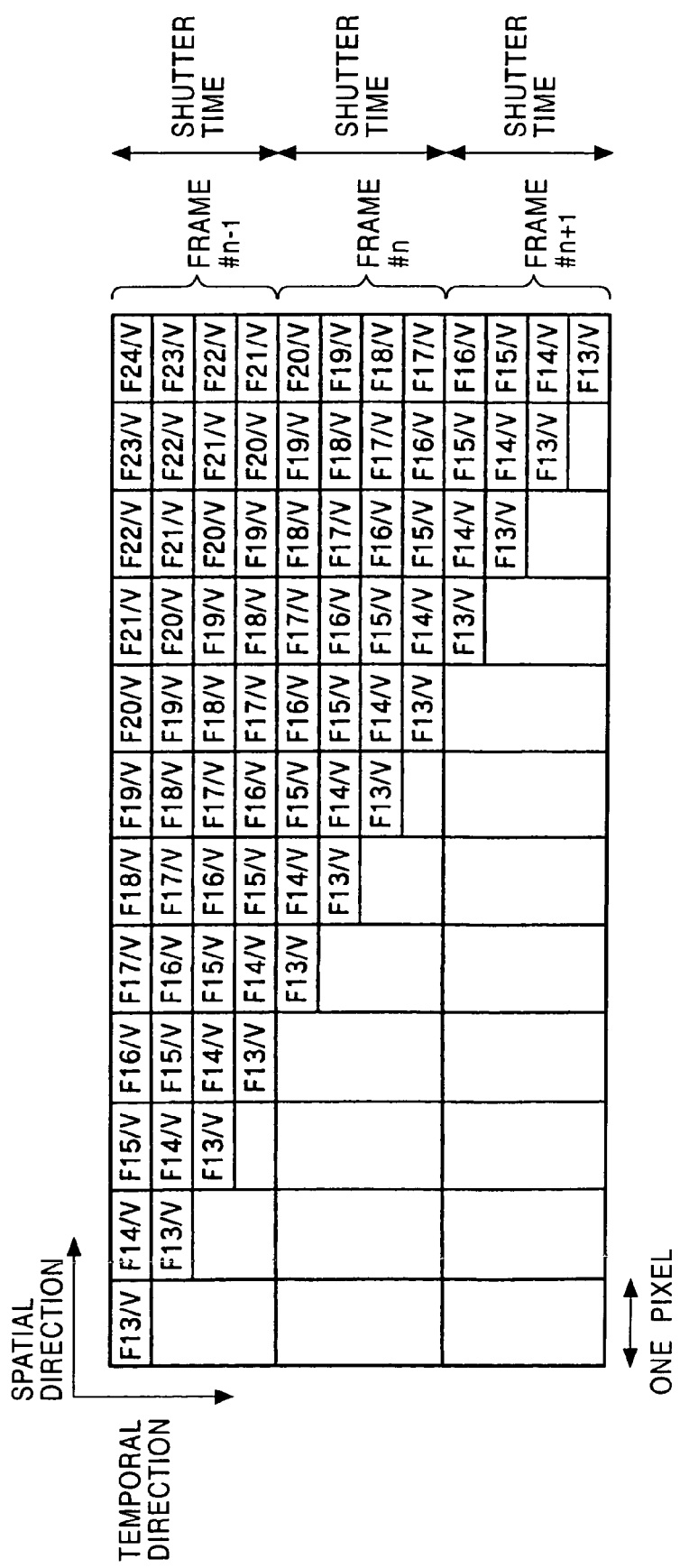
FIG. 20 is a model diagram in which pixel values are expanded along the temporal direction and in which a period corresponding to a shutter time is split.

FIG. 20 is a model diagram of a picture obtained by extracting the foreground components from the pixel values shown in FIG. 19.

Referring back to FIG. 4, the area specifying unit 103 associates, with each pixel, a flag indicating to which of a foreground area, a background area, a covered background area, or an uncovered background area the pixel belongs, using pixel values in a plurality of frames, and supplies it as area information to the mixing ratio calculating unit 104 and to the motion blurring adjustment unit 106.

Based on the pixel values in the plurality of frames and the area information, the mixing ratio calculating unit 104 calculates a mixing ratio α for each pixel included in a mixed area, and supplies mixing ratios α thus calculated to the foreground/background separation unit 105.

Based on the pixel values in the plurality of frames, the area information, and the mixing ratios α, the foreground/background separation unit 105 extracts a foreground component picture made up only of foreground components, and supplies it to the motion blurring adjustment unit 106.

Based on the foreground component picture supplied from the foreground/background separation unit 105, the motion vector supplied from the motion detection unit 102, and the area information supplied from the area specifying unit 103, the motion blurring adjustment unit 106 adjusts the amount of motion blurring included in the foreground component picture, outputting a foreground component picture that has been adjusted as to the amount of motion blurring.

Figure 21:
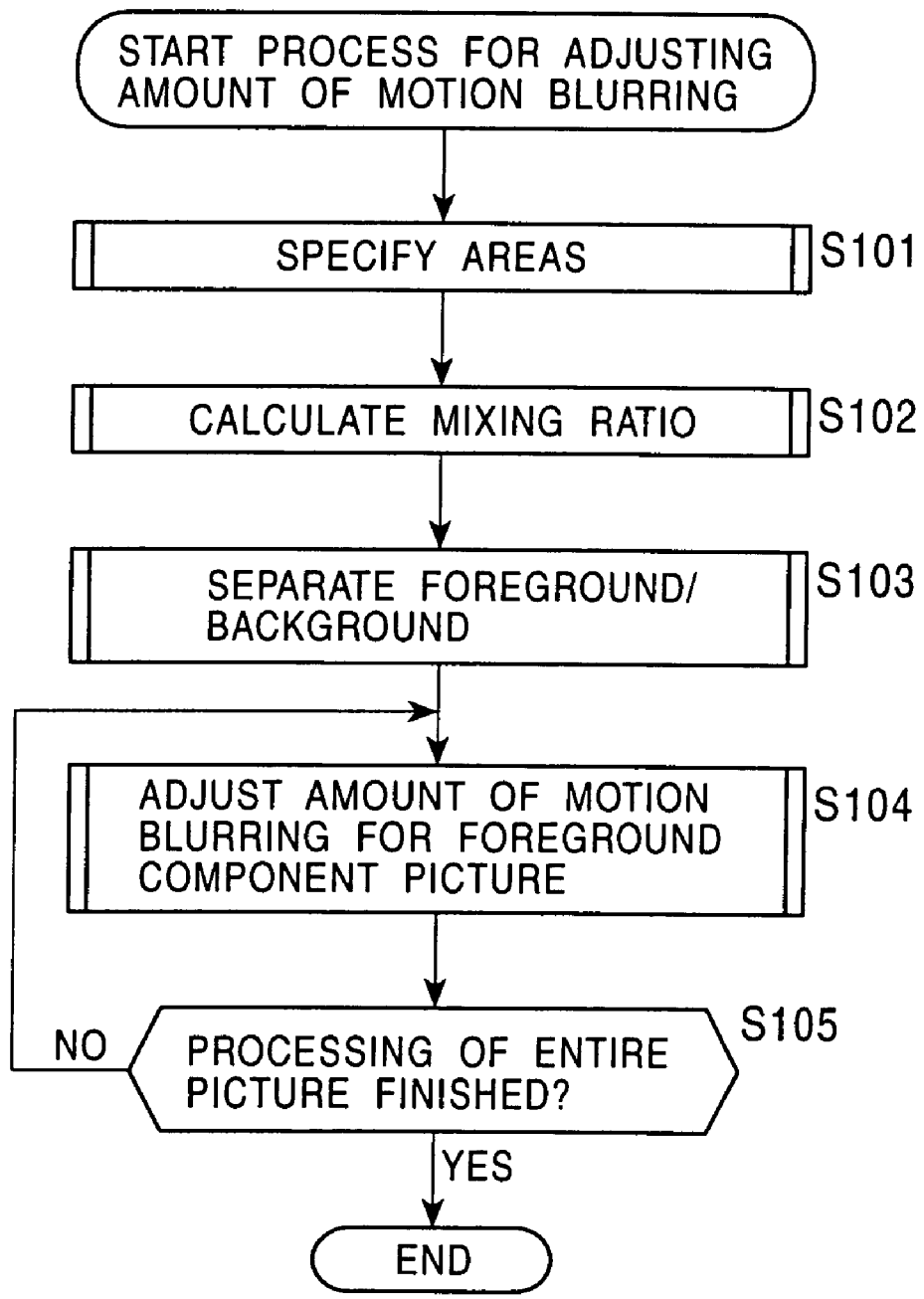
FIG. 21 is a flowchart showing a process for adjusting the amount of motion blurring.

Processes by the signal processor 12 for adjusting the amount of motion blurring will be described with reference to a flowchart in FIG. 21. In step S101, the area specifying unit 103 executes, based on an input picture, a area specifying process for generating area information indicating to which of a foreground area, a background area, a covered background area, or an uncovered background area each pixel of the input picture belongs. The area specifying process will be described later in detail with reference to a flowchart in FIG. 30. The area specifying unit 103 supplies the area information thus generated to the mixing ratio calculating unit 104.

In step S101, the area specifying unit 103 may generate, based on an input picture, area information indicating to which of a foreground area, a background area, or a mixed area (without distinction between covered background area and uncovered background area) each pixel of the input picture belongs. In this case, the foreground/background separation unit 105 and the motion blurring adjustment unit 106 determine whether a mixed area is a covered background area or an uncovered background area, based on the direction of the motion vector. For example, if a foreground area, a mixed area, and a background area are arranged in that order in the direction of the motion vector, the mixed area is determined as a covered background area; whereas, if a background area, a mixed area, and a foreground area are arranged in that order in the direction of the motion vector, the mixed area is determined as an uncovered background area.

In step S102, the mixing ratio calculating unit 104 calculates a mixing ratio α for each pixel included in a mixed area, based on the input picture and the area information. The process for calculating mixing ratio will be described later in detail with reference to a flowchart in FIG. 49. The mixing ratio calculating unit 104 supplies mixing ratios α thus calculated to the foreground/background separation unit 105.

In step S103, the foreground/background separation unit 105 extracts foreground components from the input picture, based on the area information and the mixing ratios α, and supplies it to the motion blurring adjustment unit 106 as a foreground component picture.

In step S104, based on the motion vector and the area information, the motion blurring adjustment unit 106 creates a processing unit indicating the positions on the picture of pixels arranged contiguously in the direction of movement and belonging to an uncovered background area, a foreground area, or a covered background area, and adjusts the amount of motion blurring included in foreground components corresponding to the processing unit. The process for adjusting the amount of motion blurring will be described later in detail with reference to a flowchart in FIG. 66.

In step S105, the signal processor 12 determines whether the process has been finished for the entire screen, and if it is determined that the process has not been finished for the entire screen, it proceeds to step S104, repeating the process for adjusting the amount of motion blurring for the foreground components corresponding to the processing unit.

If it is determined in step S106 that the process has been finished for the entire screen, the process is exited.

As described above, the signal processor 12 is capable of separating a foreground and a background and adjusting the amount of motion blurring included in the foreground. That is, the signal processor 12 is capable of adjusting the amount of motion blurring included in sample data consisting of the pixel values of foreground pixels.

An example construction of each of the area specifying unit 103, the mixing ratio calculating unit 104, the foreground/background separation unit 105, and the motion blurring adjustment unit 106 will be described below.

Figure 22:
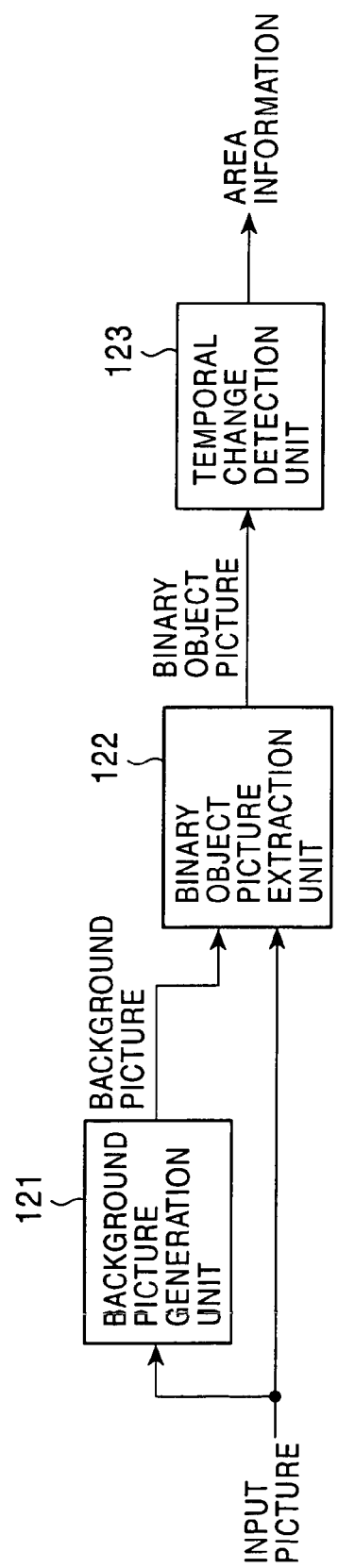
FIG. 22 is a block diagram showing a construction of an area specifying unit 103.

FIG. 22 is a block diagram showing a construction of the area specifying unit 103. The area specifying unit 103 shown in FIG. 22 does not use a motion vector. A background picture generation unit 121 generates a background picture associated with the input picture, and supplies the background picture thus generated to a binary object picture extraction unit 122. The background picture generation unit 121 generates the background picture by, for example, extracting a picture object corresponding to a background object included in the input picture.

Figure 23:
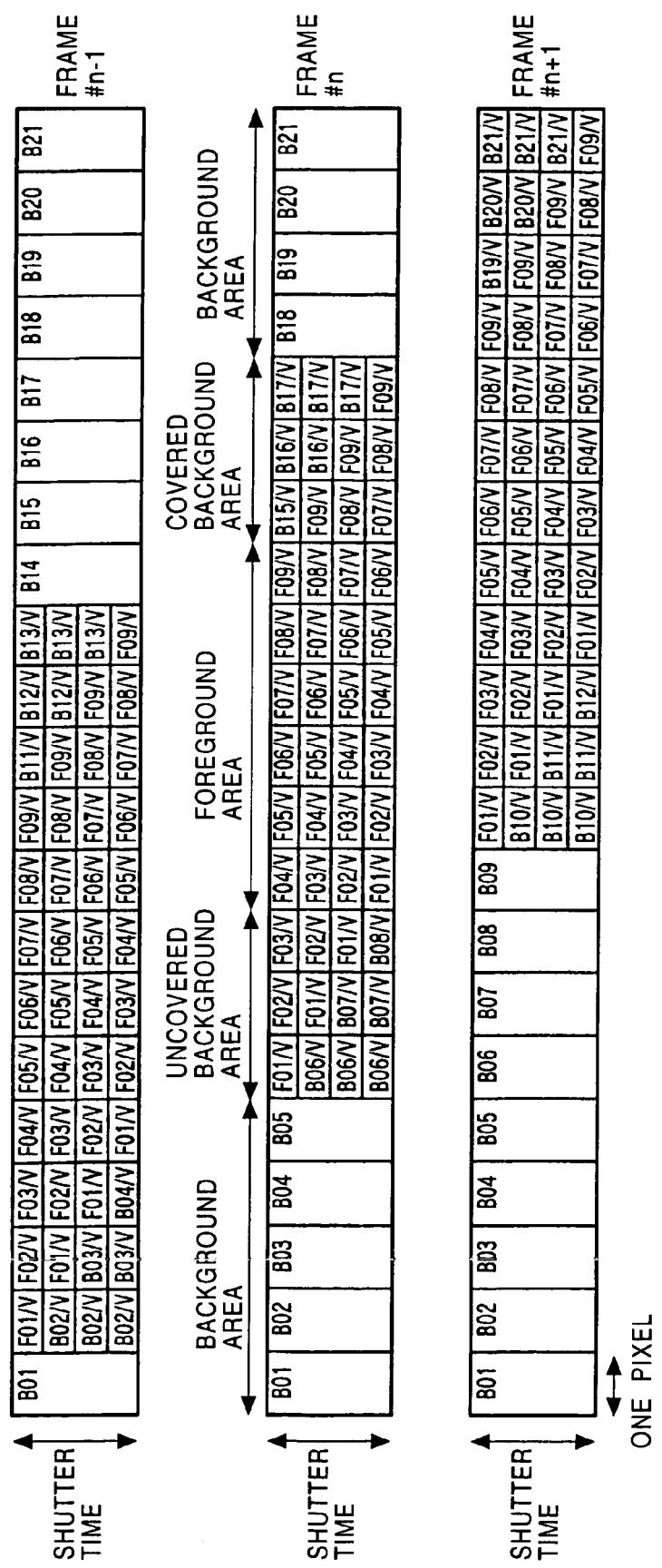
FIG. 23 is a model diagram in which pixel values are expanded along the temporal direction and in which a period corresponding to a shutter time is split.

FIG. 23 is an example model diagram in which the pixel values of pixels contiguously arranged in a line in the direction of movement of a picture corresponding to a foreground object are expanded along the temporal direction. For example, if the direction of movement of the picture corresponding to the foreground object is horizontal with respect to the screen, the model diagram in FIG. 23 shows a model in which the pixel values of contiguous pixels on a line is expanded along the temporal direction.

In FIG. 23, the line in frame #n is the same as the lines in the frame #n−1 and the frame n+1.

The foreground components corresponding to an object included in the sixth to the seventeenth pixels from the left in the frame #n are included in the second to the thirteenth pixels from the left in the frame #n−1, and included in the tenth to the twenty-first pixels from the left in the frame #n+1.

In the frame #n−1, the eleventh to the thirteenth pixels from the left belong to a covered background area, while the second to the fourth pixels from the left belong to an uncovered background area. In the frame #n, the fifteenth to the seventeenth pixels from the left belong to a covered background area, while the sixth to the eighth pixels from the left belong to an uncovered background area. In the frame #n+1, the nineteenth to the twenty-first pixels from the left belong to a covered background area, while the tenth to the twelfth pixels from the left belong to an uncovered background area.

In the frame #n−1, the first, and the fourteenth to the twenty-first pixels from the left belong to a background area. In the frame #n, the first to the fifth, and the eighteenth to the twenty-first pixels from the left belong to a background area. In the frame #n+1, the first to the ninth pixels from the left belong to a background area.

Figure 24:
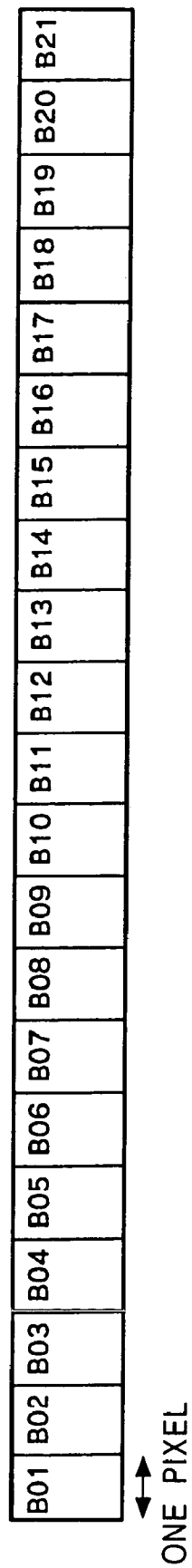
FIG. 24 is a diagram showing an example background picture.

FIG. 24 shows an example background picture generated by the background picture generation unit 121, corresponding to the example shown in FIG. 23. The background picture is made up of pixels corresponding to a background object, and does not include picture components corresponding to a foreground object.

The binary object picture extraction unit 122 generates a binary object picture based on a correlation between the background picture and the input picture, and supplies the binary object picture thus generated to a temporal change detection unit 123.

FIG. 25 is a block diagram showing a construction of the binary object picture extraction unit 122. A correlation value calculating unit 131 calculates a correlation between the background picture supplied from the background picture generation unit 121 and the input picture to generate a correlation value, and supplies the correlation value thus generated to a threshold value processor 132.

The correlation value calculating unit 131, for example, applies equation (4) to a 3×3 block centered at $X_4$ in the background picture as shown in FIG. 26A and a 3×3 block centered at $Y_4$ in the input picture as shown in FIG. 26B, corresponding to the block in the background picture, thereby calculating a correlation value corresponding to $Y_4$.

$$\text{Correlation value} = \frac{\sum_{i=0}^{8}(Xi-\overline{X})\sum_{i=0}^{8}(Yi-\overline{Y})}{\sqrt{\sum_{i=0}^{8}(Xi-\overline{X})^2 \cdot \sum_{i=0}^{8}(Yi-\overline{Y})^2}} \quad (4)$$

$$\overline{X} = \frac{\sum_{i=0}^{8} Xi}{9} \quad (5)$$

$$\overline{Y} = \frac{\sum_{i=0}^{8} Yi}{9} \quad (6)$$

The correlation value calculating unit 131 supplies the correlation value thus calculated for each of the pixels to the threshold value processor 132.

Alternatively, for example, the correlation value calculating unit 131 may apply equation (7) to a 3×3 block centered at $X_4$ in the background picture as shown in FIG. 27A and a 3×3 block centered at $Y_4$ in the input picture as shown in FIG. 27B, corresponding to the block in the background picture, thereby calculating an absolute differential value corresponding to $Y_4$.

$$\text{Absolute differential value} = \sum_{i=0}^{8}(Xi-Yi) \quad (7)$$

The correlation value calculating unit 131 supplies absolute differential value thus calculated to the threshold value processor 132 as a correlation value.

The threshold value processor 132 compares the pixel values of a correlation picture with a threshold value th0, setting a 1 to a pixel value of a binary object picture if the correlation value is not greater than the threshold value th0 while setting a 0 to the pixel value of the binary object picture if the correlation value is greater than the threshold value th0, and outputs the binary object picture in which a 0 or a 1 is set in each of the pixel values. The threshold value processor 132 may store a threshold value th0 in advance, or use a threshold value th0 externally input.

Figure 28:
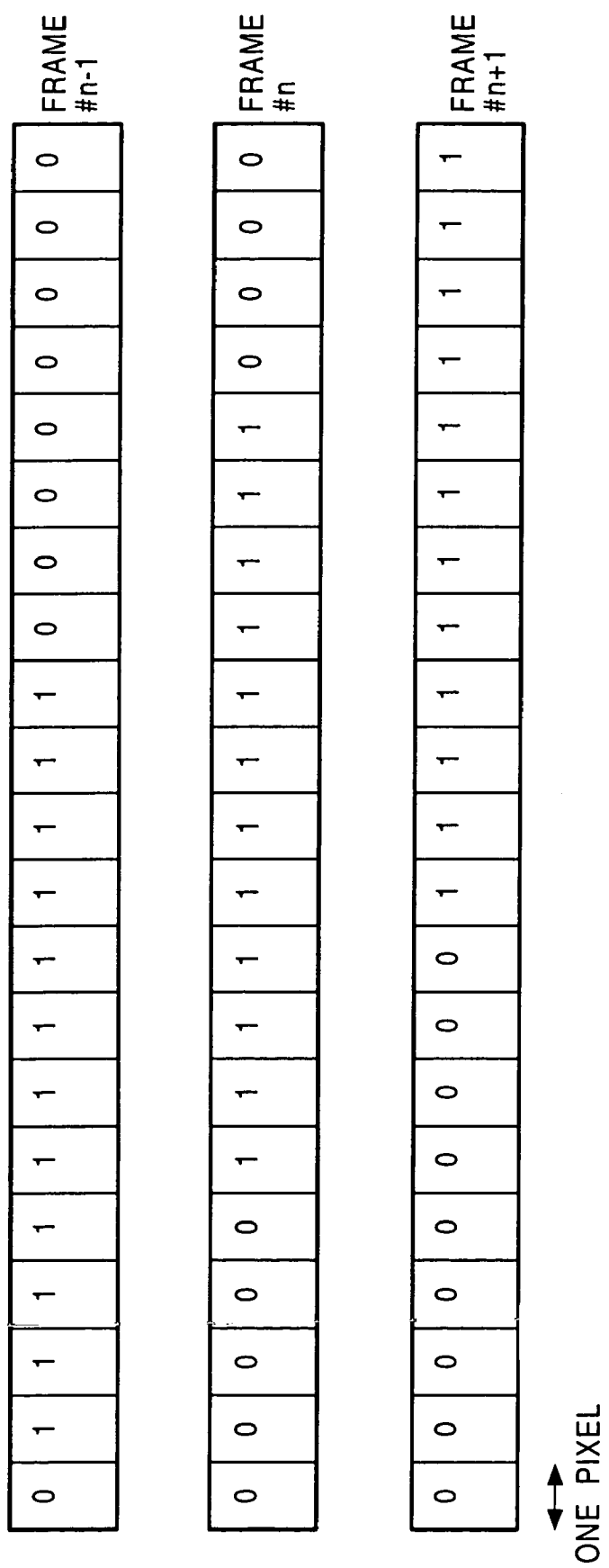
FIG. 28 is a diagram showing an example binary object picture.

FIG. 28 is a diagram showing an example of binary object picture, corresponding to the model of input picture shown in FIG. 23. In the binary object picture, the pixel value of a pixel with a high correlation with the background picture is set to 0.

Figure 29:
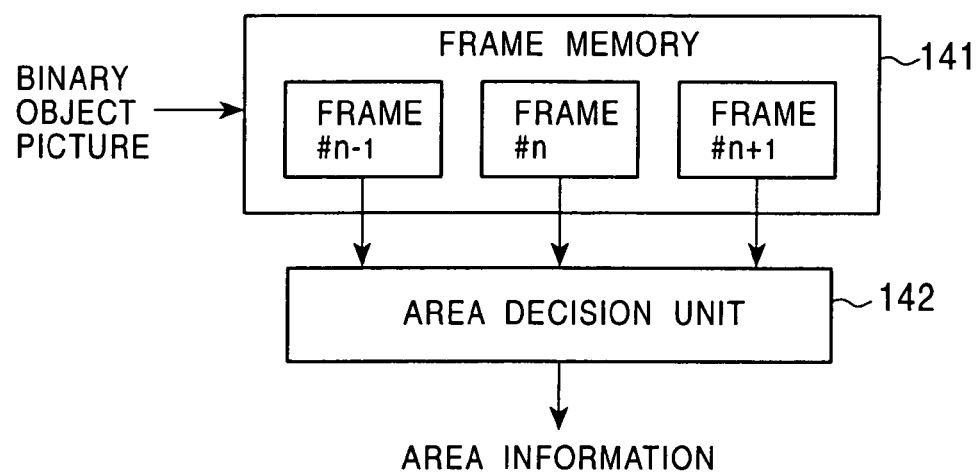
FIG. 29 is a block diagram showing a construction of a temporal change detection unit 123.

FIG. 29 is a block diagram showing a construction of the temporal change detection unit 123. A frame memory 141 stores binary object pictures of the frames #n−1, #n, and #n+1, supplied from the binary object picture extraction unit 122, when areas are determined for the pixels in the frame #n.

An area decision unit 142 determines an area for each of the pixels in the frame #n based on the binary object pictures of the frames #−1, #n, and #n+1 to generate area information, outputting the area information thus generated.

FIG. 30 is a diagram for explaining the decision by the area decision unit 142. When a pixel under consideration in the binary object picture of the frame #n is 0, the area decision unit 142 determines that the pixel under consideration in the frame #n belongs to a background area.

If the pixel under consideration in the binary object picture of the frame #n is 1, the corresponding pixel in the binary object picture of the frame #n−1 is 1, and if the corresponding pixel in the binary object picture of the frame #n+1 is 1, the area decision unit 142 determines that the pixel under consideration in the frame #n belongs to a foreground area.

If the pixel under consideration in the binary object picture of the frame #n is 1 and if the corresponding pixel in the binary object picture of the frame #n−1 is 0, the area decision unit 142 determines that the pixel under consideration in the frame #n belongs to a covered background area.

If the pixel under consideration in the binary object picture of the frame #n is 1 and if the corresponding pixel in the binary object picture of the frame #n+1 is 0, the area decision unit 142 determines that the pixel under consideration in the frame #n belongs to an uncovered background area.

Figure 31:
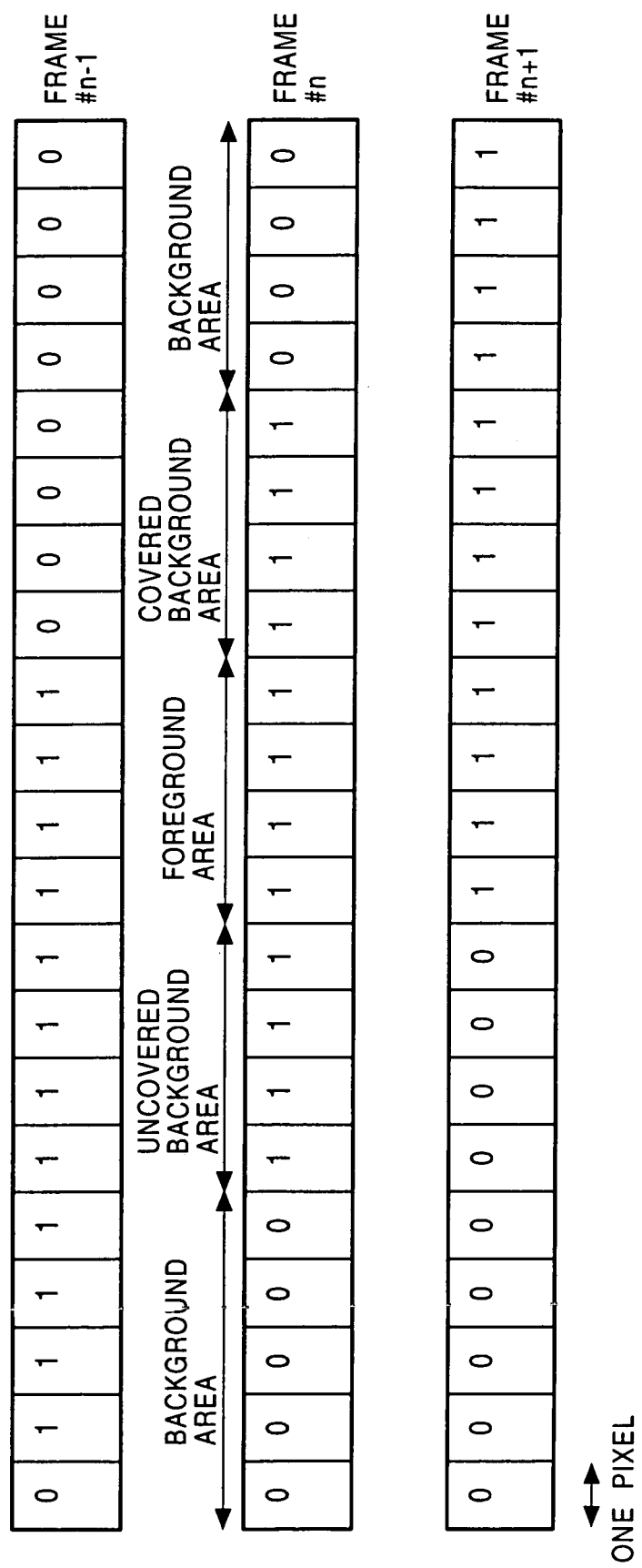
FIG. 31 is a diagram showing an example decision by the temporal change detection unit 123.

FIG. 31 shows an example of decision by the temporal change detection unit 123, with regard to the binary object picture corresponding to the model of input picture shown in FIG. 23. The temporal change detection unit 123 determines that the first to the fifth pixels from the left in the frame #n belong to a background area because the corresponding pixels in the frame #n of the binary object picture are 0s.

The temporal change detection unit 123 determines that the sixth to the ninth pixels from the left belong to an uncovered background area because the pixels in the frame #n of the binary object picture are 1s and the corresponding pixels in the frame #n+1 are 0s.

The temporal change detection unit 123 determines that the tenth to the thirteenth pixels from the left belong to a foreground area because the pixels in the frame #n of the binary object picture are 1s, the corresponding pixels in the frame #n−1 are 1s, and the corresponding pixels in the frame #n+1 are 1s.

The temporal change detection unit 123 determines that the fourteenth to the seventeenth pixels from the left belong to a covered background area because the pixels in the frame #n of the binary object picture are 1s and the corresponding pixels in the frame #n−1 are 0s.

The temporal change detection unit 123 determines that the eighteenth to the twenty-first pixels from the left belong to a background area because the corresponding pixels in the frame #n of the binary object picture are 0s.

Next, the process for specifying areas by the area specifying unit 103 will be described with reference to a flowchart in FIG. 30. In step S111, based on the input picture, the background picture generation unit 121 of the area specifying unit 103 extracts, for example, a picture object corresponding to a background object included in the input picture to generate a background picture, and supplies the background picture thus generated to the binary object picture extraction unit 122.

In step S112, the binary object picture extraction unit 122 calculates a correlation value between the input picture and the background picture supplied from the background picture generation unit 121, for example, by the calculation described with reference to FIGS. 26A and 26B. In step S113, the binary object picture extraction unit 122 calculates a binary object picture from the correlation value and the threshold value th0, for example, by comparing the correlation value with the threshold value th0.

In step S114, the temporal change detection unit 123 executes the process for determining areas, and the process is exited.

The process for determining areas, corresponding to step S114, will be described in detail with reference to a flowchart in FIG. 31. In step S121, the area decision unit 142 of the temporal change detection unit 123 determines whether a pixel under consideration in the frame #n stored in the frame memory 141 is a 0. If it is determined that the pixel under consideration in the frame #n is a 0, the process proceeds to step S122, in which the pixel under consideration in the frame #n is set as belonging to a background area, and the process is exited.

If it is determined in step S121 that the pixel under consideration in the frame #n is a 1, the process proceeds to step S123, in which the area decision unit 142 of the temporal change detection unit 123 determines whether the pixel under consideration in the frame #n stored in the frame memory 141 is a 1 and whether the corresponding pixel in the frame #n−1 is a 0. If it is determined that the pixel under consideration in the frame #n is a 1 and that the corresponding pixel in the frame #n−1 is a 0, the process proceeds to step S124, in which the pixel under consideration in the frame #n is set as belonging to a covered background area, and the process is exited.

If it is determined in step S123 that the pixel under consideration in the frame #n is a 0 or that the corresponding pixel in the frame #n−1 is a 1, the process proceeds to step S125, in which the area decision unit 142 of the temporal change detection unit 123 determines whether the pixel under consideration in the frame #n stored in the frame memory 141 is a 1 and whether the corresponding pixel in the frame #n+1 is a 0. If it is determined that the pixel under consideration in the frame #n is a 1 and that the corresponding pixel in the frame #n+1 is a 0, the process proceeds to step S126, in which the pixel under consideration in the frame #n is set as belonging to an uncovered background area, and the process is exited.

If it is determined in step S125 that the frame under consideration in the frame #n is a 0 or that the corresponding pixel in the frame #n+1 is a 1, the process proceeds to step S127, in which the area decision unit 142 of the temporal change detection unit 123 sets the pixel under consideration in the frame #n as a foreground area, and the process is exited.

As described above, the area specifying unit 103 is capable of specifying, based on the correlation values between the input picture and the corresponding background picture, to which of a foreground area, a background area, a covered background area, or an uncovered background area each pixel of the input picture belongs and thereby generating area information in accordance with the specified results.

Figure 34:
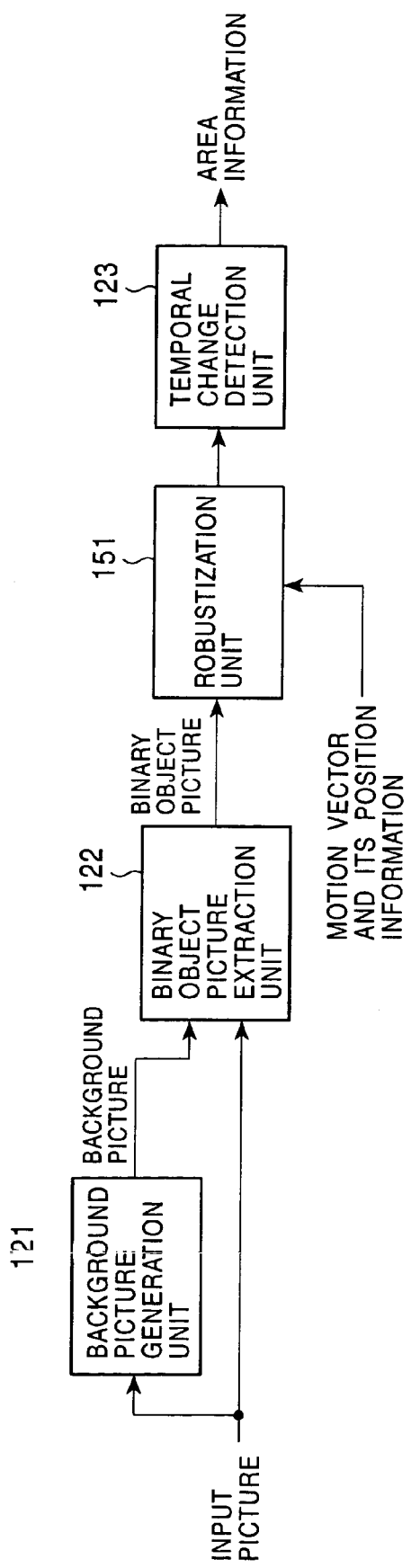
FIG. 34 is a block diagram showing another construction of the area specifying unit 103.

FIG. 34 is a block diagram showing another construction of the area specifying unit 103. The area specifying unit 103 shown in FIG. 34 uses the motion vector supplied from the motion detection unit 102 and its position information. Parts that are the same as in FIG. 22 are denoted by the same numbers, and descriptions thereof will be omitted.

A robustization unit 151 generates a robustized binary object picture based on the binary object pictures of N frames, supplied from the binary object picture extraction unit 122, and outputs it to the temporal change detection unit 123.

Figure 35:
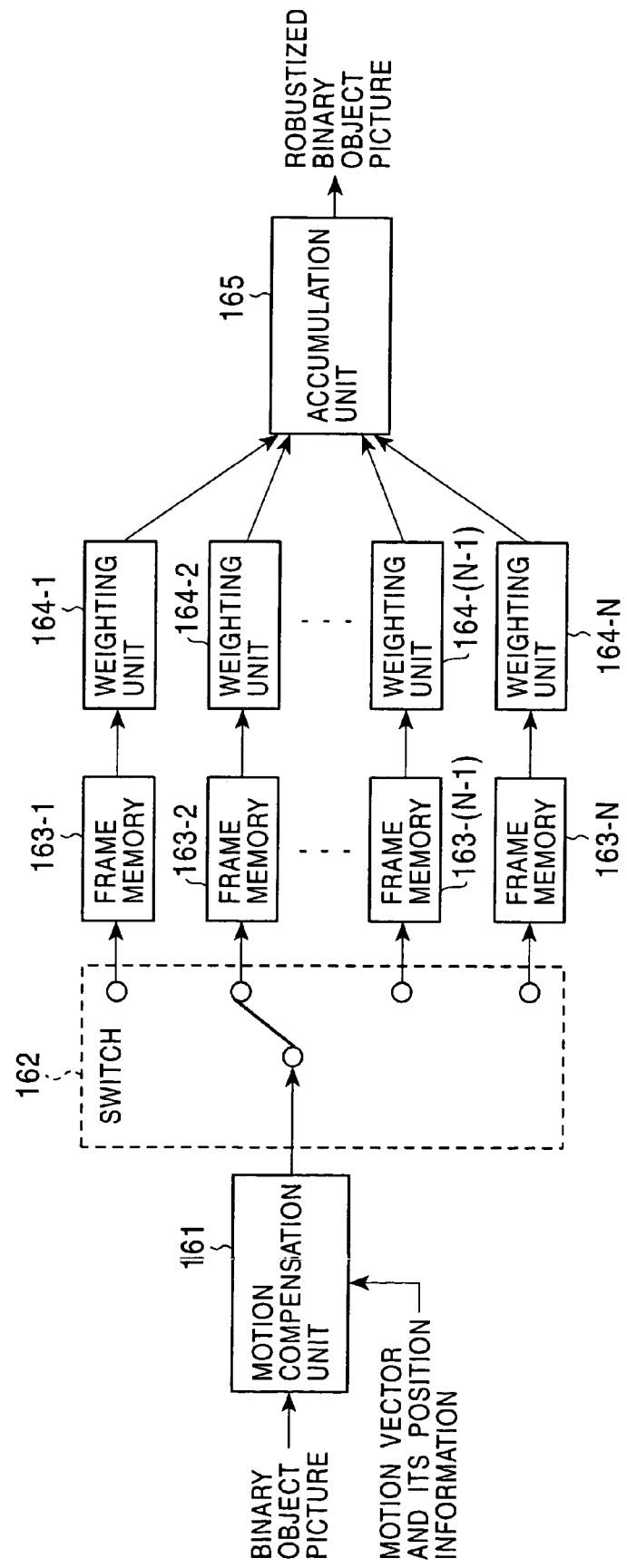
FIG. 35 is a block diagram showing a construction of a robustization unit 151.

FIG. 35 is a block diagram showing a construction of the robustization unit 151. A motion compensation unit 161 motion-compensates the binary object pictures of the N frames based on the motion vector and its position information supplied from the motion detection unit 102, and outputs motion-compensated binary object pictures to a switch 162.

Figure 36:
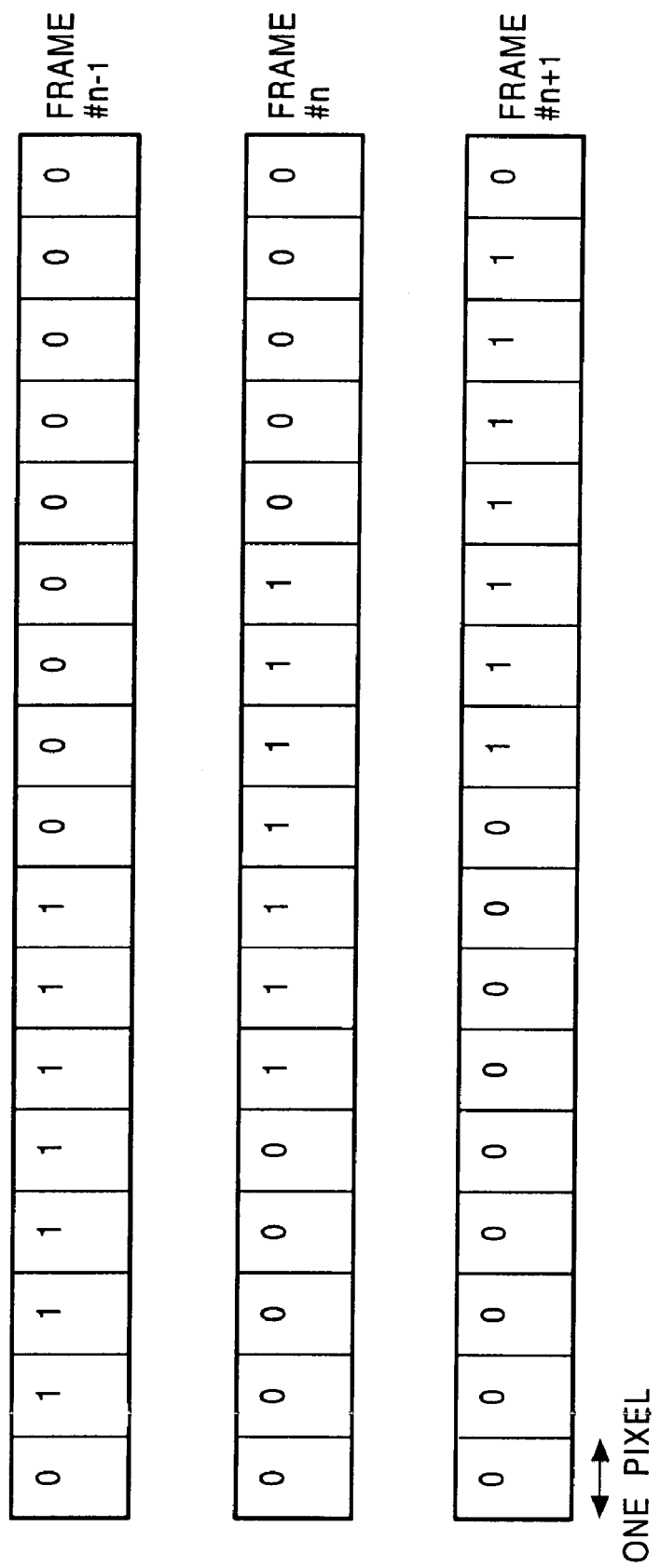
FIG. 36 is a diagram showing a motion compensation by a motion compensation unit 161.
Figure 37:
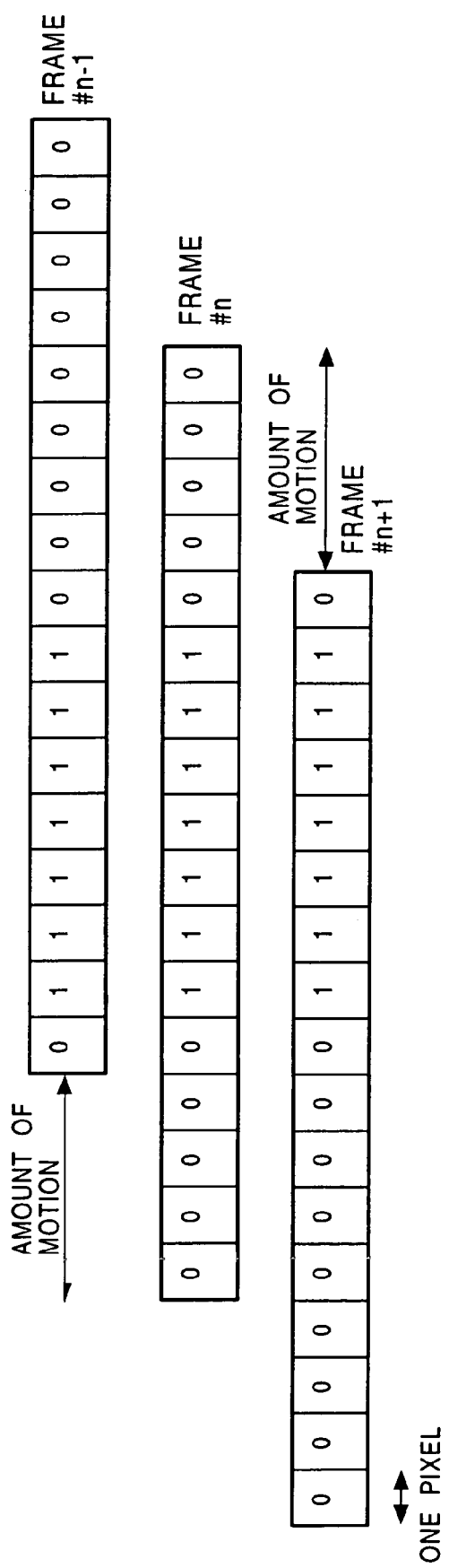
FIG. 37 is a diagram showing a motion compensation by a motion compensation unit 161.

Motion compensation by the motion compensation unit 161 will be described with reference to examples in FIGS. 36 and 37. For example, when areas in the frame #n are determined, if binary object pictures of the frames #n−1, #n, and #n+1, an example of which is shown in FIG. 36, are input, the motion compensation unit 161, based on the motion vector supplied from the motion detection unit 102, motion-compensates the binary object picture of the frame #n−1 and the binary object picture of the frame #n+1, an example of which is shown in FIG. 37, and supplies the motion-compensated binary object pictures to the switch 162.

The switch 162 outputs the motion-compensated binary object picture of the first frame to a frame memory 163-1, and outputs the motion-compensated binary object picture of the second frame to a frame memory 163-2. Similarly, the switch 162 outputs each of the motion-compensated binary object pictures of the third to the (N−1)-th frames to one of frame memories 163-3 to 163-(N−1), and outputs the motion-compensated binary object picture of the N-th frame to a frame memory 163-N.

The frame memory 163-1 stores the motion-compensated binary object picture of the first frame, and outputs the stored binary object picture to a weighting unit 164-1. The frame memory 163-2 stores the motion-compensated binary object picture of the second frame, and outputs the stored binary object picture to a weighting unit 164-2.

Similarly, each of the frame memories 163-3 to 163-(N−1) stores one of the motion-compensated binary object pictures of the third to the (N−1)-th frames, and outputs the stored binary object picture to one of weighting units 164-3 to 164-(N−1). The frame memory 163-N stores the motion-compensated binary object picture of the N-th frame, and outputs the stored binary object picture to a weighting unit 164-N.

The weighting unit 164-1 multiplies the pixel values of the motion-compensated binary object picture of the first frame, supplied from the frame memory 163-1, by a predetermined weight w1, and supplies the result to an accumulation unit 165. The weighting unit 164-2 multiplies the pixel values of the motion-compensated binary object picture of the second frame, supplied from the frame memory 163-2, by a predetermined weight w2, and supplies the result to the accumulation unit 165.

Similarly, each of the weighting units 164-3 to 164-(N−1) multiplies the pixel values of one of the motion-compensated binary object pictures of the third to the (N−1)-th frames, supplied from one of the frame memories 163-3 to 163-(N−1), by one of predetermined weights w3 to w(N−1), and supplies the result to the accumulation unit 165. The weighting unit 164-N multiplies the pixel values of the motion-compensated binary object picture of the N-th frame, supplied from the frame memory 163-N, by a predetermined weight wN, and supplies the result to the accumulation unit 165.

The accumulation unit 165 accumulates the corresponding pixel values of the binary object pictures of the first to the N-th frames, having been motion-compensated and each having been multiplied by one of the weights w1 to wN, and compares the accumulated pixel values with a predetermined threshold value th0, thereby generating a binary object picture.

As described above, the robustization unit 151 generates a robustized binary object picture from N binary object pictures, and supplies it to the temporal change detection unit 123. Accordingly, even if the input picture includes noise, the area specifying unit 103 having the construction shown in FIG. 34 is capable of specifying areas more accurately compared with the case shown in FIG. 22.

Figure 32:
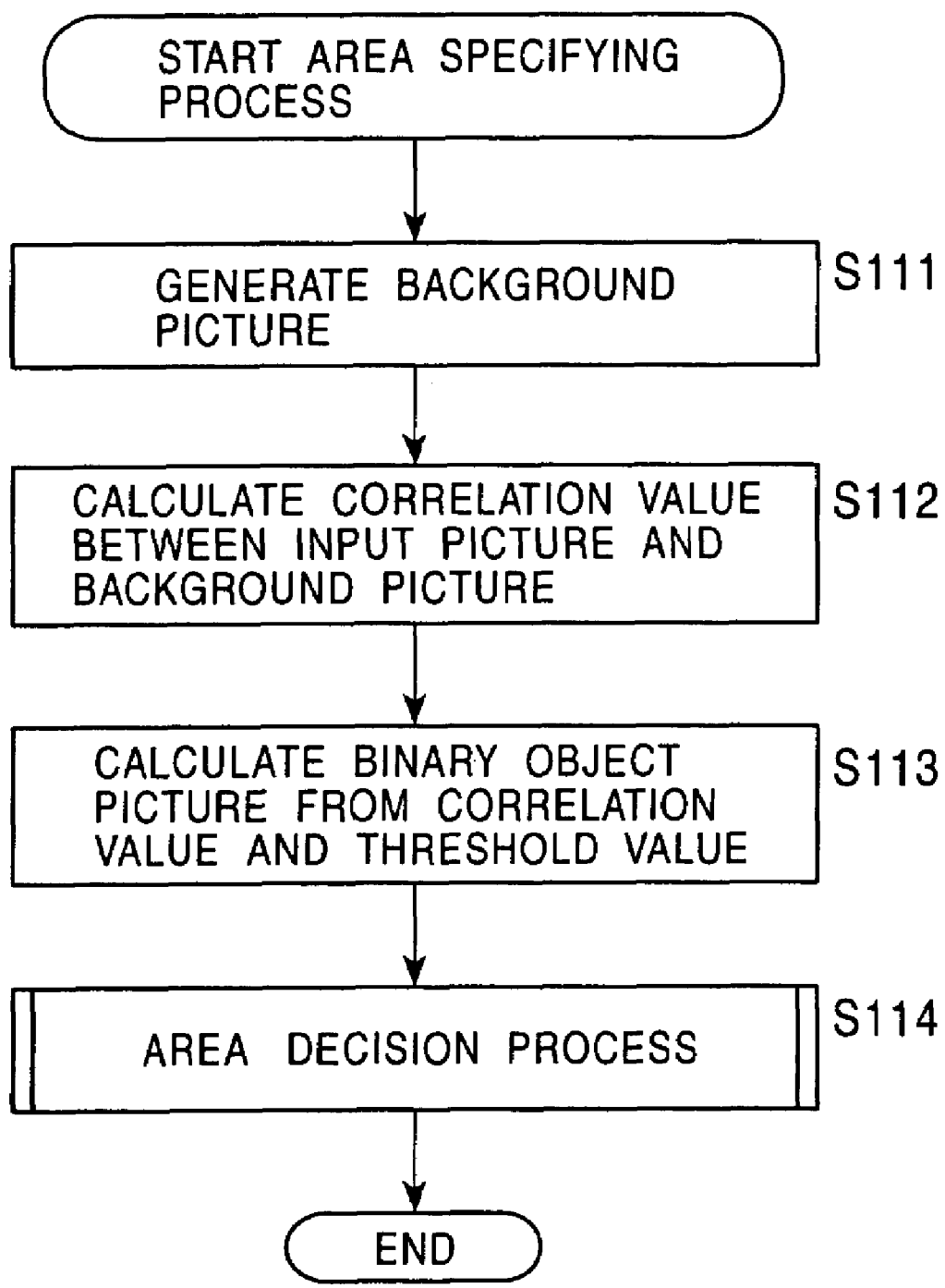
FIG. 32 is a flowchart showing an area specifying process by the area specifying unit 103.
Figure 38:
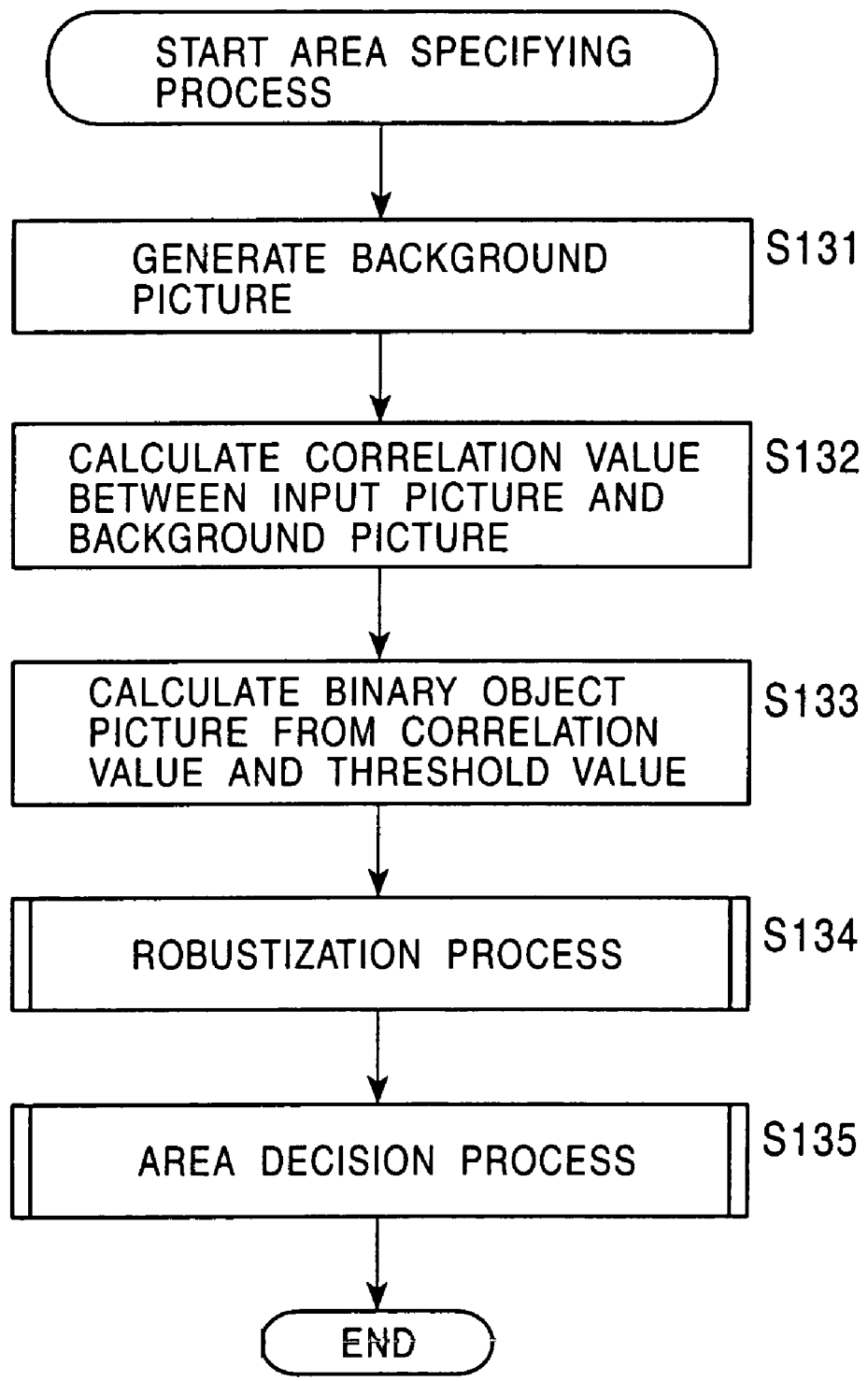
FIG. 38 is a flowchart showing an area specifying process.

Next, the process for specifying areas by the area specifying unit 103 having the construction shown in FIG. 34 will be described with reference to a flowchart in FIG. 38. The processes in steps S131 to S133 are the same as those in steps S111 to S113, respectively, described with the flowchart in FIG. 32, and thus descriptions thereof will be omitted.

In step S134, the robustization unit 151 executes a robustization process.

Figure 33:
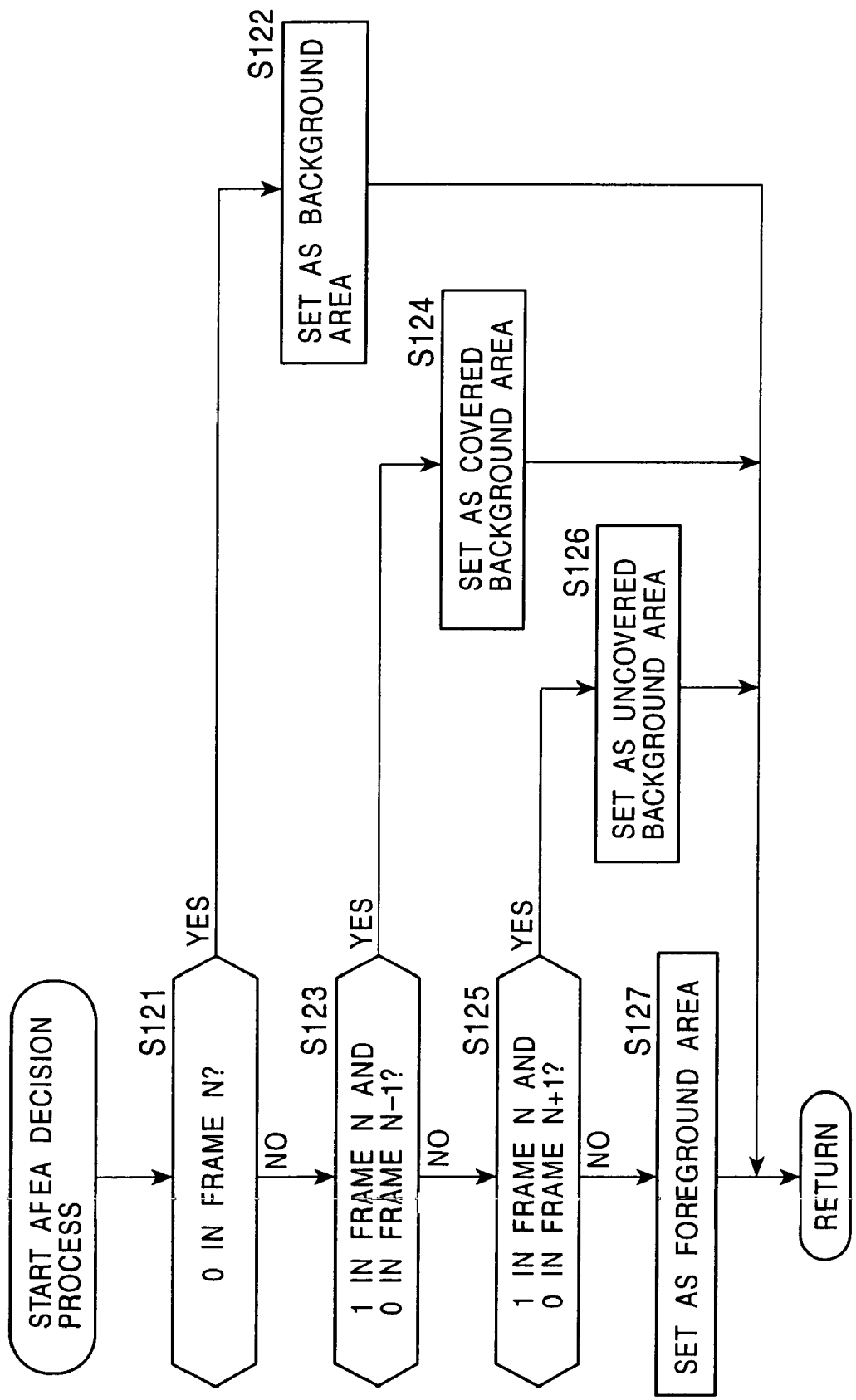
FIG. 33 is a flowchart showing the details of an area decision process.

In step S135, the temporal change detection unit 123 executes an area decision process, and the process is exited. The details of the process in step S135 are the same as those in the process described with reference to the flowchart in FIG. 33, and thus descriptions thereof will be omitted.

Figure 39:
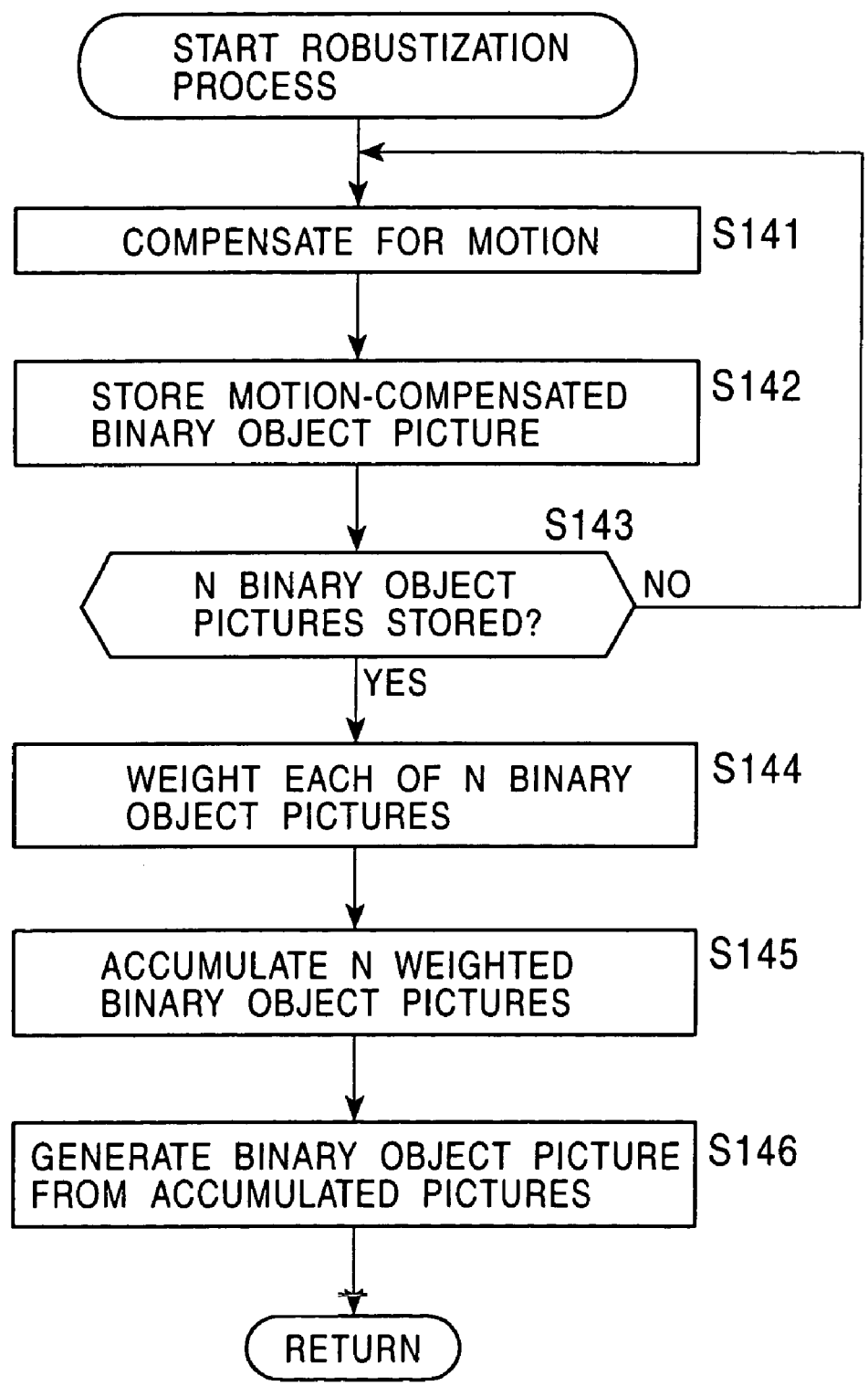
FIG. 39 is a flowchart showing the details of a robustization process.

Next, with reference to a flowchart shown in FIG. 39, a robustization process, corresponding to the process in step S134 in FIG. 38, will be described. In step S141, the motion compensation unit 161 executes a motion compensation process for a binary object picture that has been input, based on the motion vector and its position information supplied from the motion detection unit 102. In step S142, one of the frame memories 163-1 to 163-N stores the motion-compensated binary object picture supplied via the switch 162.

In step S143, the robustization unit 151 determines whether N binary object pictures have been stored. If it is determined that N binary object pictures have not been stored, the process returns to step S141, repeating the process for motion-compensating a binary object picture and the process for storing the binary object picture.

If it is determined in step S143 that N binary object pictures have been stored, the process proceeds to step S144, in which each of the weighting units 164-1 to 164-N multiplies each of the N binary object pictures with one of the weights w1 to wN for weighting.

In step S145, the accumulation unit 165 accumulates the weighted N binary objected pictures.

In step S146, the accumulation unit 165 generates a binary object picture from the accumulated picture, for example, by a comparison with a predetermined threshold value th1, and the process is exited.

As described above, the area specifying unit 103 having the construction shown in FIG. 34 is capable of generating area information based on a robustized binary object picture.

As described above, the area specifying unit 103 is capable of generating area information for each pixel included in a frame, indicating to which of a moving area, a still area, an uncovered background area, or a covered background area the pixel belongs.

The area specifying unit 103 may apply a logic OR operation on area information corresponding to an uncovered background area and area information corresponding to a covered background area to generate area information corresponding to a mixed area, generating area information for each pixel included in a frame, consisting of a flag indicating to which of a moving area, a still area, or a mixed area the pixel belongs.

The area specifying unit 103 is capable of outputting area information indicating a moving area as area information indicating a foreground area, and area information indicating a still area as area information indicating a background area.

Figure 40:
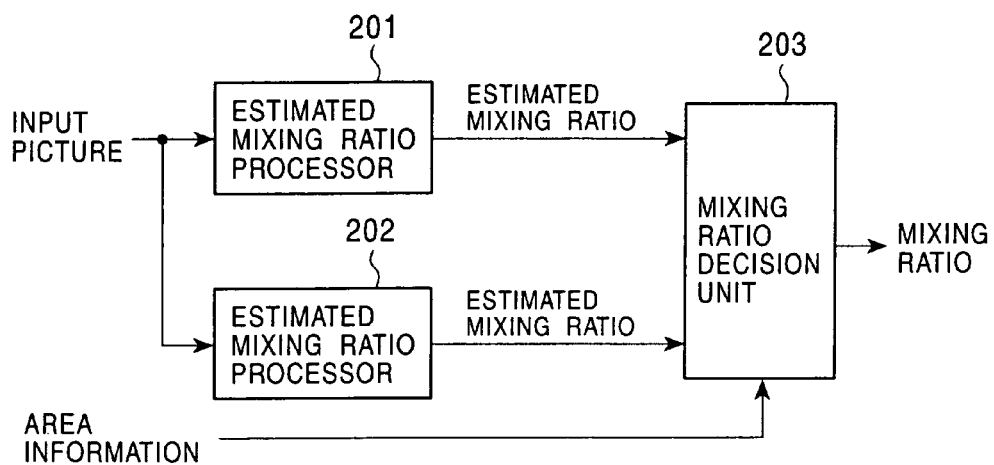
FIG. 40 is a block diagram showing an example construction of a mixing ratio calculating unit 104.

FIG. 40 is a block diagram showing an example construction of the mixing ratio calculating unit 104. An estimated mixing ratio processor 201 calculates, based on the input picture, an estimated mixing ratio for each pixel by a calculation corresponding to the model of covered background area, and supplies the estimated mixing ratio thus calculated to a mixing ratio decision unit 203.

An estimated mixing ratio processor 202 calculates, based on the input picture, an estimated mixing ratio for each pixel by a calculation corresponding to the model of uncovered background area, and supplies the estimated mixing ratio thus calculated to the mixing ratio decision unit 203.

Since the object corresponding to the foreground can be assumed as moving at a constant velocity during the shutter time, the mixing ratio α of a pixel belonging to a mixed area has the following properties. That is, the mixing ratio α changes linearly in accordance with change in the pixel position. If the change in the pixel position is one dimensional, the change in the mixing ratio α can be represented as a linear line; whereas is the change in the pixel position is two dimensional, the change in the mixing ratio α can be represented as a plane.

Since one frame is a short period of time, the object corresponding to the foreground can be assumed as a rigid body moving at a constant velocity.

In this case, the tilt of the mixing ratio α is the inverse ratio of the amount of movement v of the foreground.

Figure 41:
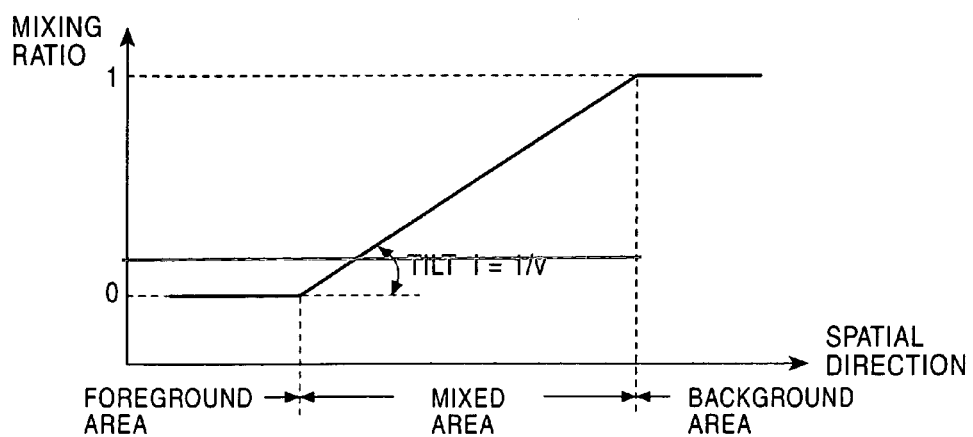
FIG. 41 shows an example of an ideal mixing ratio $\alpha$.

FIG. 41 shows an example of ideal mixing ratio α. The tilt 1 of the ideal mixing ratio α in a mixed area can be represented as a reciprocal of the amount of movement v.

As shown in FIG. 41, the ideal mixing ratio α has a value of one in a background area, a value of zero in a foreground area, and a value greater than zero and smaller than one in a mixed area.

Figure 42:
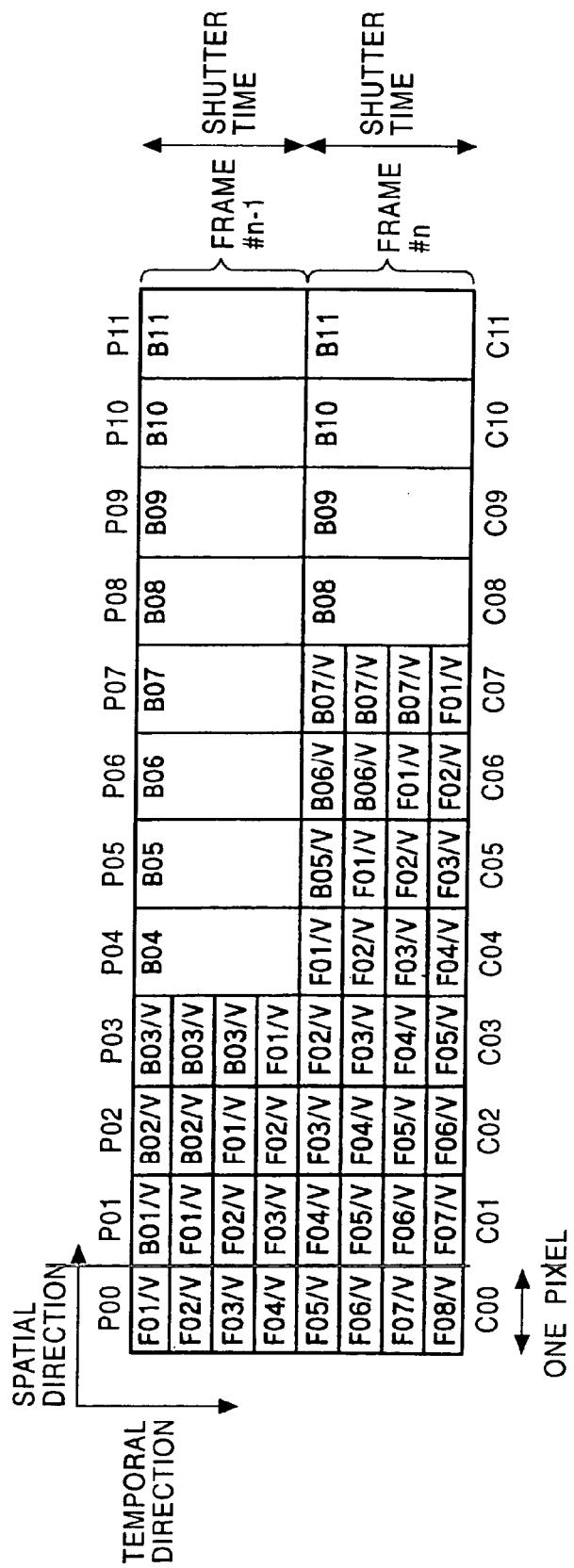
FIG. 42 is a model diagram in which pixel values are expanded along the temporal direction and in which a period corresponding to a shutter time is split.

In an example shown in FIG. 42, the pixel value C06 of the seventh pixel from the left in the frame #n can be represented by equation (8) using the pixel value P06 of the seventh pixel from the left in the frame #n−1:

$$C06 = B06/v + B06/v + F01/v + F02/v \quad (8)$$
$$= P06/v + P06/v + F01/v + F02/v$$
$$= 2/v \cdot P06 + \sum_{i=1}^{2} Fi/v$$

In equation (8), the pixel value C06 is denoted as a pixel value M of a pixel in a mixed area, while the pixel value P06 is denoted as a pixel value B of a pixel in a background area. That is, the pixel value M of the pixel in the mixed area and the pixel value B of the pixel in the background can be expressed by equations (9) and (10), respectively:

$$M = C06 \quad (9)$$
$$B = P06 \quad (10)$$

In equation (8), 2/v corresponds to the mixing ratio α. Since the amount of movement v is four, the mixing ratio α for the seventh pixel from the left in the frame #n is 0.5.

By considering a pixel value C of the frame #n under consideration as a pixel value of the mixed area and a pixel value P of the frame #n−1 preceding the frame #n as a pixel value of the background area, equation (3) indicating the mixing ratio α can be rewritten as equation (11):

$$C = \alpha \cdot P + f \quad (11)$$

In equation (11), f denotes $\Sigma_i Fi/v$, the sum of foreground components included in the pixel under consideration. In equation (11), two variables are included; namely, the mixing ratio α and the sum f of foreground components.

Figure 43:
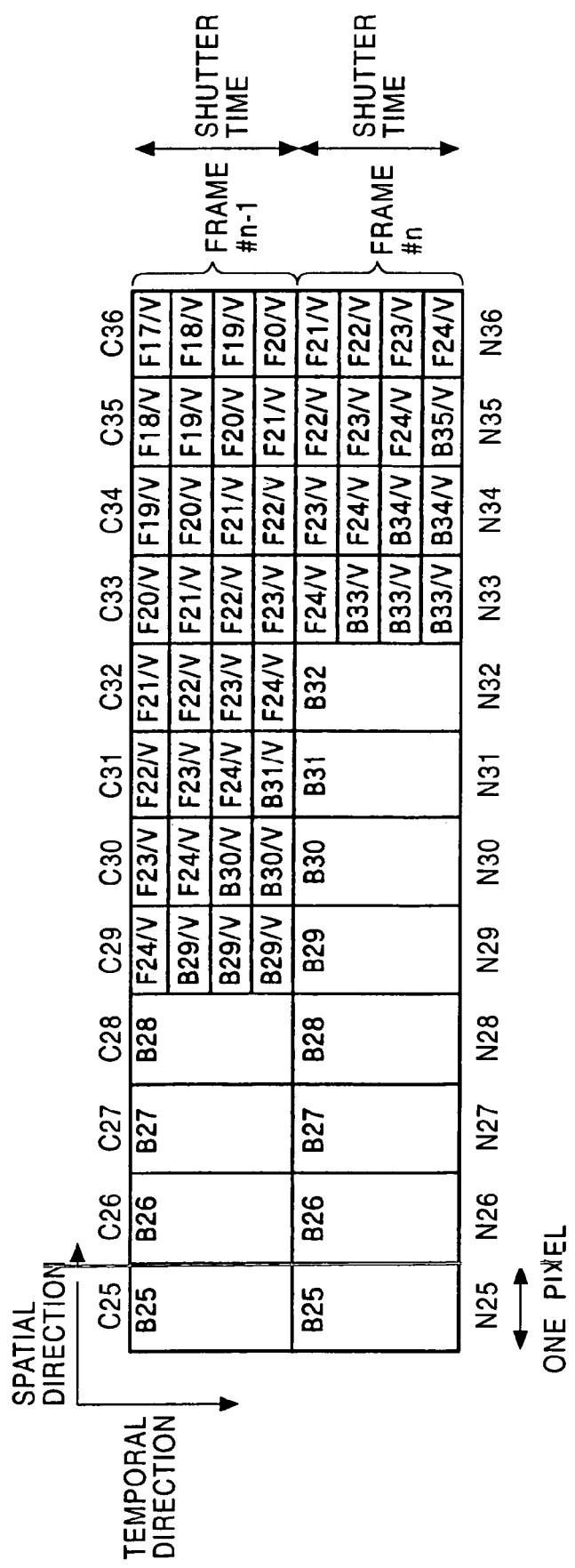
FIG. 43 is a model diagram in which pixel values are expanded along the temporal direction and in which a period corresponding to a shutter time is split.

Similarly, FIG. 43 shows a model in which pixel values are expanded along the temporal direction, with the amount of movement v in an uncovered background area being four and the virtual split number along the temporal direction being four.

In the uncovered background area, similarly to the expression for the covered background area described above, by considering a pixel value C of the frame #n under consideration as a pixel value in the mixed area and a pixel value N of the frame #n+1 next to the frame #n as a pixel value of the background area, equation (3) indicating the mixing ratio α can be expressed as equation (12):

$$C = \alpha \cdot N + f \quad (12)$$

Although the description has been made assuming that the background object is still, even if the background object is moving, equations (8) to (12) can be applied by using the pixel values of pixels corresponding to the amount of movement v of the background. For example, in FIG. 42, if the amount of movement v of the object corresponding to the background is two and if the virtual split number is two, when the object corresponding to the background is moving rightwards as viewed in the figure, the pixel value B of a pixel in the background area in equation (10) will be a pixel value P04.

Since equations (11) and (12) each include two variables, the mixed ratio α cannot be obtained directly. Since pictures generally exhibit high degrees of spatial correlation, pixels in proximity to each other have substantially the same pixel values.

Figure 44:
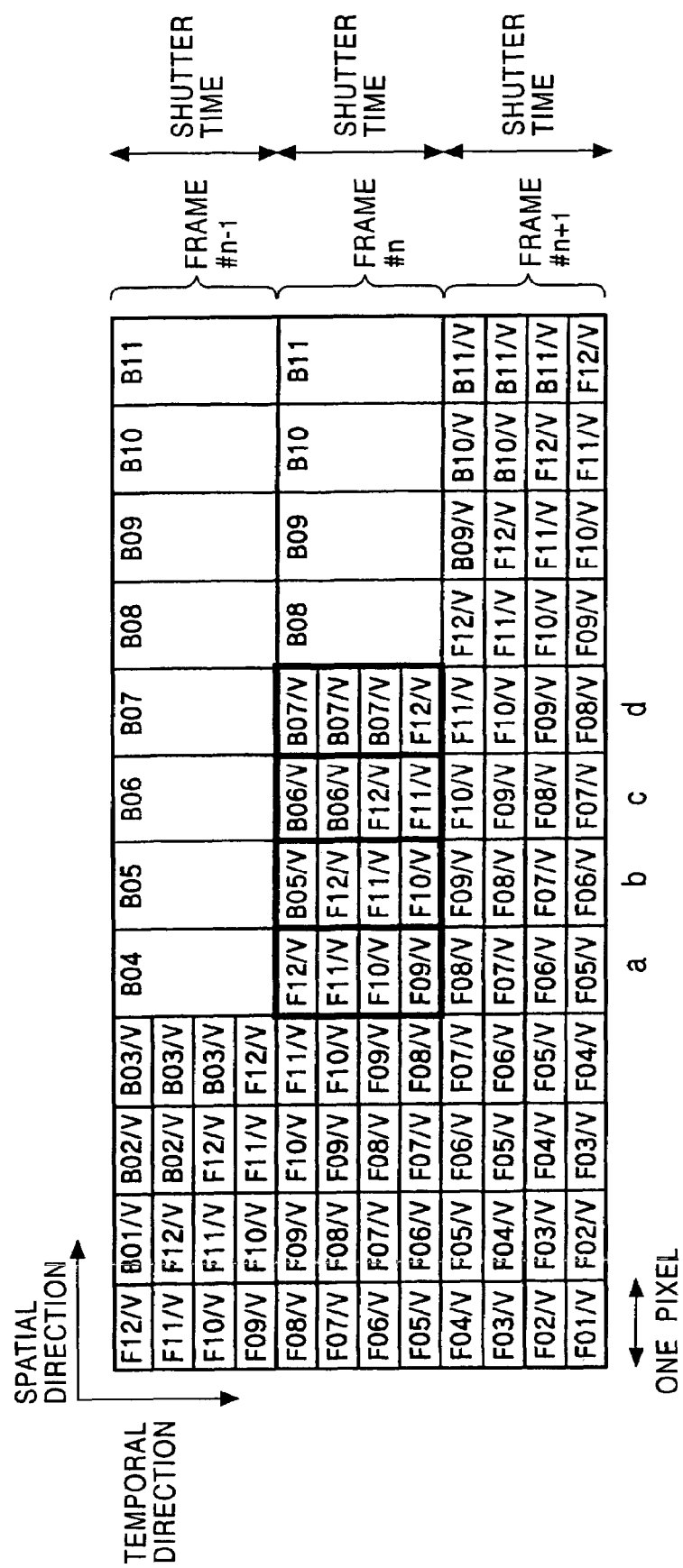
FIG. 44 is a diagram showing an approximation using a correlation of foreground components.

Since foreground components exhibit a high spatial correlation, the mixing ratio α is obtained by modifying the equation so that the sum f of foreground components can be derived from the preceding frame or the next frame. The pixel value Mc of the seventh pixel from the left in the frame #n in FIG. 44 can be expressed by equation (13):

$$Mc = \frac{2}{v} \cdot B06 + \sum_{i=11}^{12} Fi/v \quad (13)$$

The first term 2/v on the right side of equation (13) corresponds to the mixing ratio α. The second term on the right side of equation (13) can be expressed by equation (14) using the pixel value in the subsequent frame #n+1:

$$\sum_{i=11}^{12} Fi/v = \beta \cdot \sum_{i=7}^{10} Fi/v \quad (14)$$

Using spatial correlation of the foreground components, let it be assumed that equation (15) holds:

$$F = F05 = F06 = F07 = F08 = F09 = F10 = F11 = F12 \quad (15)$$

Using equation (15), equation (14) can be rewritten as equation (16):

$$\sum_{i=11}^{12} Fi/v = \frac{2}{v} \cdot F \quad (16)$$
$$= \beta \cdot \frac{4}{v} \cdot F$$

Accordingly, β can be expressed by equation (17):

$$\beta = \frac{2}{4} \quad (17)$$

In general, assuming that the foreground components associated with the mixed area are equal, by the relationship of internal ratios, equation (18) holds for every pixel in the mixed area:

$$\beta = 1 - \alpha \quad (18)$$

If equation (18) holds, equation (11) can be expanded as expressed by equation (19):

$$C = \alpha \cdot P + f \quad (19)$$
$$= \alpha \cdot P + (1-\alpha) \cdot \sum_{i=\gamma}^{\gamma+V-1} Fi/v$$
$$= \alpha \cdot P + (1-\alpha) \cdot N$$

Similarly, if equation (18) holds, equation (12) can be expanded as expressed by equation (20):

$$C = \alpha \cdot N + f \quad (20)$$
$$= \alpha \cdot N + (1-\alpha) \cdot \sum_{i=\gamma}^{\gamma+V-1} Fi/v$$
$$= \alpha \cdot N + (1-\alpha) \cdot P$$

Figure 45:
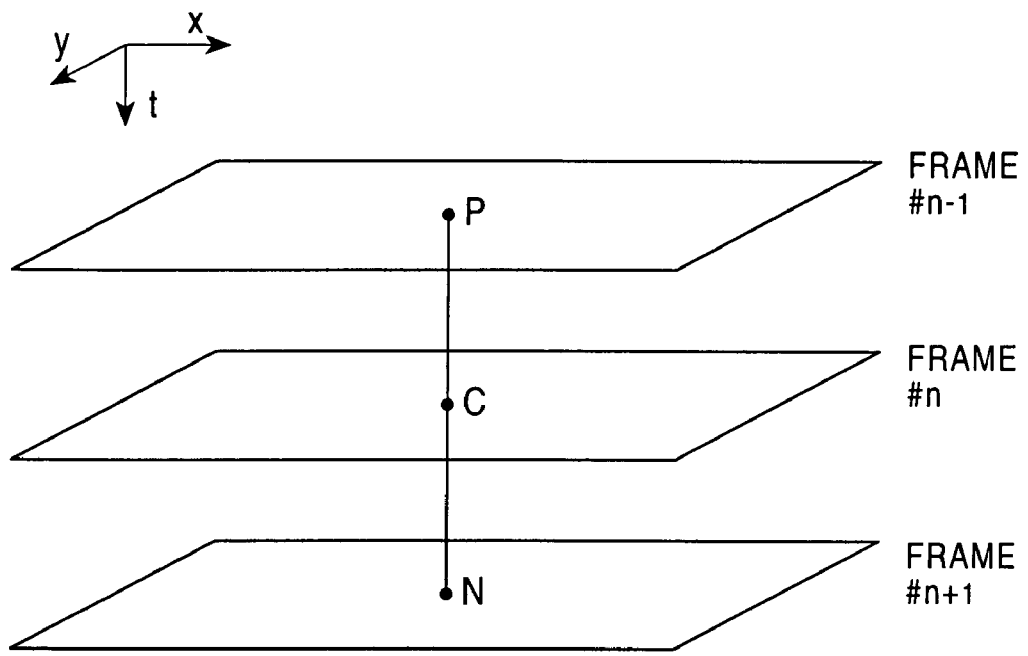
FIG. 45 is a diagram showing the relationships among C, N, and P.

In equations (19) and (20), since C, N, and P are known pixel values, the only variable included in equations (19) and (20) is the mixing ratio α. The relationships among C, N, and P in equations (19) and (20) are shown in FIG. 45. C is the pixel value of a pixel under consideration in the frame #n, for which the mixing ratio α is calculated. N is the pixel value of a pixel in the frame #n+1, which corresponds in position along the spatial direction to that of the pixel under consideration. P is the pixel value of a pixel in the frame #n−1, which corresponds in position along the spatial direction to that of the pixel under consideration.

Thus, since equations (19) and (20) each include one variable, the mixing ratio α can be calculated using the pixel values of the pixels in the three frames. The condition for the correct mixing ratio α to be calculated by solving equations (19) and (20) is that the foreground components associated with the mixed area are equal; that is, in a foreground picture object captured when a foreground object is still, the pixel values of twice the number of contiguous pixels as the amount of movement v, that are positioned at a boundary of the picture object associated with the direction of movement of the foreground object, are constant.

Thus, the mixing ratio α of pixels belonging to a covered background area is calculated by equation (21), while the mixing ratio α of pixels belonging to an uncovered background area is calculated by equation (22):

$$\alpha = (C - N)/(P - N) \quad (21)$$

$$\alpha = (C - P)/(N - P) \quad (22)$$

Figure 46:
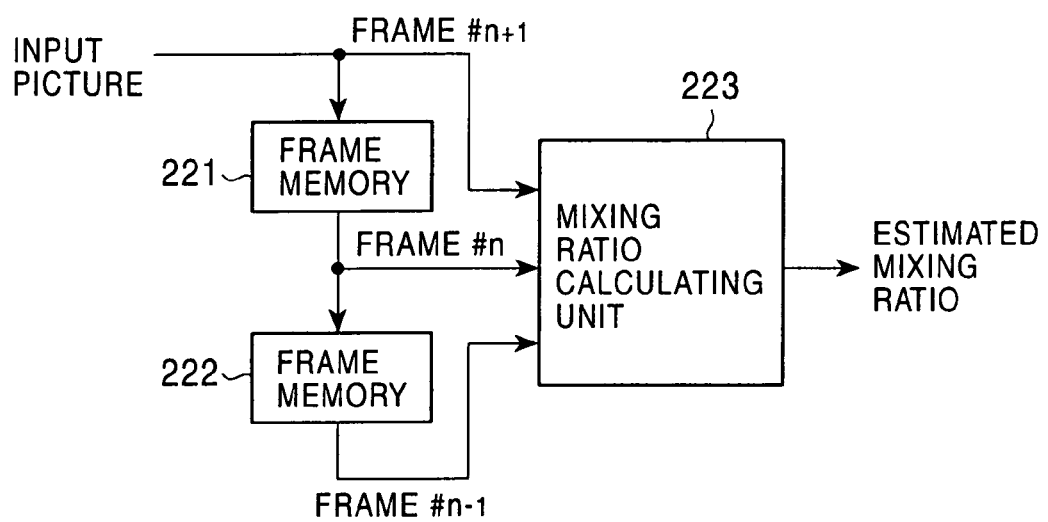
FIG. 46 is a block diagram showing the construction of an estimated mixing ratio processor 201.

FIG. 46 is a block diagram showing a construction of the estimated mixing ratio processor 201. A frame memory 221 stores pictures input thereto, frame by frame, and supplies a frame next to a frame input as an input picture, to a frame memory 222 and to a mixing ratio calculating unit 223.

The frame memory 222 stores pictures input thereto, frame by frame, and supplies a frame next to the frame supplied from the frame memory 221, to the mixing ratio calculating unit 223.

Thus, when the frame #n+1 is being input to the mixing ratio calculating unit 223 as an input picture, the frame memory 221 supplies the frame #n to the mixing ratio calculating unit 223, and the frame memory 222 supplies the frame #n−1 to the mixing ratio calculating unit 223.

The mixing ratio calculating unit 223 calculates an estimated mixing ratio of a pixel under consideration in the frame #n by a calculation expressed in equation (21), based on the pixel value C of the pixel under consideration in the frame #n, the pixel value N of the pixel in the frame #n+1 corresponding in spatial position to the pixel under consideration, and the pixel value P of the pixel in the frame #n−1 corresponding in spatial position to the pixel under consideration, and outputs the estimated mixing ratio thus calculated. For example, if the background is still, the mixing ratio calculating unit 223 calculates the estimated mixing ratio of the pixel under consideration in the frame #n based on the pixel value C of the pixel under consideration in the frame #n, the pixel value N of the pixel in the frame #n+1 at the same position in the frame as the pixel under consideration, and the pixel value P of the pixel in the frame #n−1 at the same position in the frame as the pixel under consideration, and outputs the estimated mixing ratio thus calculated.

As described above, the estimated mixing ratio processor 201 is capable of calculating an estimated mixing ratio based on an input picture and supplying it to the mixing ratio decision unit 203.

The estimated mixing ratio processor 202 is the same as the estimated mixing ratio processor 201 except that while the estimated mixing ratio processor 201 calculates an estimated mixing ratio of a pixel under consideration by a calculation expressed by equation (21), the estimated mixing ratio processor 202 calculates an estimated mixing ratio of a pixel under consideration by a calculation expressed by equation (22), and thus description thereof will be omitted.

Figure 47:
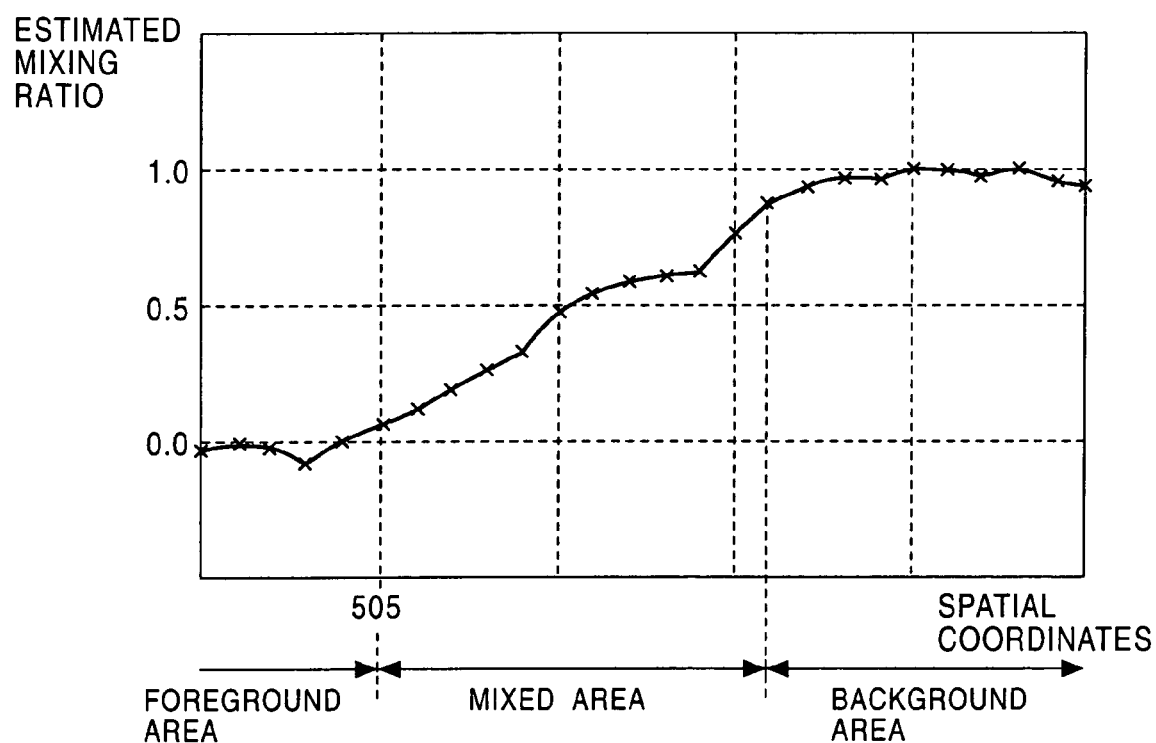
FIG. 47 is a diagram showing an example of estimated mixing ratio.

FIG. 47 is a diagram showing an example of estimated mixing ratio calculated by the estimated mixing ratio processor 201. The estimated mixing ratio shown in FIG. 47 shows the result for one line in a case where the amount of movement v of the foreground corresponding to an object moving at a constant velocity is eleven.

As will be understood from FIG. 41, the estimated mixing ratio is changing substantially linearly in the mixed area.

Referring back to FIG. 40, the mixing ratio decision unit 203 sets a mixing ratio α based on the area information supplied from the area specifying unit 103, indicating to which of a foreground area, a background area, a covered background area, or an uncovered background area the pixel for which the mixing ratio α is to be calculated belongs. The mixing ratio decision unit 203 sets zero as the mixing ratio α if the pixel under consideration belongs to a foreground area, sets one as the mixing ratio α if the pixel under consideration belongs to a background area, sets the estimated mixing ratio supplied from the estimated mixing ratio processor 201 as the mixing ratio α if the pixel under consideration belongs to a covered background area, and sets the estimated mixing ratio supplied from the estimated mixing ratio processor 202 as the mixing ratio α if the pixel under consideration belongs to an uncovered background area. The mixing ratio decision unit 203 outputs the mixing ratio α that has been set based on the area information.

Figure 48:
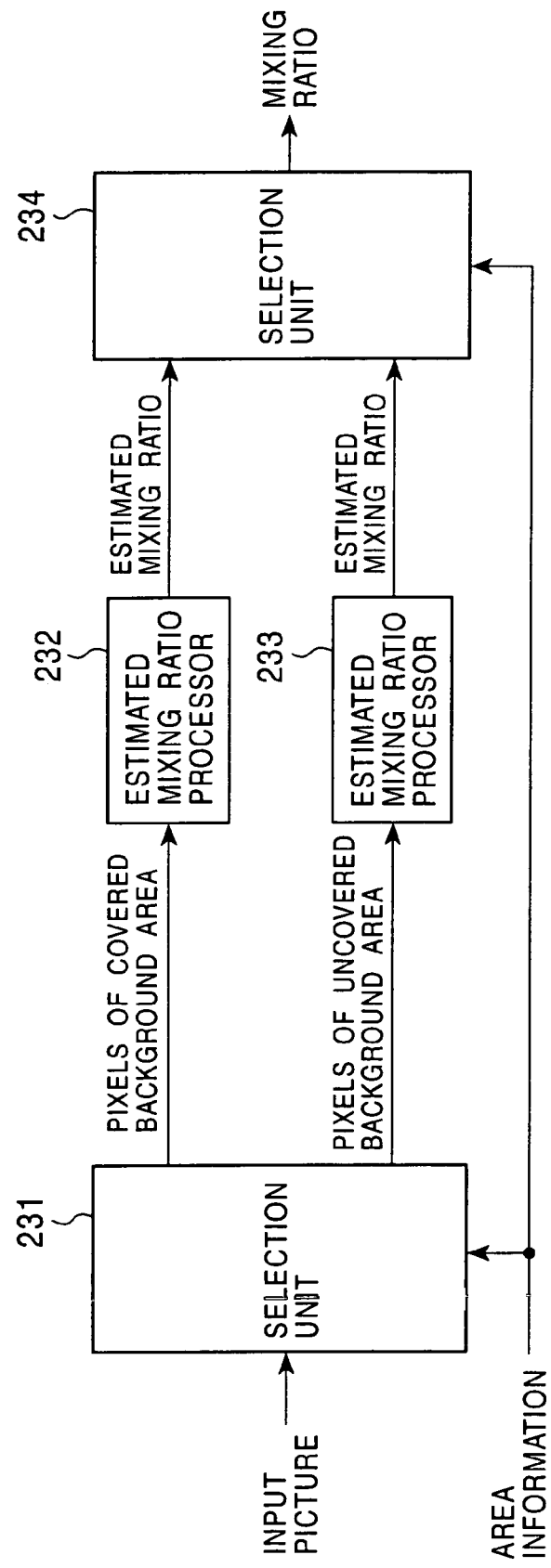
FIG. 48 is a block diagram showing another construction of the mixing ratio calculating unit 104.

FIG. 48 is a block diagram showing another construction of the mixing ratio calculating unit 104. A selection unit 231 supplies, based on the area information supplied from the area specifying unit 103, a pixel belonging to a covered background area and a corresponding pixel in the preceding and the subsequent frames to an estimated mixing ratio processor 232. The selection unit 231 supplies, based on the area information supplied from the area specifying unit 103, a pixel belonging to an uncovered background area and a corresponding pixel in the preceding and the subsequent frames to an estimated mixing ratio processor 233.

The estimated mixing ratio processor 232 calculates an estimated mixing ratio for the pixel under consideration belonging to the covered background area, by a calculation expressed by equation (21) based on the pixel value input from the selection unit 231, and supplies the estimated mixing ratio thus calculated to a selection unit 234.

The estimated mixing ratio processor 233 calculates an estimated mixing ratio for the pixel under consideration belonging to the uncovered background area, by a calculation expressed by equation (22) based on the pixel value input from the selection unit 231, and supplies the estimated mixing ratio thus calculated to the selection unit 234.

Based on the area information supplied from the area specifying unit 103, the selection unit 234 selects and sets an estimated mixing ratio of zero as the mixing ratio α if the pixel under consideration belongs to a foreground area, whereas it selects and sets an estimated mixing ratio of one as the mixing ratio α if the pixel under consideration belongs to a background area. The selection unit 234 selects and sets the estimated mixing ratio supplied from the estimated mixing ratio processor 232 as the mixing ratio α if the pixel under consideration belongs to a covered background area, whereas it selects and sets the estimated mixing ratio supplied from the estimated mixing ratio processor 233 as the mixing ratio α if the pixel under consideration belongs to an uncovered background area. The selection unit 234 outputs the mixing ratio α that has been selected and set based on the area information.

As described above, the mixing ratio calculating unit 104 having another construction shown in FIG. 48 is capable of calculating a mixing ratio α for each of the pixels included in a picture and outputting the mixing ratio α thus calculated.

With reference to a flowchart in FIG. 49, a process for calculating a mixing ratio α by the mixing ratio calculating unit 104 having the construction shown in FIG. 40 will be described. In step S151, the mixing ratio calculating unit 104 acquires the area information supplied from the area specifying unit 103. In step S152, the estimated mixing ratio processor 201 calculates an estimated mixing ratio using a model associated with covered background area, and supplies the estimated mixing ratio thus calculated to the mixing ratio decision unit 203. The process for calculating the estimated mixing ratio will be described later in detail with reference to a flowchart in FIG. 50.

In step S153, the estimated mixing ratio processor 202 calculates an estimated mixing ratio using a model associated with covered background area, and supplies the estimated mixing ratio thus calculated to the mixing ratio decision unit 203.

In step S154, the mixing ratio calculating unit 104 determines whether the mixing ratio α has been estimated for the entire frame. If it is determined that the mixing ratio α has not been estimated for the entire frame, the process returns to step S152, executing the process for estimating the mixing ratio α for a next pixel.

If it is determined in step S154 that the mixing ratio α has been estimated for the entire frame, the process proceeds to step S155, in which the mixing ratio decision unit 203 sets a mixing ratio α based on the area information supplied from the area specifying unit 103, indicating to which of a foreground area, a background area, a covered background area, or an uncovered background area a pixel belongs. The mixing ratio decision unit 203 sets zero as the mixing ratio α if the pixel under consideration belongs to a foreground area, sets one as the mixing ratio α if the pixel under consideration belongs to a background area, sets the estimated mixing ratio supplied from the estimated mixing ratio processor 201 if the pixel under consideration belongs to a covered background area, and sets the estimated mixing ratio supplied from the estimated mixing ratio processor 202 if the pixel under consideration belongs to an uncovered background area, and then the process is exited.

As described above, the mixing ratio calculating unit 104 is capable of calculating a mixing ratio α, which is an amount characteristic of each pixel, based on the area information supplied from the area specifying unit 103 and the input picture.

Figure 49:
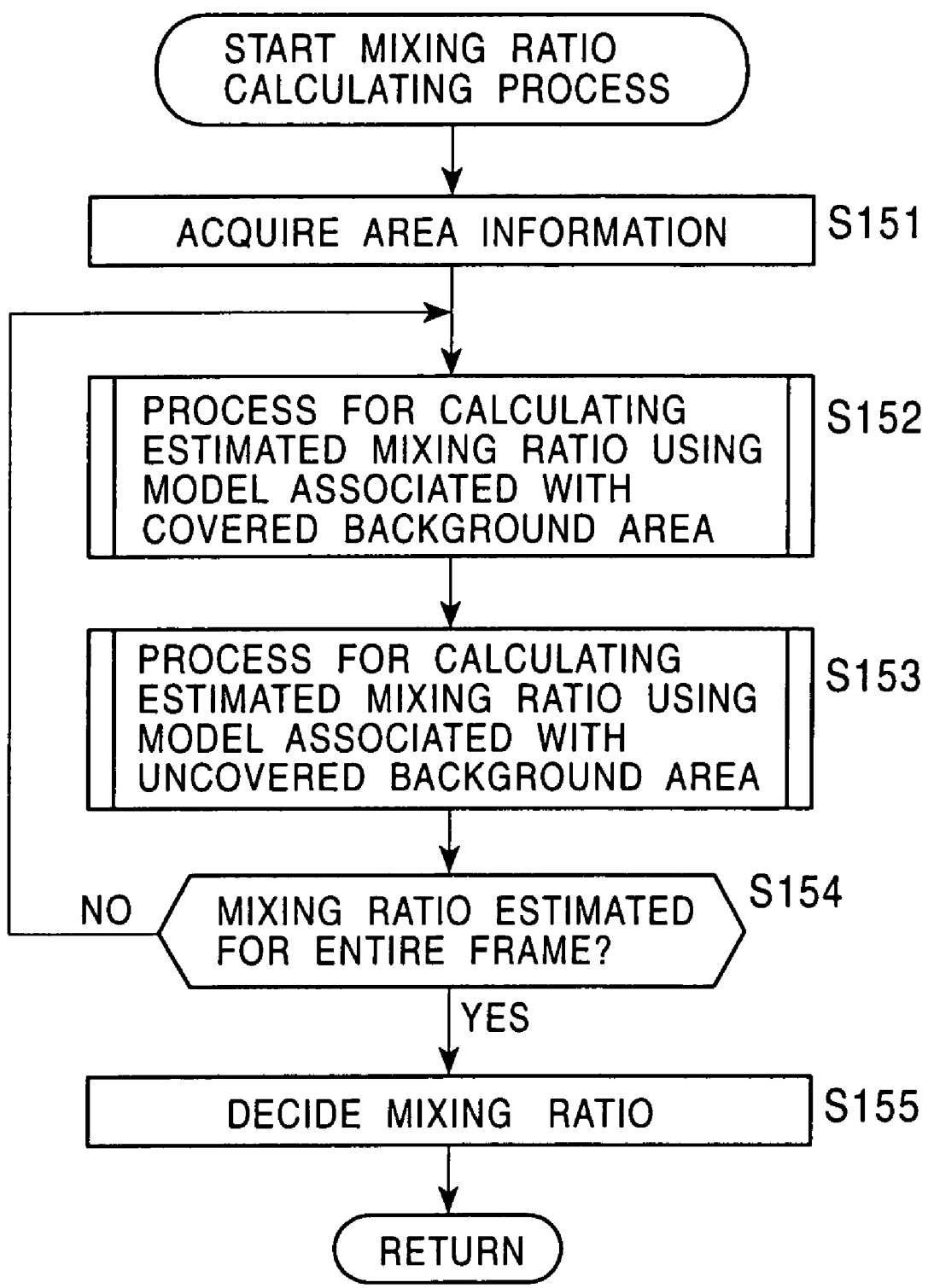
FIG. 49 is a flowchart showing a process for calculating an estimated mixing ratio.

A process for calculating a mixing ratio α by the mixing ratio calculating unit 104 having the construction shown in FIG. 48 is the same as the process described with the flowchart in FIG. 49, and thus description thereof will be omitted.

Next, a process corresponding to step S152 in FIG. 49, for estimating a mixing ratio using a model associated with covered background area, will be described with reference to a flowchart in FIG. 50.

In step S171, the mixing ratio calculating unit 223 acquires the pixel value C of a pixel under consideration in the frame #n from the frame memory 221.

In step S172, the mixing ratio calculating unit 223 acquires the pixel value P of a pixel in the frame #n−1 corresponding to the pixel under consideration from the frame memory 222.

In step S173, the mixing ratio calculating unit 223 acquires the pixel value N of a pixel in the frame #n+1 corresponding to the pixel under consideration included in the input picture.

In step S174, the mixing ratio calculating unit 223 calculates an estimated mixing ratio based on the pixel value C of the pixel under consideration in the frame #n, the pixel value P of the pixel in the frame #n−1, and the pixel value N of the pixel in the frame #n+1.

In step S175, the mixing ratio calculating unit 223 determines whether the process for calculating an estimated mixing ratio has been completed for the entire frame. If it is determined that the process for calculating an estimated mixing ratio has not been completed for the entire frame, the process returns to step S171, repeating the process for calculating an estimated mixing ratio for a next pixel.

If it is determined in step S175 that the process for calculating an estimated mixing ratio has been completed for the entire frame, the process is exited.

As described above, the estimated mixing ratio processor 201 is capable of calculating an estimated mixing ratio based on the input picture.

Figure 50:
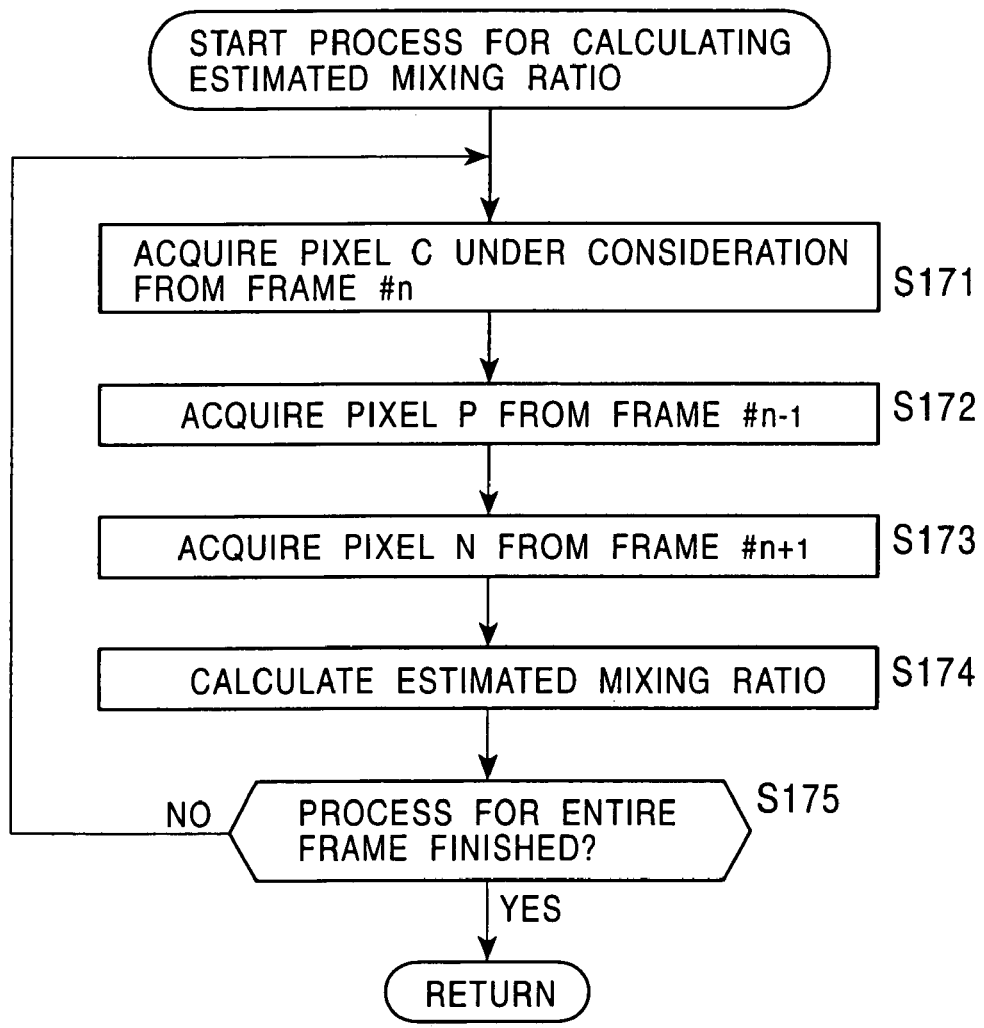
FIG. 50 is a flowchart showing a process for calculating an estimated mixing ratio.

A process for estimating a mixing ratio using the model associated with uncovered background area in step S153 in FIG. 49 is the same as the process using the equation associated with the model for uncovered background area, shown in the flowchart in FIG. 50, and thus description thereof will be omitted.

Since the estimated mixing ratio processor 232 and the estimated mixing ratio processor 233 shown in FIG. 48 calculate an estimated mixing ratio by executing the same process as in the flowchart shown in FIG. 50, and thus description thereof will be omitted.

Furthermore, although the description has been made in relation to an object corresponding to a background being still, the above-described process for calculating a mixing ratio α can also be applied even if a picture corresponding to a background includes motion. For example, if a picture corresponding to a background area is moving uniformly, the estimated mixing ratio processor 201 shifts the entire picture in accordance with the movement of the background, and performs the same process as the case of an object corresponding to a background being still. If the picture corresponding to the background area includes movements that differ locally, the estimated mixing ratio processor 201 selects a pixel in accordance with a movement of the background as a pixel corresponding to a pixel belonging to a mixed area, and executes the above-described process.

The constructions of the mixing ratio calculating unit 104 shown in FIGS. 40 and 48 are examples.

The mixing ratio calculating unit 104 may alternatively execute only the process for estimating a mixing ratio using the model associated with covered background area for each of the pixels, outputting the estimated mixing ratio thus calculated as the mixing ratio α. In that case, the mixing ratio α indicates the proportion of background components for a pixel belonging to a covered background area and indicates the proportion of foreground components for a pixel belonging to an uncovered background area. By calculating the absolute value of the difference between the mixing ratio α thus calculated and 1 and setting the absolute value thus calculated as the mixing ratio α, the signal processor 12 can obtain the mixing ratio α indicating the proportion of background components for a pixel belonging to an uncovered background area.

Similarly, the mixing ratio calculating unit 104 may execute only the process for estimating a mixing ratio using a model associated with uncovered background area for each of the pixels, outputting the estimated mixing ratio thus calculated as the mixing ratio α.

Figure 51:
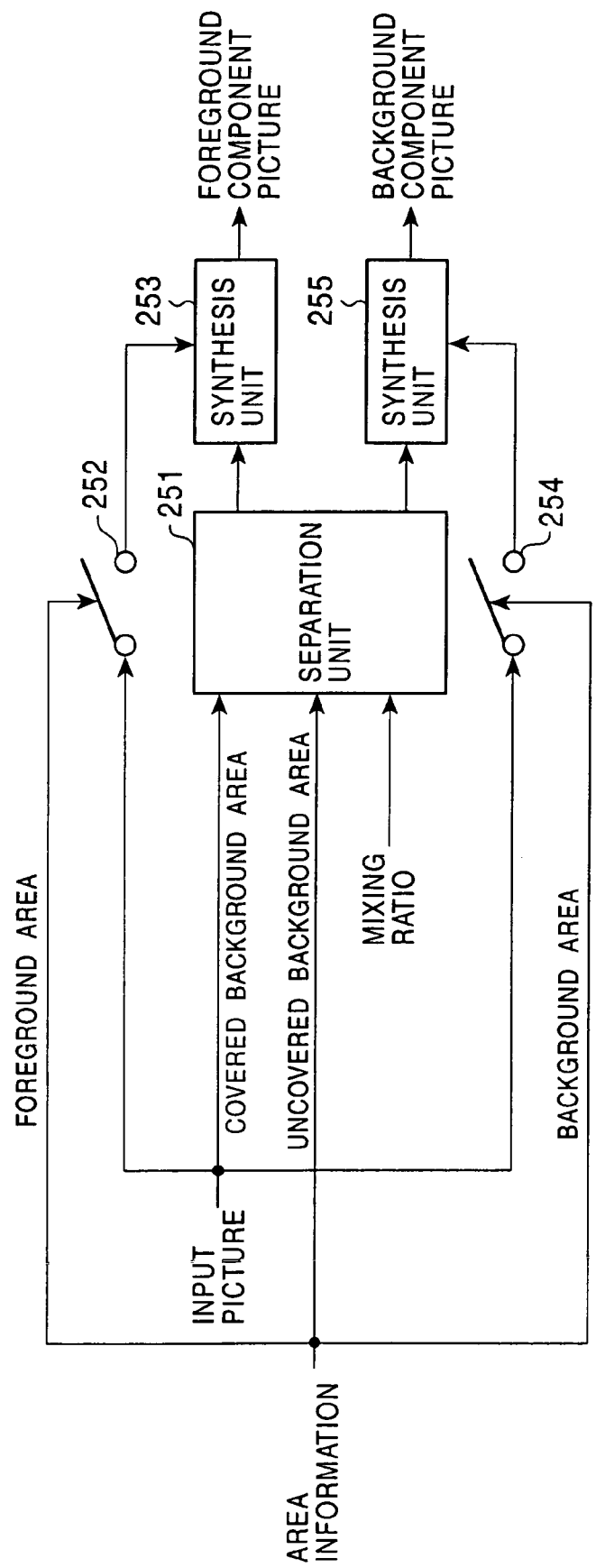
FIG. 51 is a block diagram showing an example construction of a foreground/background separation unit 105.

Next, the foreground/background separation unit 105 will be described. FIG. 51 is a block diagram showing an example construction of the foreground/background separation unit 105. An input picture supplied to the foreground/background separation unit 105 is supplied to a separation unit 251, a switch 252, and to a switch 254. Information indicating a covered background area, and area information indicating an uncovered background area, supplied from the area specifying unit 103, are supplied to the separation unit 251. Information indicating a foreground area is supplied to the switch 252. Information indicating a background area is supplied to the switch 254.

The mixing ratio α supplied from the mixing ratio calculating unit 104 is supplied to the separation unit 251.

The separation unit 251 separates foreground components from the input picture based on the area information indicating a covered background area, the area information indicating an uncovered background area, and the mixing ratio α, and supplies the separated foreground components to a synthesis unit 253, and also separates background components from the input picture and supplies the separated background components to a synthesis unit 255.

The switch 252 is closed when a pixel corresponding to the foreground is input based on the area information indicating a foreground area, supplying only pixels corresponding to the foreground included in the input picture to the synthesis unit 253.

The switch 254 is closed when a pixel corresponding to the background is input based on the area information indicating a background area, supplying only pixels corresponding to the background included in the input picture to the synthesis unit 255.

The synthesis unit 253 synthesizes a foreground component picture based on the components corresponding to the foreground supplied from the separation unit 251 and the pixels corresponding to the foreground supplied from the switch 252, outputting the synthesized foreground component picture. Since the foreground area and the mixed area do not overlap, for example, the synthesis unit 253 applies a logic OR operation on the components corresponding to the foreground and the pixels corresponding to the foreground to synthesize the foreground component picture.

In an initialization process executed at the beginning of the process for synthesizing the foreground component picture, the synthesis unit 253 stores a picture with pixel values of all 0s in an internal frame memory, and stores (overwrites) the foreground component picture in the process for synthesizing the foreground component picture. Thus, in the foreground component picture output by the synthesis unit 253, pixel values of 0s are set in the pixels corresponding to the background area.

The synthesis unit 255 synthesizes a background component picture based on the components corresponding to the background supplied from the separation unit 251 and the pixels corresponding to the background supplied from the switch 254, outputting the synthesized background component picture. Since the background area and the mixed area do not overlap, for example, the synthesis unit 255 applies a logic OR operation on the components corresponding to the background and the pixels corresponding to the background to synthesize the foreground component picture.

In an initialization process executed at the beginning of the process for synthesizing the background component picture, the synthesis unit 255 stores a picture with pixel values of all 0s in an internal frame memory, and stores (overwrites) the background component picture in the process for synthesizing the background component picture. Thus, in the background component picture output by the synthesis unit 255, pixel values of 0s are set in the pixels corresponding to the foreground area.

Figure 52B:
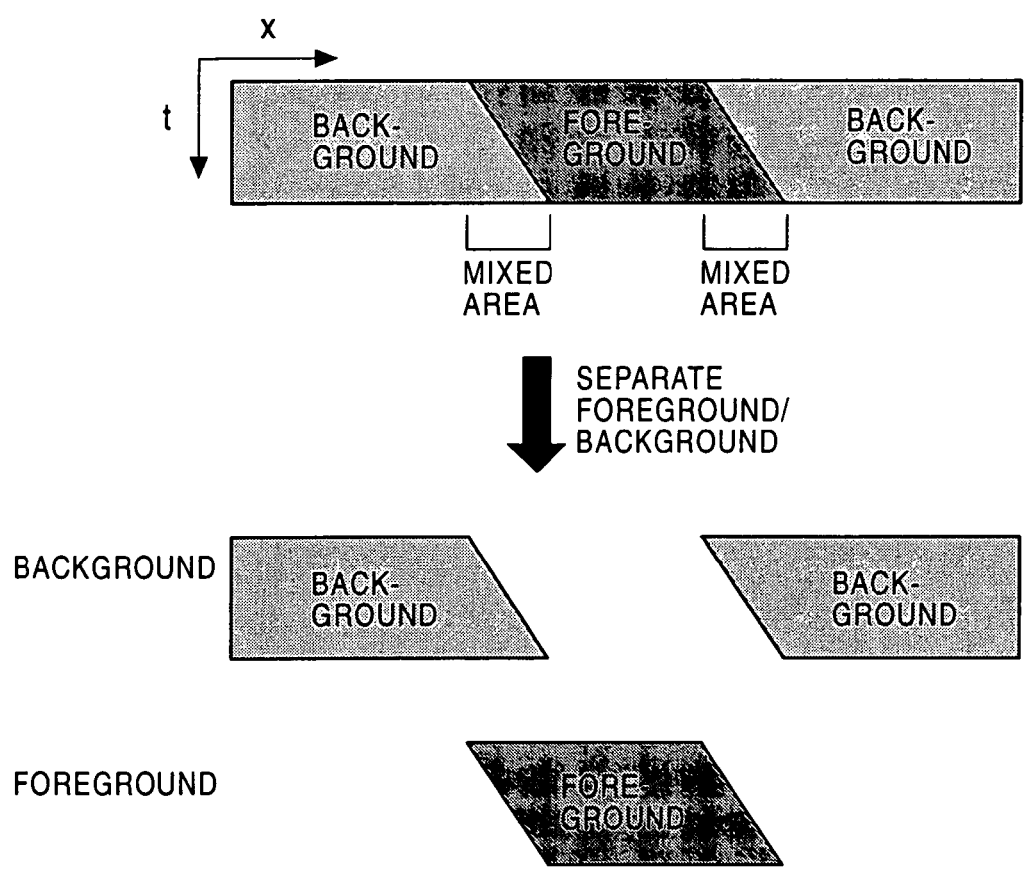
FIG. 52B is a diagram showing a model associated with the input picture, the foreground component picture, and the background component picture.

FIG. 52A is a schematic diagram of a picture being displayed, and FIG. 52B is a model diagram corresponding to FIG. 52A, in which a line of pixels, including pixels belonging to a fore foreground area, pixels belonging to a background area, and pixels belonging to a mixed area, are expanded along the temporal direction.

As shown in FIGS. 52A and 52B, the background component picture output from the foreground/background separation unit 105 is made up of pixels belonging to the background area and background components included in pixels of the mixed area.

As shown in FIGS. 52A and 52B, the foreground component picture output from the foreground/background separation unit 105 is made up of pixels belonging to the foreground area and foreground components included in pixels of the mixed area.

The pixel values of the pixels of the mixed area are separated by the foreground/background separation unit 105 into background components and foreground components. The separated background components constitute the background component picture together with the pixels belonging to the background area. The separated foreground components constitute the foreground component picture together with the pixels belonging to the foreground area.

As described above, in the foreground component picture, the pixel values of the pixels corresponding to the background area are set to 0, while meaningful pixel values are set in the pixels corresponding to the foreground area and to the pixels corresponding to the mixed area. Similarly, in the background component picture, the pixel values of the pixels corresponding to the foreground area are set to 0, while meaningful pixel values are set in the pixels corresponding to the background area and to the pixels corresponding to the mixed area.

Next, a process for separating foreground components and background components from pixels belonging to a mixed area, executed by the separation unit 251, will be described.

Figure 53:
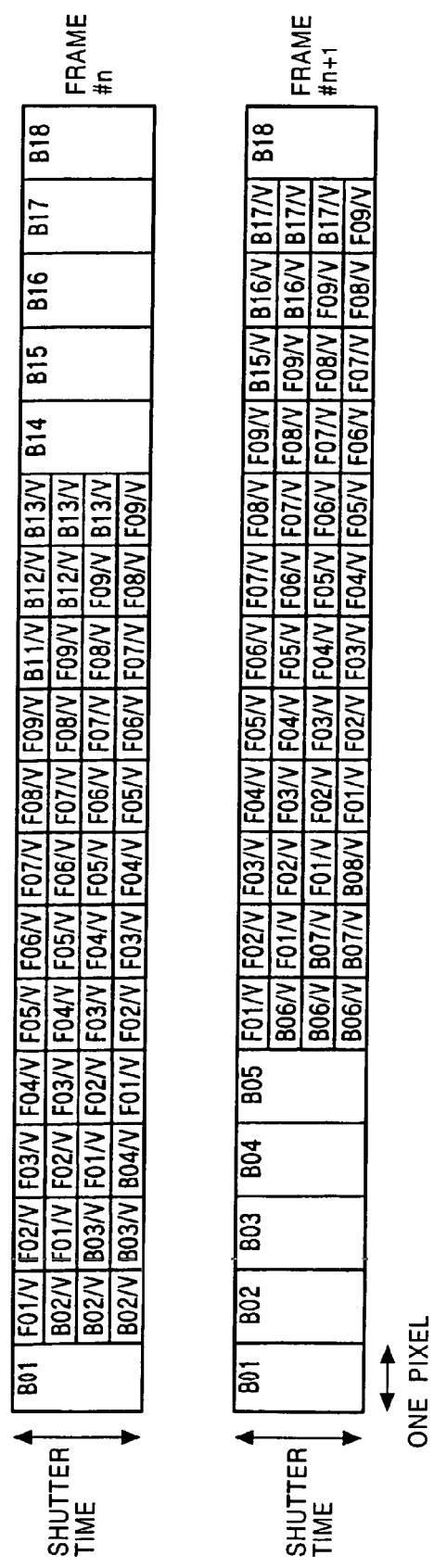
FIG. 53 is a model diagram in which pixel values are expanded along the temporal direction and in which a period corresponding to a shutter time is split.

FIG. 53 is a picture model showing foreground components and background components of two frames, including a foreground corresponding to an object moving from left to right as viewed in the figure. In the picture model shown in FIG. 53, the amount of movement v of the foreground is four, and the virtual split number is four.

In the frame #n, the leftmost pixel, and the fourteenth to the eighteenth pixels from the left are made up only of background components, and belong to a background area. In the frame #n, the second to the fourth pixels from the left include background components and foreground components, and belong to an uncovered background area. In the frame #n, the eleventh to the thirteenth pixels from the left include background components and foreground components, and belong to a covered background area. In the frame #n, the fifth to the tenth pixels from the left are made up only of foreground components, and belong to a foreground area.

In the frame #n+1, the first to the fifth pixels, and the eighteenth pixel from the left are made up only of background components, and belong to a background area. In the frame #n+1, the sixth to the eighth pixels from the left include background components and foreground components, and belong to an uncovered background area. In the frame #n+1, the fifteenth to the seventeenth pixels from the left include background components and foreground components, and belong to a covered background area. In the frame #n+1, the ninth to the fourteenth pixels from the left are made up only of foreground components, and belong to a foreground area.

Figure 54:
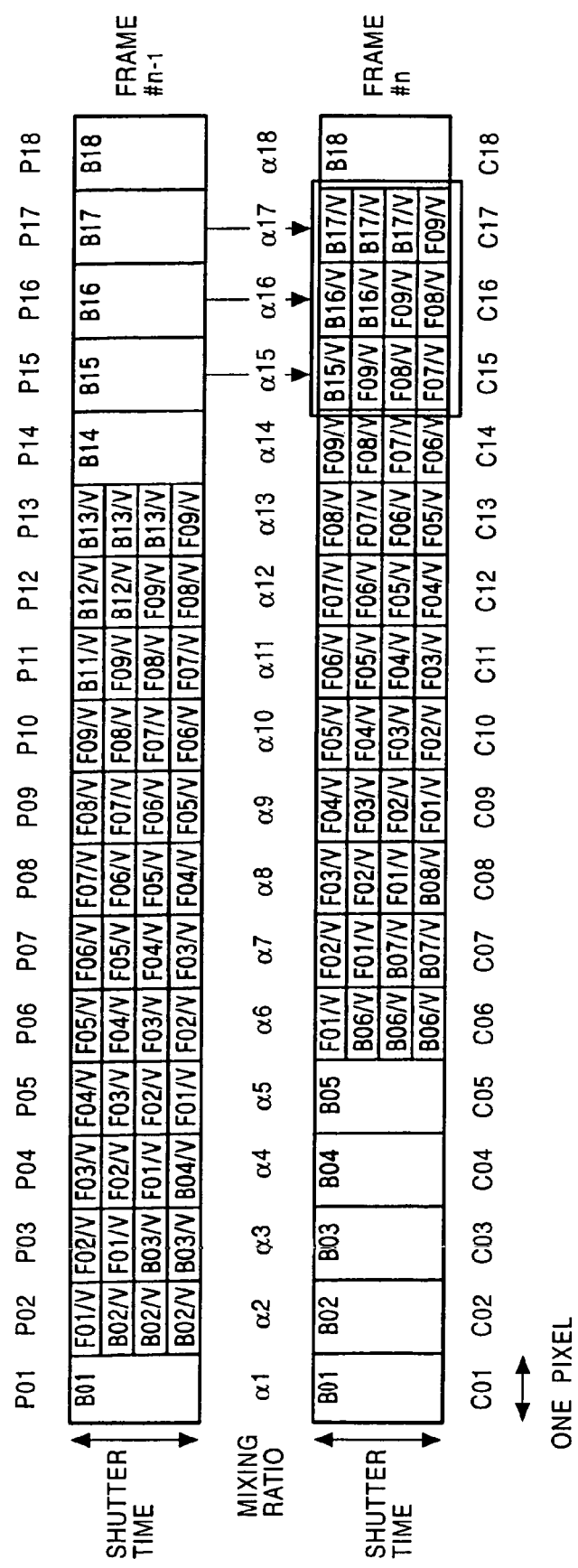
FIG. 54 is a model diagram in which pixel values are expanded along the temporal direction and in which a period corresponding to a shutter time is split.

FIG. 54 is a diagram showing a process for separating foreground components from pixels belonging to a covered background area. In FIG. 54, α1 to α18 denotes mixing ratios respectively corresponding to the pixels in the frame #n. In FIG. 54, the fifteenth to the seventeenth pixels from the left belong to a covered background area.

The pixel value C15 of the fifteenth pixel from the left in the frame #n can be expressed by equation (23):

$$\begin{aligned} C15 &= B15/v + F09/v + F08/v + F07/v \\ &= \alpha 15 \cdot B15 + F09/v + F08/v + F07/v \\ &= \alpha 15 \cdot P15 + F09/v + F08/v + F07/v \end{aligned} \quad (23)$$

α15 is the mixing ratio of the fifteenth pixel from the left in the frame #n. P15 is the pixel value of the fifteenth pixel from the left in the frame #n−1.

Based on equation (23), the sum f15 of foreground components of the fifteenth pixel from the left in the frame #n can be expressed by equation (24):

$$\begin{aligned} f15 &= F09/v + F08/v + F07/v \\ &= C15 - \alpha 15 \cdot P15 \end{aligned} \quad (24)$$

Similarly, the sum f16 of foreground components of the sixteenth pixel from the left in the frame #n can be expressed by equation (25), and the sum f17 of foreground components of the seventeenth pixel from the left in the frame #n can be expressed by equation (26):

$$f16 = C16 - \alpha 16 \cdot P16 \quad (25)$$

$$f17 = C17 - \alpha 17 \cdot P17 \quad (26)$$

Thus, the foreground component fc included in the pixel value C of a pixel belonging to a covered background area can be calculated by equation (27):

$$fc = C - \alpha \cdot P \quad (27)$$

P is the pixel value of the corresponding pixel in the immediately preceding frame.

Figure 55:
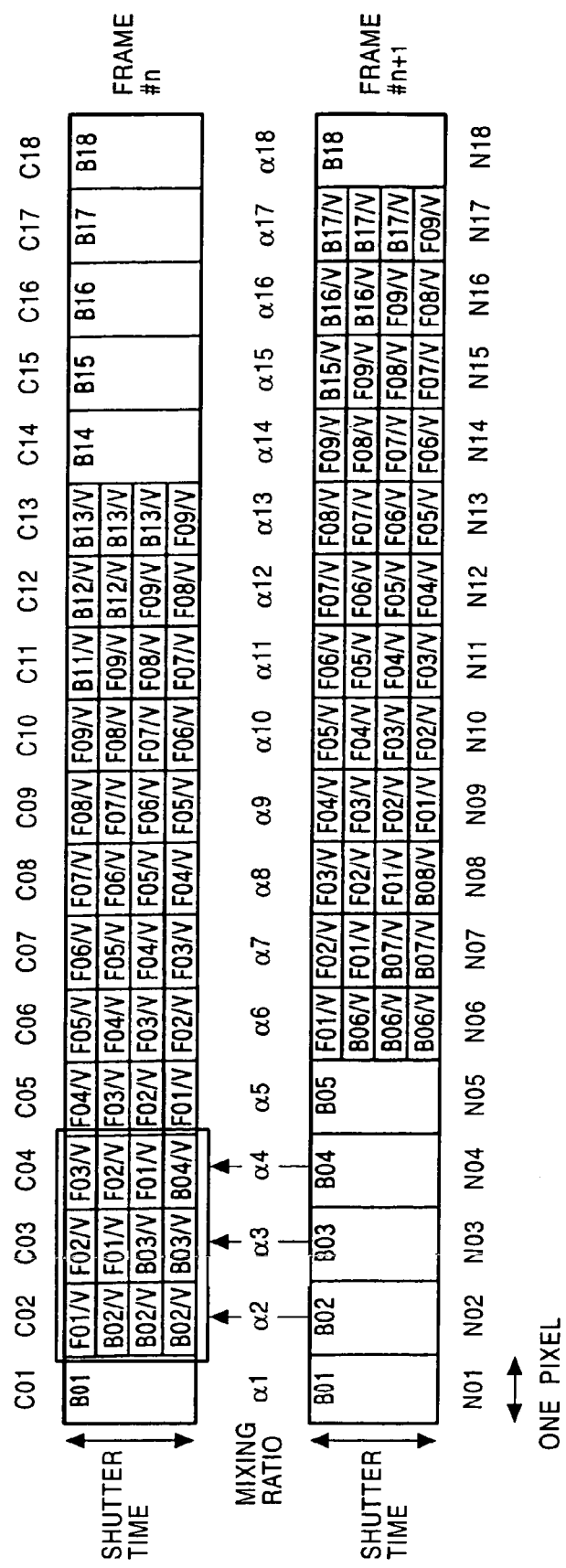
FIG. 55 is a model diagram in which pixel values are expanded along the temporal direction and in which a period corresponding to a shutter time is split.

FIG. 55 is a diagram showing a process for separating foreground components from pixels belonging to an uncovered background area. In FIG. 55, α1 to α18 denotes mixing ratios respectively corresponding to the pixels in the frame #n. In FIG. 55, the second to the fourth pixels from the left belong to an uncovered background area.

The pixel value C02 of the second pixel from the left in the frame #n can be expressed by equation (28):

$$\begin{aligned} C02 &= B02/v + B02/v + B02/v + F01/v \\ &= \alpha 2 \cdot B02 + F01/v \\ &= \alpha 2 \cdot N02 + F01/v \end{aligned} \quad (28)$$

α2 is the mixing ratio of the second pixel from the left in the frame #n. N02 is the pixel value of the second pixel from the left in the frame #n+1.

Based on equation (28), the sum f02 of foreground components of the second pixel from the left in the frame #n can be expressed by equation (29):

$$f02 = F01/v \quad (29)$$
$$= C02 - \alpha 2 \cdot N02$$

Similarly, the sum f03 of foreground components of the third pixel from the left in the frame #n can be expressed by equation (30), and the sum f04 of foreground components of the fourth pixel from the left in the frame #n can be expressed by equation (31):

$$f03 = C03 - \alpha 3 \cdot N03 \quad (30)$$
$$f04 = C04 - \alpha 4 \cdot N04 \quad (31)$$

Thus, the foreground component fu included in the pixel value C of a pixel belonging to an uncovered background area can be calculated by equation (32):

$$fu = C - \alpha \cdot N \quad (32)$$

N is the pixel value of the corresponding pixel in the next frame.

As described above, the separation unit 251 is capable of separating foreground components and background components from pixels belonging to a mixed area, based on information indicating a covered background area and information indicating an uncovered background area, included in the area information, and the mixing ratio α for each of the pixels.

Figure 56:
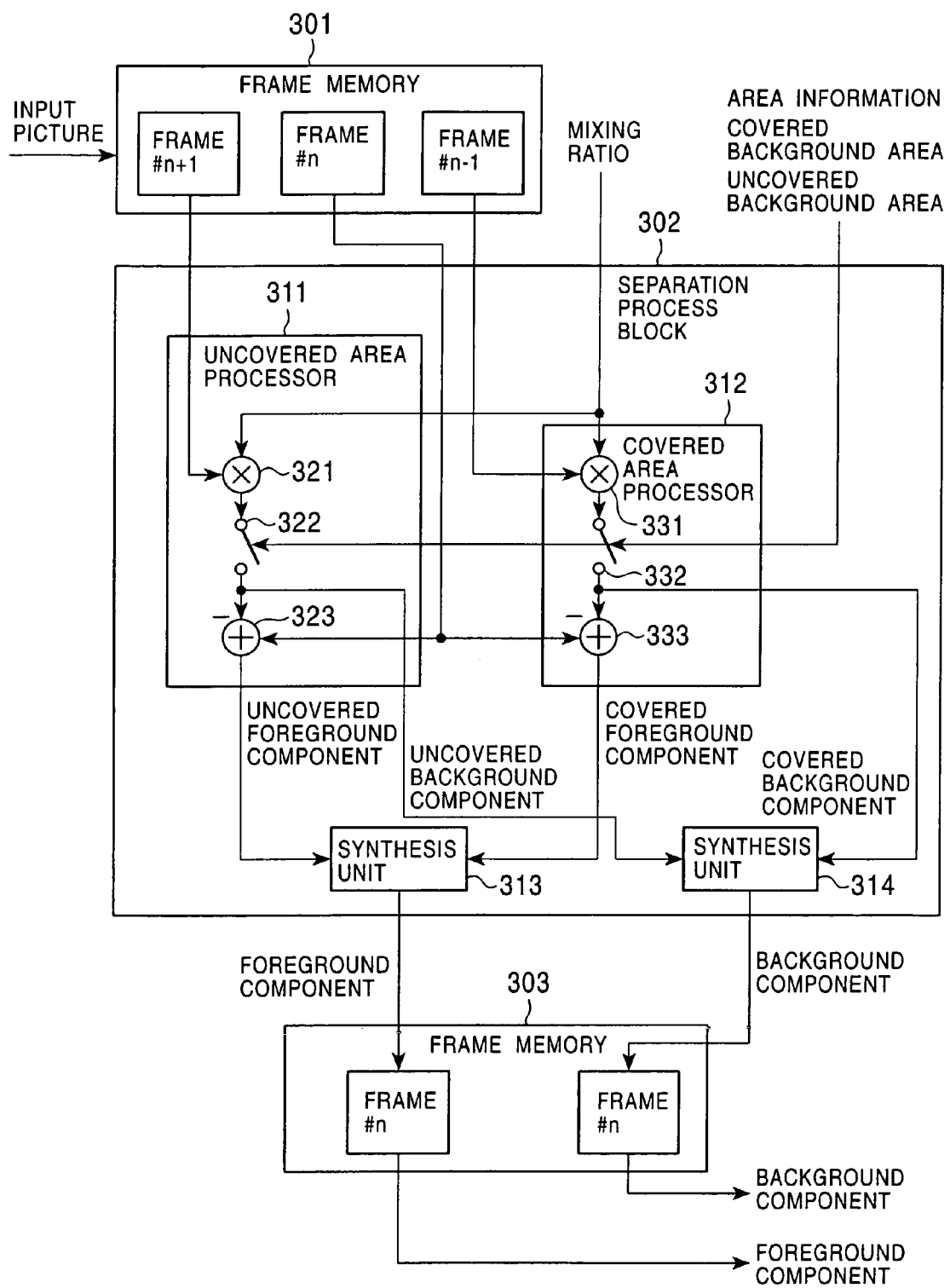
FIG. 56 is a diagram showing an example construction of a separation unit 251.

FIG. 56 is a block diagram showing an example construction of the separation unit 251 that executes the above-described process. A picture input to the separation unit 251 is supplied to a frame memory 301, and the area information indicating a covered background area and an uncovered background area, and the mixing ratio α supplied from the mixing ratio calculating unit 104 are input to a separation process block 302.

The frame memory 301 stores the input picture on a frame basis. When the frame #n is to be processed, the frame memory 301 stores the frame #n−1 immediately preceding the frame #n, the frame #n, and the frame #n+1 next to the frame #n.

The frame memory 301 supplies the corresponding pixels of the frames #n−1, #n, and #n+1 to the separation process block 302.

Based on the area information indicating a covered background area and an uncovered background area information, and the mixing ratio α, the separation process block 302 separates foreground components and background components from the pixels belonging to the mixed area in the frame #n by applying the calculations described with reference to FIGS. 54 and 55 on the pixel values of the corresponding pixels of the frames #n−1, #n, and #n+1 supplied from the frame memory 301, and supplies the results to a frame memory 303.

The separation process block 302 includes an uncovered area processor 311, a covered area processor 312, a synthesis unit 313, and a synthesis unit 314.

The uncovered area processor 311 includes a multiplier 321, which multiplies the pixel values of the pixels of the frame #n+1 supplied from the frame memory 301 by the mixing ratio α and which supplies the results to the switch 322. The switch 322 is closed when the pixels of the frame #n (corresponding to the pixels of the frame #n+1) supplied from the frame memory 301 belong to an uncovered background area, supplying the pixel values multiplied by the mixing ratio α, supplied from the multiplier 321, to a calculation unit 322 and to the synthesis unit 314. The pixel values of the pixel of the frame #n+1 output from the switch 322, multiplied by the mixing ratio α, are equal to the background components of the pixel values of the corresponding pixels of the frame #n.

The calculation unit 323 subtracts the background components supplied from the switch 322 from the pixel values of the pixels of the frame #n supplied from the frame memory 301, thereby obtaining the foreground components. The calculation unit 323 supplies the foreground components of the pixels of the frame #n, belonging to the uncovered background area, to the synthesis unit 313.

The covered area processor 312 includes a multiplier 331, which multiplies the pixel values of the pixels of the frame #n−1 supplied from the frame memory 301 by the mixing ratio α and which supplies the results to the switch 332. The switch 332 is closed when the pixels of the frame #n (corresponding to the pixels of the frame #n−1) supplied from the frame memory 301 belong to a covered background area, supplying the pixel values multiplied by the mixing ratio α, supplied from the multiplier 331, to a calculation unit 333 and to the synthesis unit 314. The pixel values of the pixel of the frame #n−1 output from the switch 332, multiplied by the mixing ratio α, are equal to the background components of the pixel values of the corresponding pixels of the frame #n.

The calculation unit 333 subtracts the background components supplied from the switch 332 from the pixel values of the pixels of the frame #n supplied from the frame memory 301, thereby obtaining the foreground components. The calculation unit 333 supplies the foreground components of the pixels of the frame #n, belonging to the covered background area, to the synthesis unit 313.

The synthesis unit 313 synthesizes the foreground components of the pixels belonging to the uncovered background area, supplied from the calculation unit 323, and the foreground components of the pixels belonging to the covered background area, supplied from the calculation unit 333, and supplies the result to the frame memory 303.

The synthesis unit 314 synthesizes the background components of the pixels belonging to the uncovered background area, supplied from the switch 322, and the background components of the pixels belonging to the covered background area, supplied from the switch 332, and supplies the result to the frame memory 303.

The frame memory 303 separately stores the foreground components and the background components of the pixels in the mixed area of the frame #n, supplied from the separation process block 302.

The frame memory 303 outputs the stored foreground components of the pixels in the mixed area of the frame #n and the stored background components of the pixels in the mixed area of the frame #n.

By using the mixing ratio α as a characteristic amount, the foreground components and the background components included in the pixel values can be completely separated.

The synthesis unit 253 synthesizes the foreground components of the pixels in the mixed area of the frame #n, output from the separation unit 251, and the pixels belonging to the foreground area, thereby generating a foreground component picture. The synthesis unit 255 synthesizes the background components of the pixels in the mixed area of the frame #n, output from the separation unit 251, and the pixels belonging to the background area, thereby generating a background component picture.

Figure 57A:
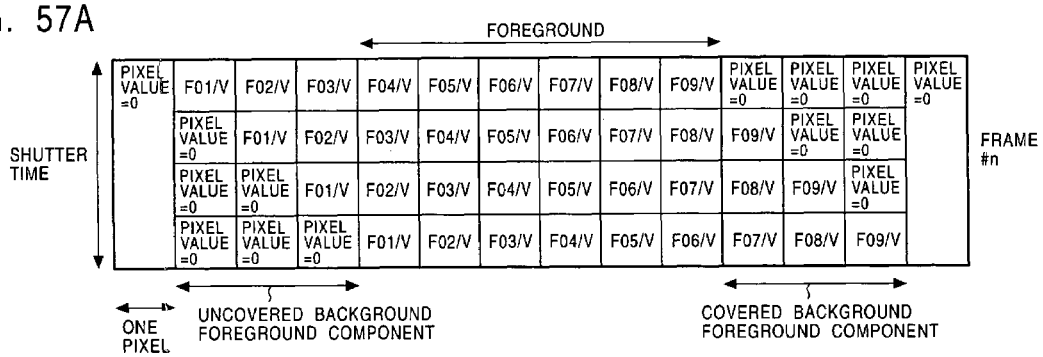
FIG. 57A is a diagram showing an example of a separated foreground component picture.
Figure 57B:
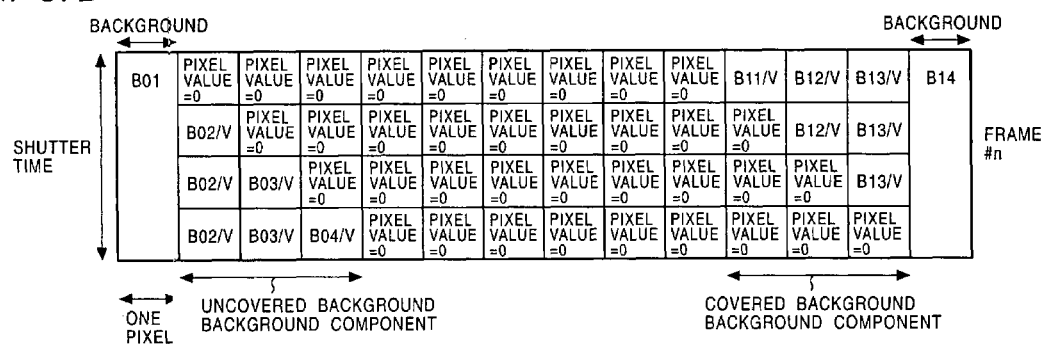
FIG. 57B is a diagram showing an example of a separated background component picture.

FIG. 57A shows an example of a foreground component picture corresponding to the frame #n in FIG. 53. FIG. 57B shows an example of a background component picture corresponding to the frame #n in FIG. 53.

FIG. 57A shows an example of a foreground component picture corresponding to the frame #n in FIG. 53. The leftmost pixel and the fourteenth pixel from the left were made up only of background components prior to the foreground/background separation, and thus the pixel values thereof are set to 0.

The second to the fourth pixels from the left belonged to the uncovered background area prior to the foreground/background separation, and thus the background components are set to 0 and the foreground components are left intact. The eleventh to the thirteenth pixels from the left belonged to the covered background area prior to the foreground/background separation, and thus the background components are set to 0 and the foreground components are left intact. The fifth to the tenth pixels from the left are made up only of foreground components and are thus left intact.

FIG. 57B shows an example of a background component picture corresponding to the frame #n in FIG. 53. The leftmost pixel and the fourteenth pixel from the left were made up only of background components prior to the foreground/background separation, and thus are left intact.

The second to the fourth pixels from the left belonged to the uncovered background area prior to the foreground/background separation, and thus the foreground components are set to 0 and the background components are left intact. The eleventh to the thirteenth pixel from the left belonged to the covered background area prior to the foreground/background separation, and thus the foreground components are set to 0 and the background components are left intact. The fifth to the tenth pixels from the left are made up only of foreground components, and thus the pixel values thereof are set to 0.

Figure 58:
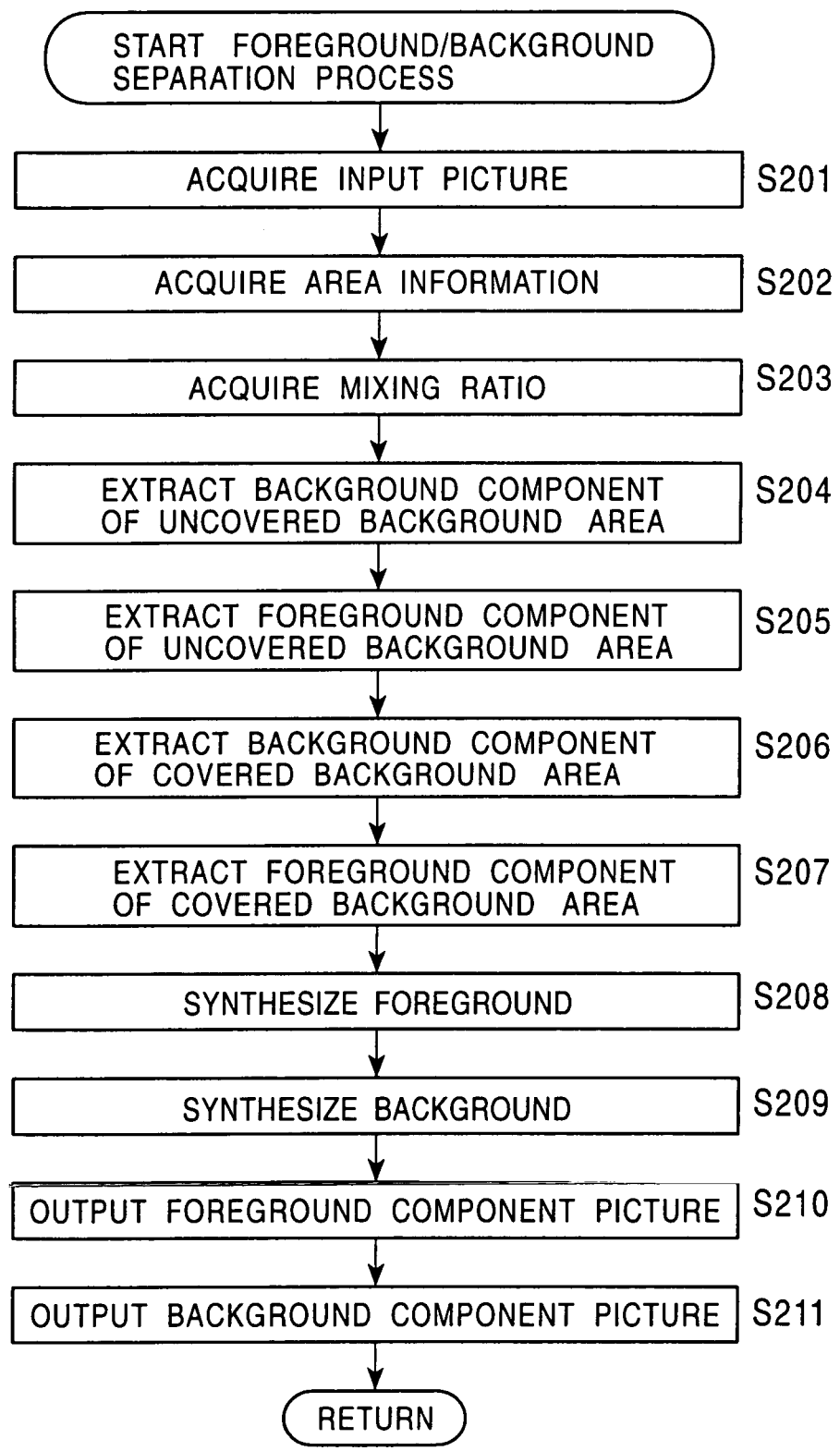
FIG. 58 is a flowchart showing a process for separating a foreground and a background.

Next, a foreground/background separation process by the foreground/background separation unit 105 will be described with reference to a flowchart shown in FIG. 58. In step S201, the frame memory 301 of the separation unit 251 acquires an input picture and stores the frame #n to be processed for foreground/background separation, along with the preceding frame #n−1 and the next frame #n+1.

In step S202, the separation process block 302 of the separation unit 251 acquires the area information supplied from the mixing ratio calculating unit 104. In step S203, the separation process block 302 of the separation unit 251 acquires the mixing ratio α supplied from the mixing ratio calculating unit 104.

In step S204, based on the area information and the mixing ratio α, the uncovered area processor 311 extracts background components from the pixel values of the pixels belonging to the uncovered background area, supplied from the frame memory 301.

In step S205, based on the area information and the mixing ratio α, the uncovered area processor 311 extracts foreground components from the pixel values of the pixels belonging to the uncovered background area, supplied from the frame memory 301.

In step S206, based on the area information and the mixing ratio α, the covered area processor 312 extracts background components from the pixel values of the pixels belonging to the covered background area, supplied from the frame memory 301.

In step S207, based on the area information and the mixing ratio α, the covered area processor 312 extracts foreground components from the pixel values of the pixels belonging to the covered background area, supplied from the frame memory 301.

In step S208, the synthesis unit 313 synthesizes the foreground components belonging to the uncovered background area, extracted in the process of step S205, and the foreground components belonging to the covered background area, extracted in the process of step S207. The synthesized foreground components are supplied to the synthesis unit 253. Furthermore, the synthesis unit 253 synthesizes the pixels belonging to the foreground area, supplied via the switch 252, and the foreground components supplied from the separation unit 251, thereby generating a foreground component picture.

In step S209, the synthesis unit 314 synthesizes the background components belonging to the uncovered background area, extracted in the process of step S204, and the background components belonging to the covered background area, extracted in the process of step S206. The synthesized background components are supplied to the synthesis unit 255. Furthermore, the synthesis unit 255 synthesizes the pixels belonging to the background area, supplied via the switch 254, and the background components supplied from the separation unit 251, thereby generating a background component picture.

In step S210, the synthesis unit 253 outputs the foreground component picture. In step S211, the synthesis unit 255 outputs the background component picture, and the process is exited.

As described above, the foreground/background separation unit 105 is capable of separating foreground components and background components from an input picture, based on the area information and the mixing ratio α, and outputting a foreground component picture made up only of the foreground components and a background component picture made up only of the background components.

Next, an adjustment of the amount of motion blurring in the foreground component picture will be described.

Figure 59:
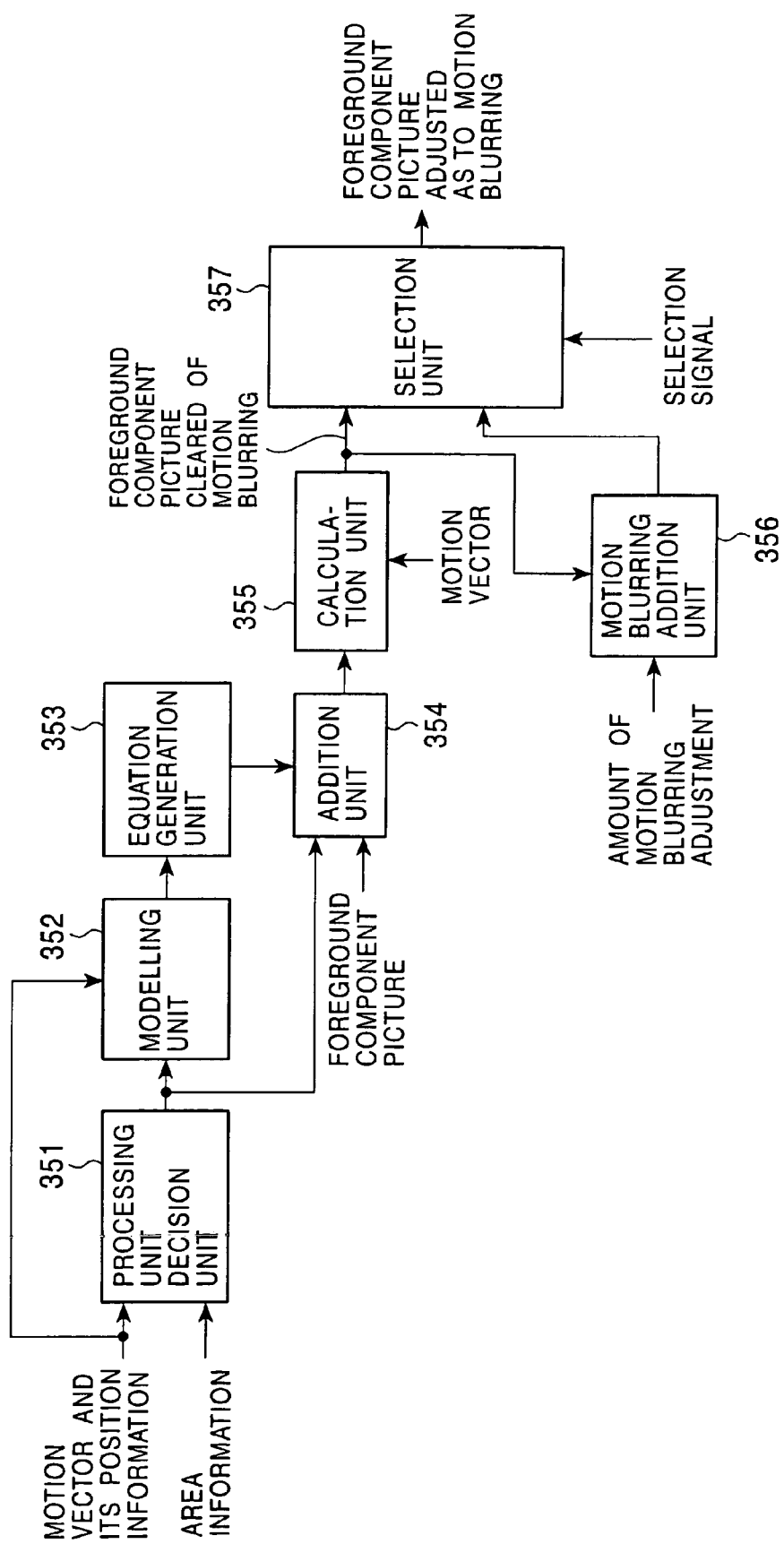
FIG. 59 is a block diagram showing an example construction of a motion blurring adjustment unit 106.

FIG. 59 is a block diagram showing an example construction of the motion blurring adjustment unit 106. The motion vector and its position information supplied from the motion detection unit 102, and the area information supplied from the area specifying unit 103 are supplied to a processing unit decision unit 351 and to a modelling unit 352. The foreground component picture supplied from the foreground/background separation unit 105 is supplied to an addition unit 354.

The processing unit decision unit 351 supplies a generated processing unit to the modelling unit 352 together with the motion vector, based on the motion vector and its position information and on the area information. The processing unit decision unit 351 supplies the generated processing unit to the addition unit 354.

Figure 60:
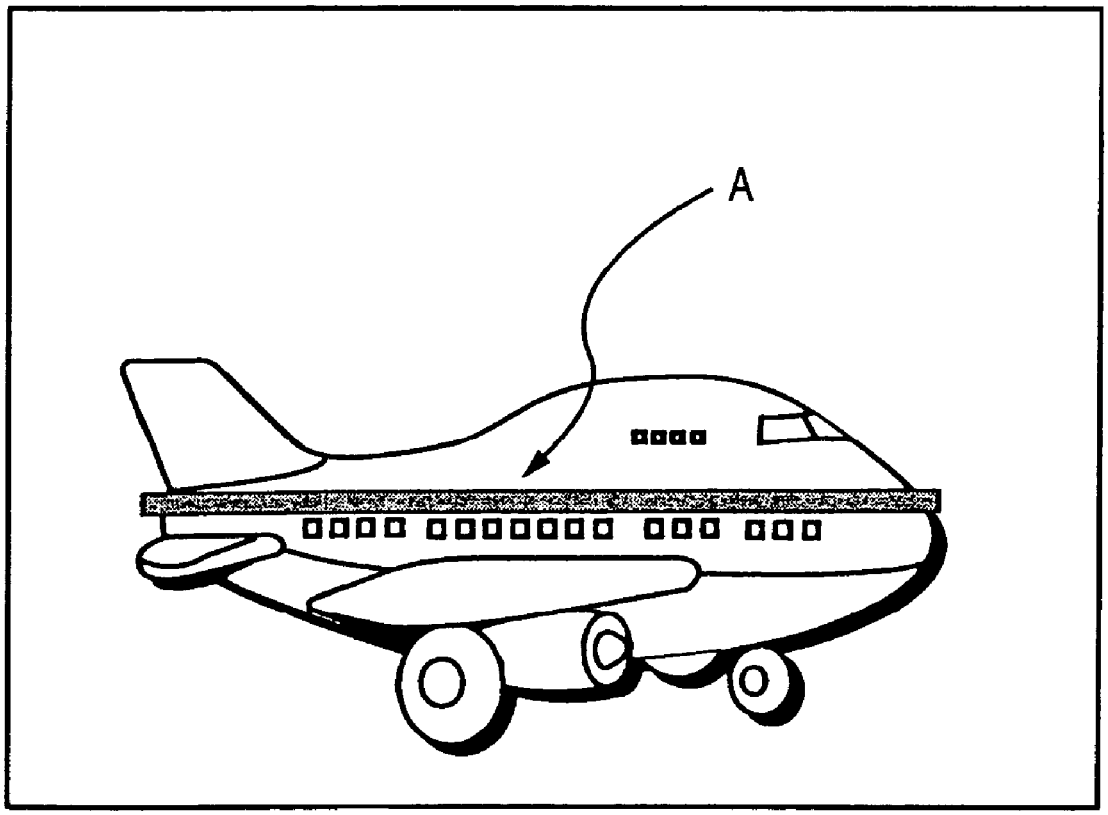
FIG. 60 is a diagram showing a processing unit.

As indicated by A in FIG. 60, the processing unit generated by the processing unit decision unit 351 represents, for example, pixels contiguously arranged in the direction of motion, beginning from a pixel corresponding to the covered background area of the foreground component picture and up to a pixel corresponding to the uncovered background area, or pixels contiguously arranged in the direction of motion, beginning from a pixel corresponding to the uncovered background area and up to a pixel corresponding to the covered background area. The processing unit consists of, for example, data of an upper left point (the position of a pixel specified in the processing unit as located at the leftmost or the uppermost point in a picture) and a lower right point.

Figure 61:
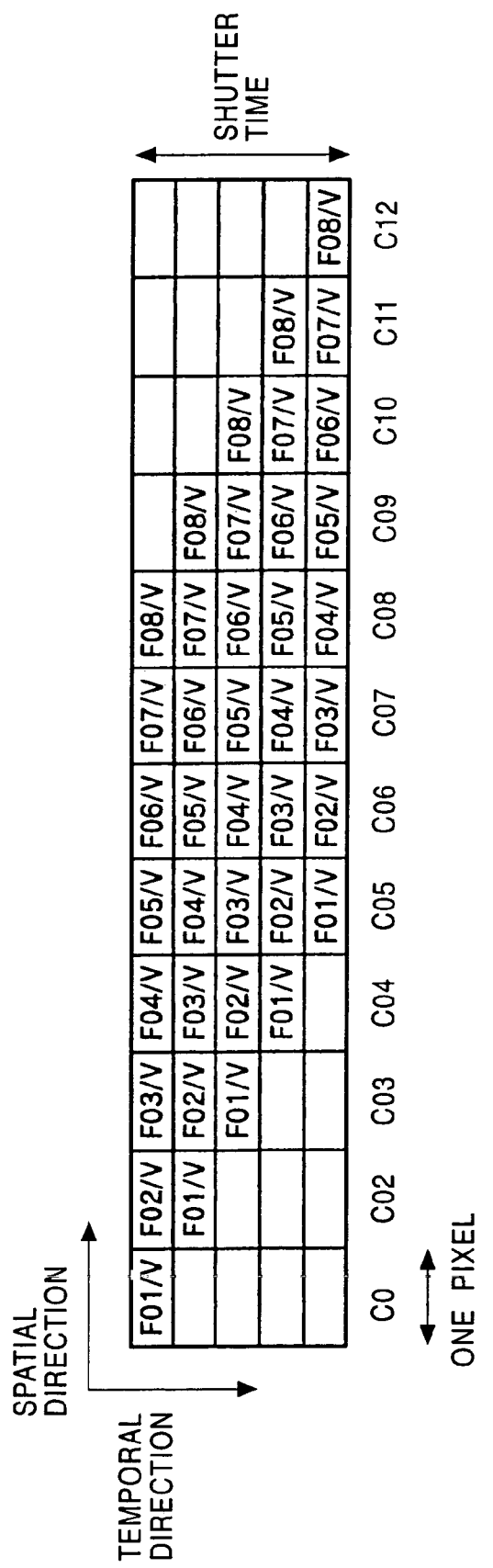
FIG. 61 is a model diagram in which the pixel values of a foreground component picture are expanded along the temporal direction and in which a period corresponding to a shutter time is split.

The modelling unit 352 executes a modelling based on the motion vector and the processing unit that has been input. More specifically, for example, the modelling unit 352 may prestore a plurality of models corresponding to the number of pixels included in the processing unit, the virtual split number of the pixel values along the temporal direction, and the number of foreground components for each pixel, selecting a model specifying the correspondence between the pixel values and the foreground components, as shown in FIG. 61, based on the processing unit and the virtual split number of the pixel values along the temporal direction.

For example, if the number of pixels corresponding to the processing unit is twelve and if the amount of movement v is five, the modelling unit 352 uses a virtual split number of five, and selects a model made up of eight foreground components in total, with the leftmost pixel including one foreground component, the second pixel from the left including two foreground components, the third pixel from the left including three foreground components, the fourth pixel from the left including four foreground components, the fifth pixel from the left including five foreground components, the sixth pixel from the left including five foreground components, the seventh pixel from the left including five foreground components, the eighth pixel from the left including five foreground components, the ninth pixel from the left including four foreground components, the tenth pixel from the left including three foreground components, the eleventh pixel from the left including two foreground components, and the twelfth pixel from the left including one foreground component.

Instead of selecting one from prestored models, the modelling unit 352 may generate a model based on the motion vector and the processing unit when the motion vector and the processing unit are supplied thereto.

The modelling unit 352 supplies the selected model to an equation generation unit 353.

The equation generation unit 353 generates an equation based on the model supplied from the modelling unit 352. With reference to a model of a foreground component picture shown in FIG. 61, an equation generated by the equation generation unit 353 when the number of foreground components is eight, the number of pixels corresponding to the processing unit is twelve, the amount of movement v is five, and the virtual split number is five will be described.

If the foreground components corresponding to a shutter time/v, included in the foreground component picture, are F01/v to F08/v, the relationships between the foreground components F01/v to F08/v and the pixel values C01 to C12 can be expressed by equations (33) to (44):

$$C01 = F01/v \tag{33}$$

$$C02 = F02/v + F01/v \tag{34}$$

$$C03 = F03/v + F02/v + F01/v \tag{35}$$

$$C04 = F04/v + F03/v + F02/v + F01/v \tag{36}$$

$$C05 = F05/v + F04/v + F03/v + F02/v + F01/v \tag{37}$$

$$C06 = F06/v + F05/v + F04/v + F03/v + F02/v \tag{38}$$

$$C07 = F07/v + F06/v + F05/v + F04/v + F03/v \tag{39}$$

$$C08 = F08/v + F07/v + F06/v + F05/v + F04/v \tag{40}$$

-continued $$C09 = F08/v + F07/v + F06/v + F05/v \tag{41}$$

$$C10 = F08/v + F07/v + F06/v \tag{42}$$

$$C11 = F08/v + F07/v \tag{43}$$

$$C12 = F08/v \tag{44}$$

The equation generation unit 353 converts the generated equations to generate equations. The equations generated by the equation generating unit 353 are shown in equations (45) to (56):

$$C01 = 1 \cdot F01/v + 0 \cdot F02/v + 0 \cdot F03/v + \\ 0 \cdot F04/v + 0 \cdot F05/v + 0 \cdot F06/v + 0 \cdot F07/v + 0 \cdot F08/v \tag{45}$$

$$C02 = 1 \cdot F01/v + 1 \cdot F02/v + 0 \cdot F03/v + \\ 0 \cdot F04/v + 0 \cdot F05/v + 0 \cdot F06/v + 0 \cdot F07/v + 0 \cdot F08/v \tag{46}$$

$$C03 = 1 \cdot F01/v + 1 \cdot F02/v + 1 \cdot F03/v + \\ 0 \cdot F04/v + 0 \cdot F05/v + 0 \cdot F06/v + 0 \cdot F07/v + 0 \cdot F08/v \tag{47}$$

$$C04 = 1 \cdot F01/v + 1 \cdot F02/v + 1 \cdot F03/v + \\ 1 \cdot F04/v + 0 \cdot F05/v + 0 \cdot F06/v + 0 \cdot F07/v + 0 \cdot F08/v \tag{48}$$

$$C05 = 1 \cdot F01/v + 1 \cdot F02/v + 1 \cdot F03/v + \\ 1 \cdot F04/v + 1 \cdot F05/v + 0 \cdot F06/v + 0 \cdot F07/v + 0 \cdot F08/v \tag{49}$$

$$C06 = 0 \cdot F01/v + 1 \cdot F02/v + 1 \cdot F03/v + \\ 1 \cdot F04/v + 1 \cdot F05/V + 1 F06/v + 0 \cdot F07/V + 0 \cdot F08/v \tag{50}$$

$$C07 = 0 \cdot F01/v + 0 \cdot F02/v + 1 \cdot F03/v + \\ 1 \cdot F04/v + 1 \cdot F05/v + 1 \cdot F06/v + 1 \cdot F07/v + 0 \cdot F08/v \tag{51}$$

$$C08 = 0 \cdot F01/v + 0 \cdot F02/v + 0 \cdot F03/v + \\ 1 \cdot F04/v + 1 \cdot F05/v + 1 \cdot F06/v + 1 \cdot F07/v + 1 \cdot F08/v \tag{52}$$

$$C09 = 0 \cdot F01/v + 0 \cdot F02/v + 0 \cdot F03/v + \\ 0 \cdot F04/v + 1 \cdot F05/v + 1 \cdot F06/v + 1 \cdot F07/v + 1 \cdot F08/v \tag{53}$$

$$C10 = 0 \cdot F01/v + 0 \cdot F02/v + 0 \cdot F03/v + \\ 0 \cdot F04/v + 0 \cdot F05/v + 1 \cdot F06/v + 1 \cdot F07/v + 1 \cdot F08/v \tag{54}$$

$$C11 = 0 \cdot F01/v + 0 \cdot F02/v + 0 \cdot F03/v + \\ 0 \cdot F04/v + 0 \cdot F05/v + 0 \cdot F06/v + 1 \cdot F07/v + 1 \cdot F08/v \tag{55}$$

$$C12 = 0 \cdot F01/v + 0 \cdot F02/v + 0 \cdot F03/v + \\ 0 \cdot F04/v + 0 \cdot F05/v + 0 \cdot F06/v + 0 \cdot F07/v + 1 \cdot F08/v \tag{56}$$

Equations (45) to (56) can also be expressed as equation (57):

$$Cj = \sum_{i=01}^{08} aij \cdot Fi/v \tag{57}$$

In equation (57), j indicates the position of a pixel. In this case, j has one of the values from 1 to 12. i denotes the position of a foreground value. In this example, i has one of the values from 1 to 8. aij has a value of 0 or 1 in accordance with the values of i and j.

Taking an error into consideration, equation (57) can be expressed as equation (58):

$$Cj = \sum_{i=01}^{08} aij \cdot Fi/v + ej \qquad (58)$$

In equation (58), ej is an error included in a pixel under consideration Cj.

Equation (58) can be rewritten as equation (59):

$$ej = Cj - \sum_{i=01}^{08} aij \cdot Fi/v \qquad (59)$$

In order to apply the least squares method, a sum of squares of errors E is defined as expressed in equation (60):

$$E = \sum_{j=01}^{12} ej^2 \qquad (60)$$

In order for the error to be minimized, the value of partial differentiation on the sum of squares of errors E with respect to a variable Fk must be zero. Fk is obtained so as to satisfy equation (61):

$$\frac{\partial E}{\partial Fk} = 2 \cdot \sum_{j=01}^{12} ej \cdot \frac{\partial ej}{\partial Fk} \qquad (61)$$

$$= 2 \cdot \sum_{j=01}^{12} \{(Cj - \sum_{i=01}^{08} aij \cdot Fi/v) \cdot (-akj/v) = 0$$

Since the amount of movement v in equation (61) is a fixed value, equation (62) can be derived:

$$\sum_{j=01}^{12} akj \cdot (Cj - \sum_{i=01}^{08} aij \cdot Fi/v) = 0 \qquad (62)$$

Expanding equation (62) and moving terms yields equation (63):

$$\sum_{j=01}^{12} (akj \cdot \sum_{i=01}^{08} aij \cdot Fi) = v \cdot \sum_{j=01}^{12} akj \cdot Cj \qquad (63)$$

Equation (63) is expanded into eight equations by assigning one of integers from 1 to 8, respectively. The resulting eight equations can be expressed by a single equation using a matrix. This equation is referred to as a normal equation.

An example of normal equation generated by the equation generation unit 353 based on the least squares method is shown in equation (64):

$$\begin{bmatrix} 5 & 4 & 3 & 2 & 1 & 0 & 0 & 0 \\ 4 & 5 & 4 & 3 & 2 & 1 & 0 & 0 \\ 3 & 4 & 5 & 4 & 3 & 2 & 1 & 0 \\ 2 & 3 & 4 & 5 & 4 & 3 & 2 & 1 \\ 1 & 2 & 3 & 4 & 5 & 4 & 3 & 2 \\ 0 & 1 & 2 & 3 & 4 & 5 & 4 & 3 \\ 0 & 0 & 1 & 2 & 3 & 4 & 5 & 4 \\ 0 & 0 & 0 & 1 & 2 & 3 & 4 & 5 \end{bmatrix} \begin{bmatrix} F01 \\ F02 \\ F03 \\ F04 \\ F05 \\ F06 \\ F07 \\ F08 \end{bmatrix} = v \cdot \begin{bmatrix} \sum_{i=08}^{12} Ci \\ \sum_{i=07}^{11} Ci \\ \sum_{i=06}^{10} Ci \\ \sum_{i=05}^{09} Ci \\ \sum_{i=04}^{08} Ci \\ \sum_{i=03}^{07} Ci \\ \sum_{i=02}^{06} Ci \\ \sum_{i=01}^{05} Ci \end{bmatrix} \qquad (64)$$

Representing equation (64) as A·F=v·C, C, A, and v are known, while F is unknown. A and v are known at the time of modelling, while C is known upon input of a pixel value in the addition operation.

By calculating the foreground components using the normal equation based on the least squares method, errors included in the pixel C can be deconcentrated.

The equation generation unit 353 sends the normal equation thus generated to the addition unit 354.

Based on the processing unit supplied from the processing unit decision unit 351, the addition unit 354 sets the pixel values C, included in the foreground component picture, in the matrix equation supplied from the equation generation unit 353. The addition unit 354 supplies the matrix with the pixel values C set therein to the calculation unit 355.

The calculation unit 355 calculates foreground components Fi/v that are cleared of motion blurring, by a process based on a solving method such as the sweep-out method (Gauss-Jordan elimination method), obtaining Fi corresponding to one of the integers 0 to 8 of i, which constitutes a pixel value of the foreground cleared of motion blurring. The calculation unit 355 outputs a foreground component picture cleared of motion blurring, made up of pixel values Fi cleared of motion blurring, for example, as shown in FIG. 62, to a motion blurring addition unit 356 and to a selection unit 357.

Figure 62:
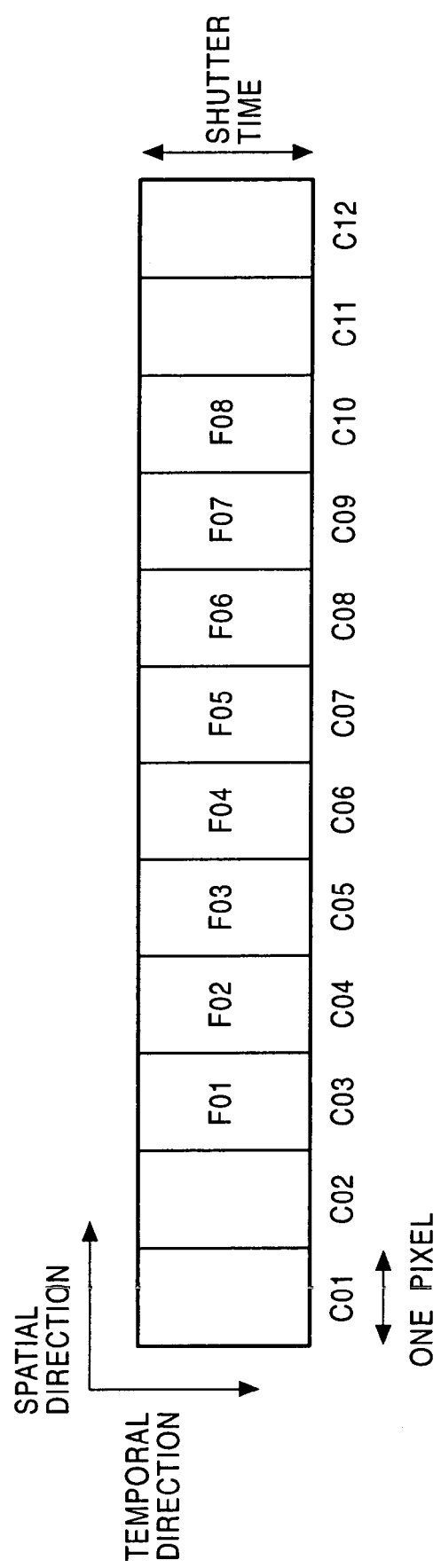
FIG. 62 is a model diagram in which the pixel values of a foreground component picture are expanded along the temporal direction and in which a period corresponding to a shutter time is split.

Although F01 to F08 are set respectively to C03 to C10 in the foreground component picture shown in FIG. 62, cleared of motion blurring, so that the position of the foreground component picture is not changed relative to the screen, the position may be arbitrary.

Figure 63:
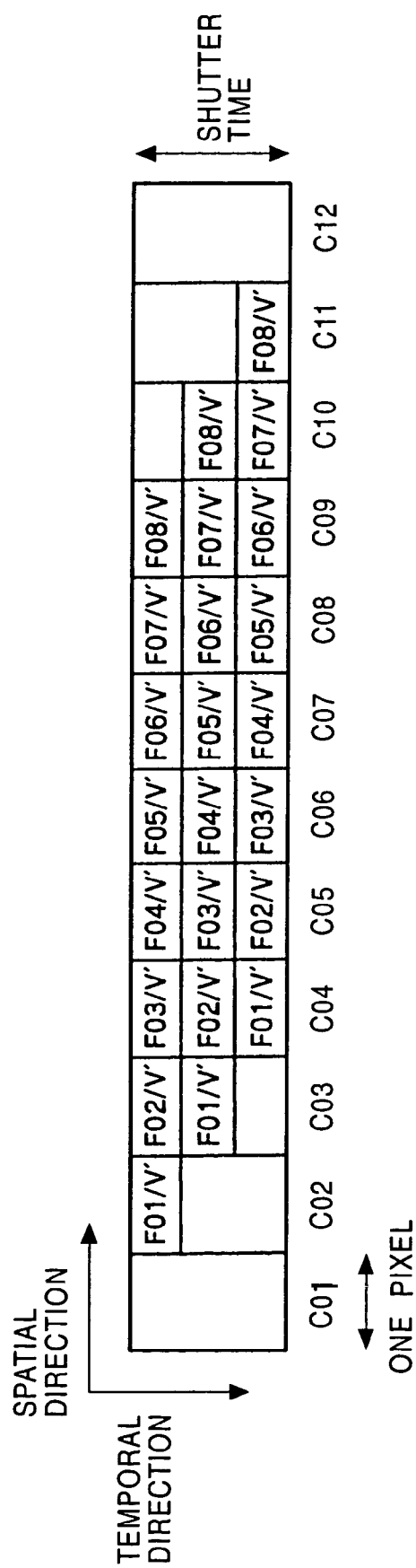
FIG. 63 is a model diagram in which the pixel values of a foreground component picture are expanded along the temporal direction and in which a period corresponding to a shutter time is split.

The motion blurring addition unit 356 is capable of adjusting the amount of motion blurring with an amount of motion blurring adjustment v', which is different from the amount of movement v, for example, an amount of motion blurring adjustment v' that is one half the amount of movement v, or an amount of motion blurring adjustment v' that is irrelevant to the amount of movement v. For example, as shown in FIG. 63, the motion blurring addition unit 356 divides the pixel values Fi of the foreground cleared of motion blurring by the amount of motion blurring adjustment v', calculating foreground components Fi/v', and sums the foreground components Fi/v' to obtain pixel values adjusted as to the amount of motion blurring. For example, if the amount of motion blurring adjustment v' is three, the pixel value C02 is set to (F01)/v', the pixel value C03 is set to (F01+F02)/v', the pixel value C04 is set to (F01+F02+F03)/v' and the pixel value C05 is set to (F02+F03+F04)/v'.

The motion blurring addition unit 356 supplies the foreground component picture that has been adjusted as to the amount of motion blurring to the selection unit 357.

Based on a selection signal in accordance with, for example, a selection by the user, the selection unit 357 selects either the foreground component picture cleared of motion blurring, supplied from the calculation unit 355, or the foreground component picture adjusted as to the amount of motion blurring, supplied from the motion blurring addition unit 356, outputting the selected foreground component picture.

As described above, the motion blurring adjustment unit 106 is capable of adjusting the amount of motion blurring based on the selection signal and the amount of motion blurring adjustment v'.

Figure 64:
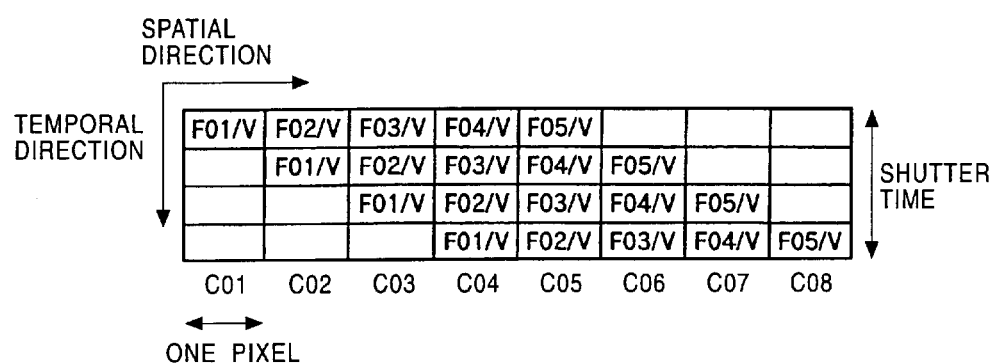
FIG. 64 is a model diagram in which the pixel values of a foreground component picture are expanded along the temporal direction and in which a period corresponding to a shutter time is split.

Furthermore, for example, if the number of pixels associated with the processing unit is eight and if the amount of movement v is four, as shown in FIG. 64, the motion blurring adjustment unit 106 generates a matrix equation shown in equation (65):

$$\begin{bmatrix} 4 & 3 & 2 & 1 & 0 \\ 3 & 4 & 3 & 2 & 1 \\ 2 & 3 & 4 & 3 & 2 \\ 1 & 2 & 3 & 4 & 3 \\ 0 & 1 & 2 & 3 & 4 \end{bmatrix} \begin{bmatrix} F01 \\ F02 \\ F03 \\ F04 \\ F05 \end{bmatrix} = v \cdot \begin{bmatrix} \sum_{i=05}^{08} Ci \\ \sum_{i=04}^{07} Ci \\ \sum_{i=03}^{06} Ci \\ \sum_{i=02}^{05} Ci \\ \sum_{i=01}^{04} Ci \end{bmatrix} \quad (65)$$

As described above, the motion blurring adjustment unit 106 generates a number of equations corresponding to the length of the processing unit to calculate the pixel values Fi adjusted as to the amount of motion blurring. Similarly, for example, if the number of pixels included in the processing unit is one hundred, the motion blurring adjustment unit 106 generates one hundred equations corresponding to the one hundred pixels to calculate Fi.

Figure 65:
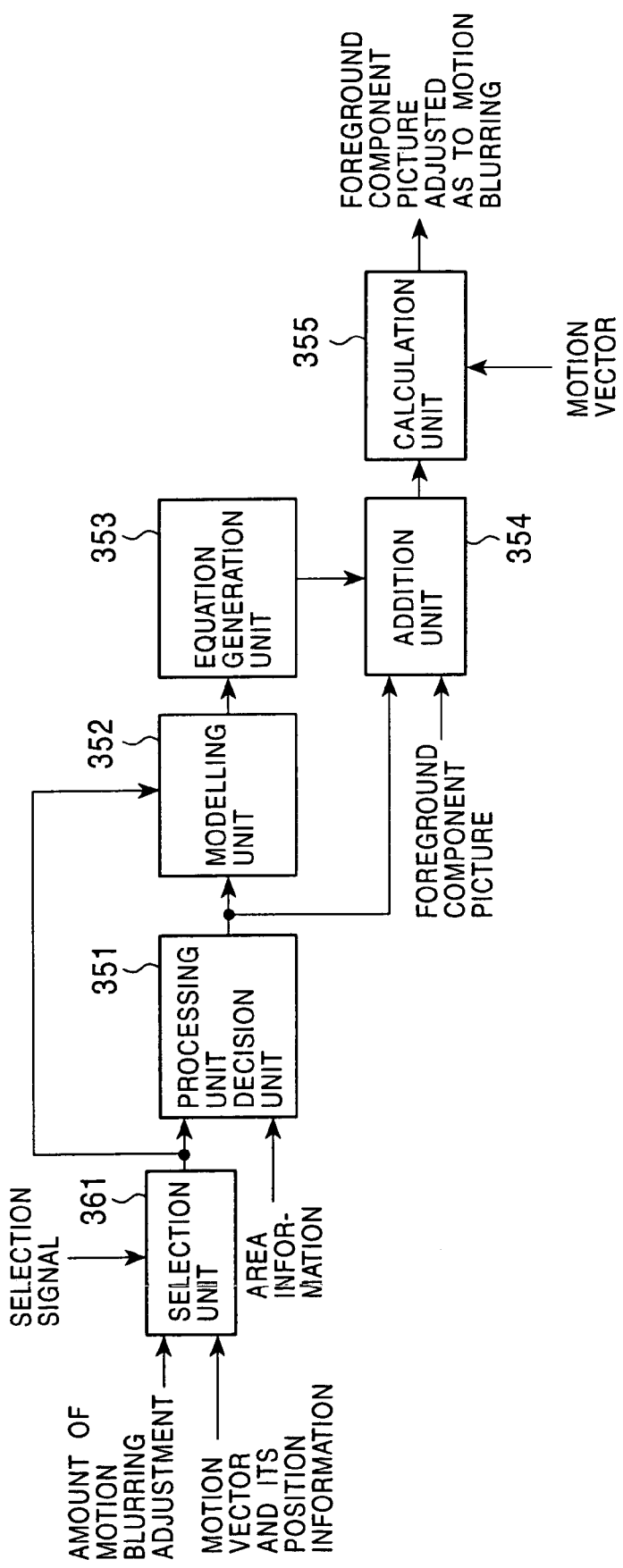
FIG. 65 shows another construction of the motion blurring adjustment unit 106.

FIG. 65 is a diagram showing another construction of the motion blurring adjustment unit 106. Parts that are the same as those shown in FIG. 59 are designated by the same numerals, and descriptions thereof will be omitted.

Based on the selection signal, a selection unit 361 supplies the input motion vector and its position signal directly to the processing unit decision unit 351 and to the modelling unit 352, or the selection unit 361 substitutes the magnitude of the motion vector with the amount of motion blurring adjustment v' and supplies the motion vector and its position signal, in which the magnitude of the motion vector has been substituted with the amount of motion blurring adjustment v', to the processing unit decision unit 351 and to the modelling unit 352.

Accordingly, the processing unit decision unit 351 to the calculation unit 355 of the motion blurring adjustment unit 106 in FIG. 65 are capable of adjusting the amount of motion blurring in accordance with the amount of movement v and the amount of motion blurring adjustment v'. For example, if the amount of movement v is five and the amount of motion blurring adjustment v' is three, the processing unit decision units 351 to the calculation unit 355 of the motion blurring adjustment unit 106 in FIG. 65 executes calculations on the foreground component picture shown in FIG. 61, with an amount of movement v of five, according to the model shown in FIG. 63, associated with an amount of motion blurring adjustment v' of three, thereby calculating a picture including motion blurring in accordance with the amount of movement v of (amount of movement v)/(amount of motion blurring adjustment v')=5/3, that is, approximately 1.7. In this case, the picture thus calculated does not include motion blurring in accordance with the amount of movement v of three.

As described above, the motion blurring adjustment unit 106 generates an equation in accordance with the amount of movement v and the processing unit and sets the pixel values of the foreground component picture in the generated equation to calculate a foreground component picture adjusted as to the amount of motion blurring.

Figure 66:
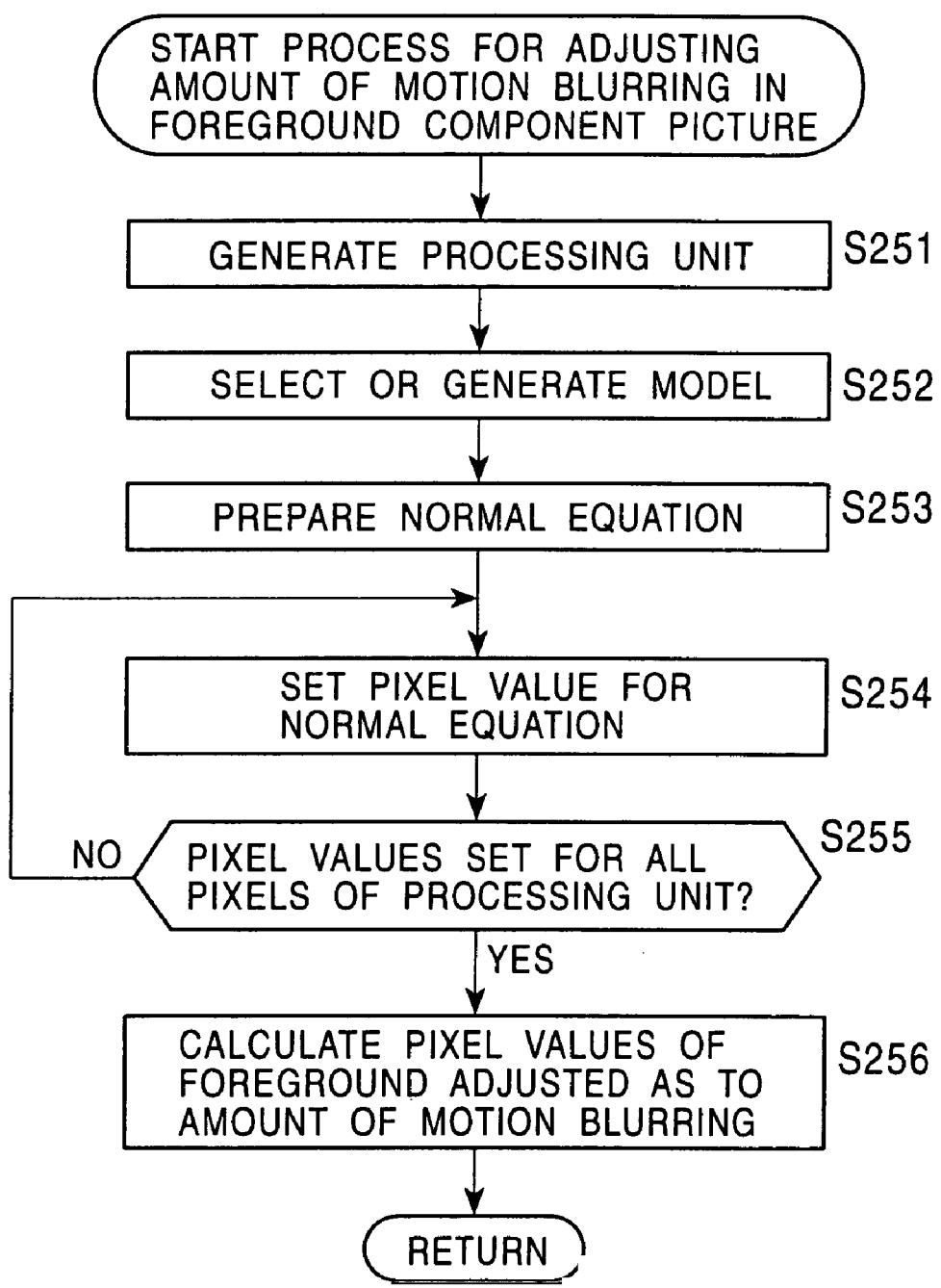
FIG. 66 is a flowchart showing a process for adjusting the amount of motion blurring included in a foreground component picture by the motion blurring adjustment unit 106.

Next, a process for adjusting the amount of motion blurring in the foreground component picture by the motion blurring adjustment unit 106 will be described with reference to a flowchart in FIG. 66.

In step S251, the processing unit decision unit 351 of the motion blurring adjustment unit 106 generates a processing unit based on the motion vector and the area information, and supplies the generated processing unit to the modelling unit 352.

In step S252, the modelling unit 352 of the motion blurring adjustment unit 106 selects or generates a model in accordance with the amount of movement v and the processing unit. In step S253, the equation generation unit 353 generates a normal equation based on the selected model.

In step S254, the addition unit 354 sets the pixel values of the foreground component picture in the generated normal equation. In step S255, the addition unit 354 determines whether the pixel values of all the pixels associated with the processing unit have been set. If it is determined that the pixel values of all the pixels associated with the processing unit have not been set, the process returns to step S254, repeating the process for setting pixel values in the normal equation.

If it is determined in step S255 that the pixel values of all the pixels in the processing unit have been set, the process proceeds to step S256, in which the calculation unit 355 calculates the pixel values of the foreground adjusted as to the amount of motion blurring, based on the normal equation with pixel values set therein, supplied from the addition unit 354, and the process is exited.

As described above, the motion blurring adjustment unit 106 is capable of adjusting the amount motion blurring in a foreground picture including motion blurring, based on the motion vector and the area information.

That is, the motion blurring adjustment unit 106 is capable of adjust the amount of motion blurring in the pixel values of sample data.

The construction of the motion blurring adjustment unit 106 shown in FIG. 59 is only an example, and the construction is not limited thereto.

As described above, the signal processor 12 having the construction shown in FIG. 4 is capable of adjusting the amount of motion blurring included in the input picture. The signal processor 12 having the construction shown in FIG. 4 is capable of calculating the mixing ratio α that is buried and outputting the mixing ratio α thus calculated.

Figure 67:
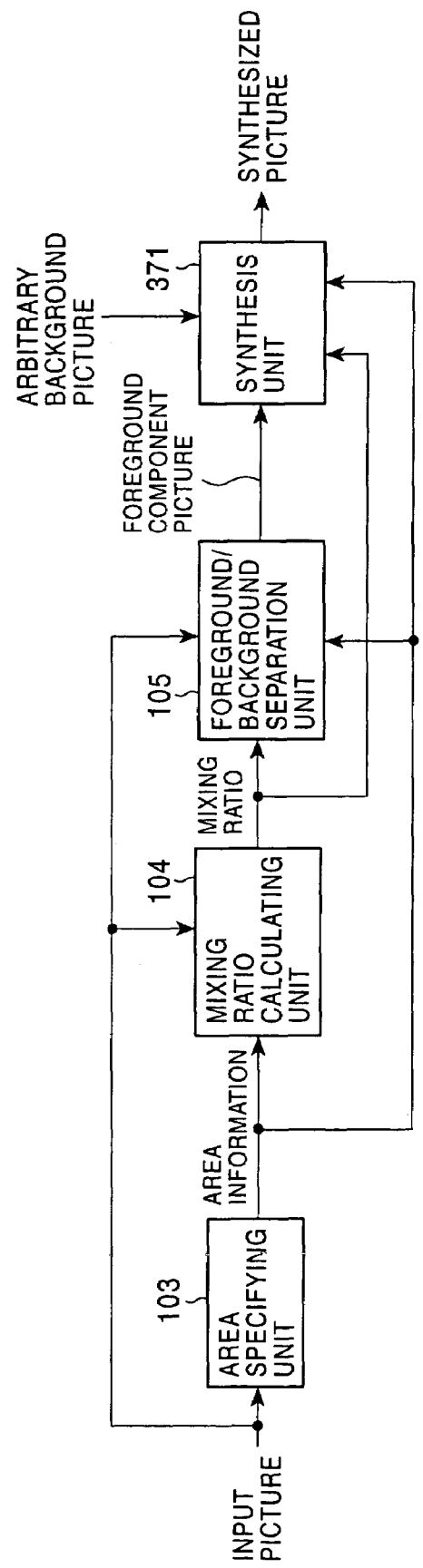
FIG. 67 is a block diagram showing another implementation of the functions of the signal processor 12.

FIG. 67 is a block diagram showing another implementation of the functions of the signal processor 12.

Parts that are the same as those shown in FIG. 4 are designated by the same numerals, and descriptions thereof will be omitted as appropriate.

The area specifying unit 103 supplies the area information to the mixing ratio calculating unit 104 and to a synthesis unit 371.

The mixing ratio calculating unit 104 supplies the mixing ratio α to the foreground/background separation unit 105 and to the synthesis unit 371.

The foreground/background separation unit 105 supplies the foreground component picture to the synthesis unit 371.

Based on the mixing ratio α supplied from the mixing ratio calculating unit 104 and the area information supplied from the area specifying unit 103, the synthesis unit 371 synthesizes an arbitrary background picture and the foreground component picture supplied from the foreground/background separation unit 105, outputting a synthesized picture in which the arbitrary background picture and the foreground component picture are synthesized.

Figure 68:
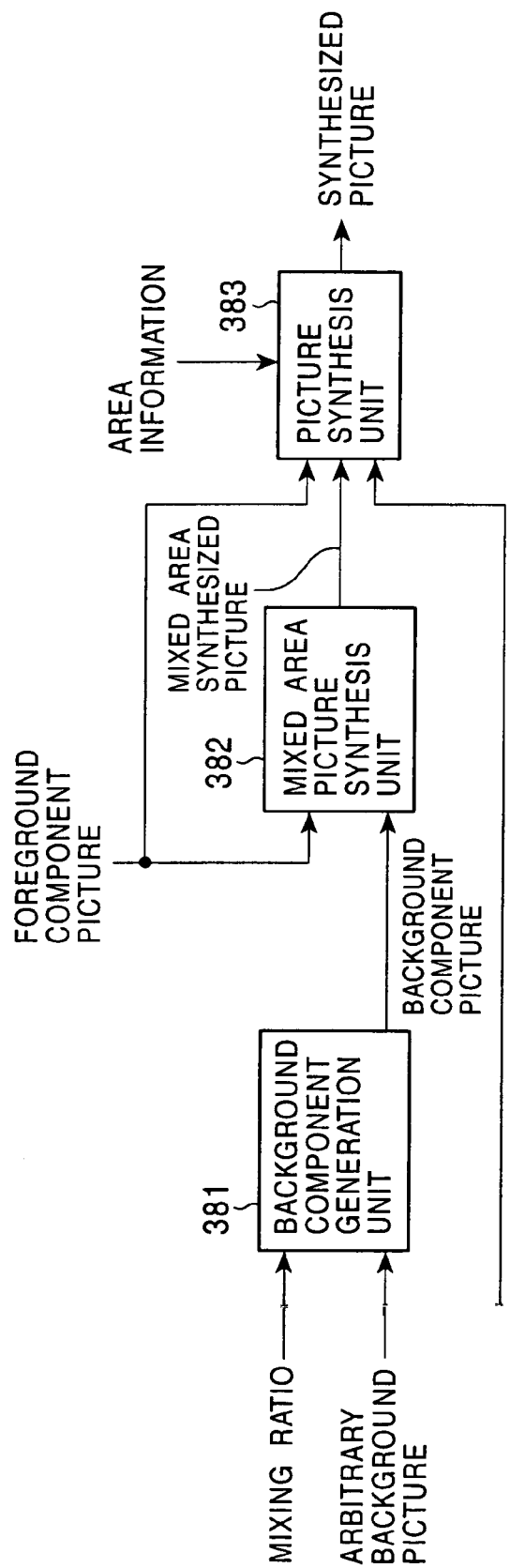
FIG. 68 is a diagram showing a construction of a synthesis unit 371.

FIG. 68 shows a construction of the synthesis unit 371. A background component generation unit 381 generates a background component picture based on the mixing ratio α and an arbitrary background picture, and supplies it to a mixed area picture synthesis unit 382.

The mixed area picture synthesis unit 382 synthesizes the background component picture supplied from the background component generation unit 381 and the foreground component picture to generate a mixed area synthesized picture, and supplies it to a picture synthesis unit 383.

Based on the area information, the picture synthesis unit 383 synthesizes the foreground component picture, the mixed area synthesized picture supplied from the mixed area picture synthesis unit 382, and the arbitrary background picture to generate and output a synthesized picture.

As described above, the synthesis unit 371 is capable of synthesizing the foreground component picture with an arbitrary background picture.

The picture obtained by synthesizing the foreground component picture with an arbitrary background picture based on the mixing ratio α as a characteristic amount is more natural than a picture obtained simply by synthesizing the pixels.

Figure 69:
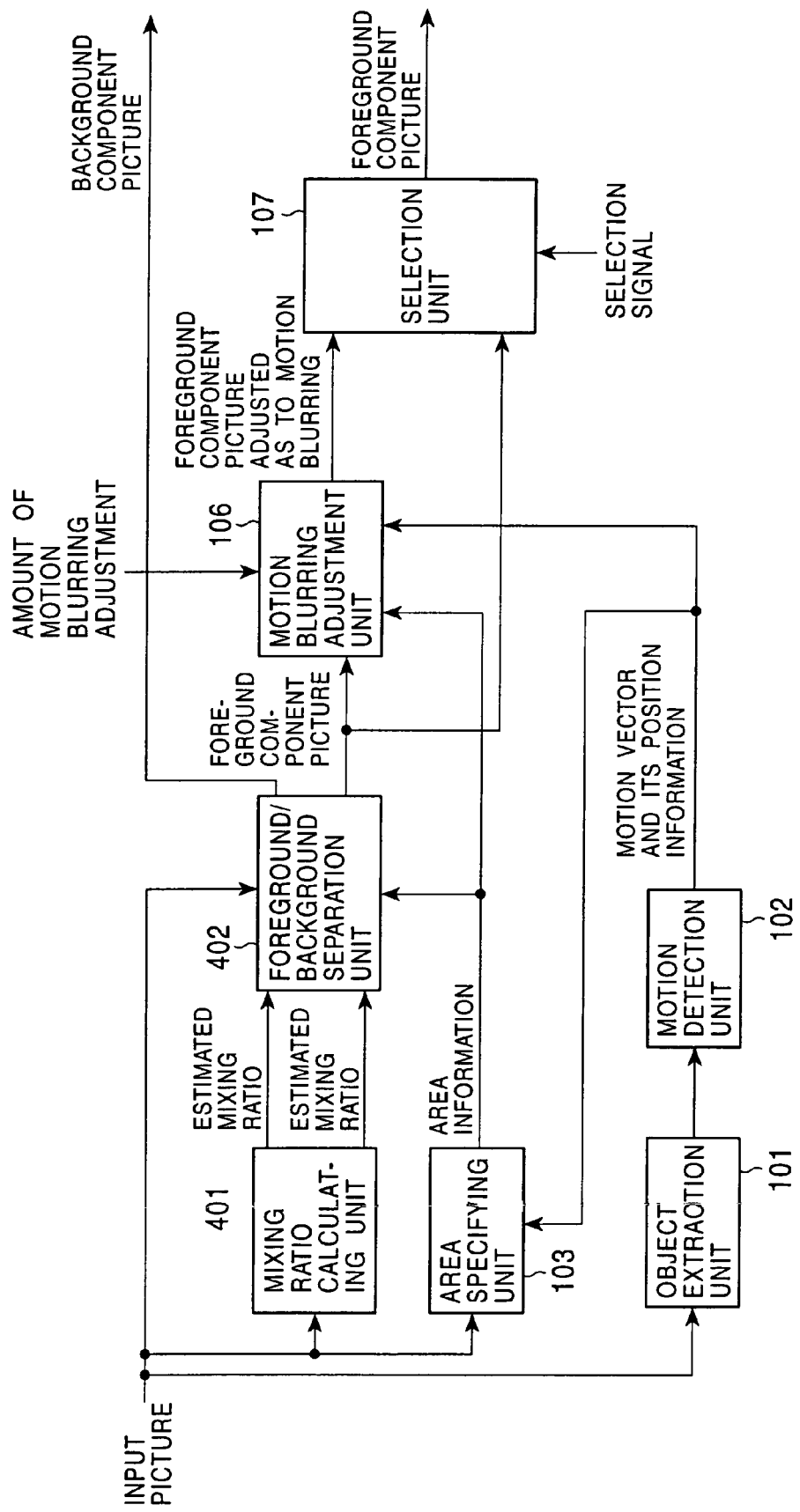
FIG. 69 is a block diagram showing yet another implementation of the functions of the signal processor 12.

FIG. 69 is a block diagram showing yet another implementation of the functions of the signal processor 12, which adjusts the amount of motion blurring. As opposed to the signal processor 12 shown in FIG. 4, which specifies areas and calculates mixing ratios α in a serial manner, the signal processor 12 shown in FIG. 69 specifies areas and calculates mixing ratios α in a parallel manner.

Functions that are the same as those shown in the block diagram in FIG. 4 are designated by the same numerals, and descriptions thereof will be omitted.

The input picture is supplied to a mixing ratio calculating unit 401, a foreground/background separation unit 402, the area specifying unit 103, and to the object extraction unit 101.

Based on the input picture, the mixing ratio calculating unit 401 calculates, for each of the pixels included in the input picture, an estimated mixing ratio with an assumption that the pixel belongs to a covered background area, and an estimated mixing ratio with an assumption that the pixel belongs to an uncovered background area, and supplies the estimated mixing ratio with an assumption that the pixel belongs to a covered background area and the estimated mixing ratio with an assumption that the pixel belongs to an uncovered background area, thus calculated, to the foreground/background separation unit 402.

Figure 70:
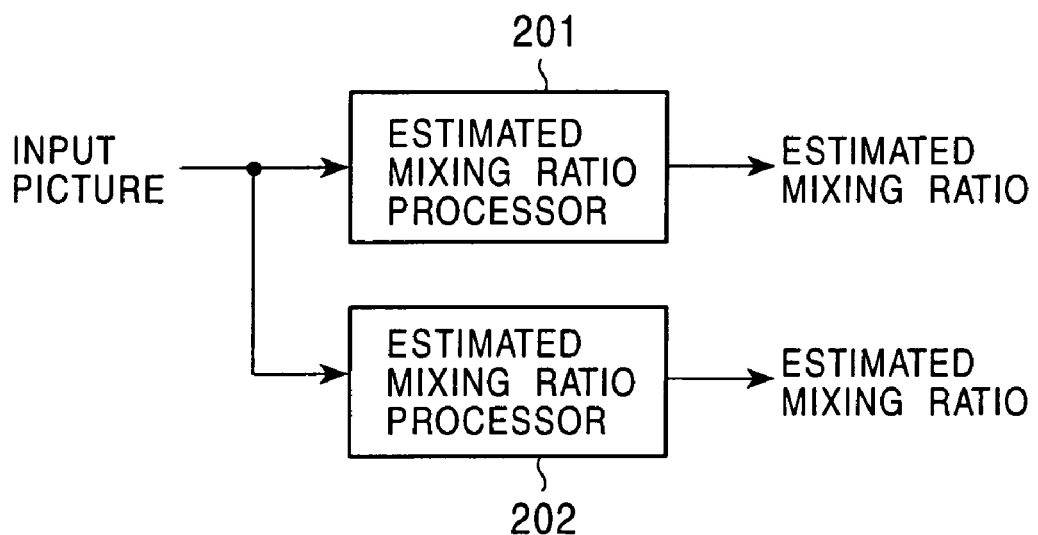
FIG. 70 is a block diagram showing a construction of a mixing ratio calculating unit 401.

FIG. 70 is a block diagram showing an example construction of the mixing ratio calculating unit 401.

An estimated mixing ratio processor 201 shown in FIG. 70 is the same as the estimated mixing ratio processor 201 shown in FIG. 40. An estimated mixing ratio processor 202 shown in FIG. 70 is the same as the estimated mixing ratio processor 202 shown in FIG. 40.

The estimated mixing ratio processor 201 calculates, based on the input picture, an estimated mixing ratio for each of the pixels by a calculations corresponding to the model associated with covered background area, outputting the estimated mixing ratio thus calculated.

The estimated mixing ratio processor 202 calculates, based on the input picture, an estimated mixing ratio for each of the pixels by a calculations corresponding to the model associated with uncovered background area, outputting the estimated mixing ratio thus calculated.

Based on the estimated mixing ratio with an assumption that the pixel belongs to a covered background area, and the estimated mixing ratio with an assumption that the pixel belongs to an uncovered background area, supplied from the mixing ratio calculating unit 401, and on the area information supplied from the area specifying unit 103, the foreground/background separation unit 402 generates a foreground component picture from the input picture, and supplies the generated foreground component picture to the motion blurring adjustment unit 106 and to the selection unit 107.

Figure 71:
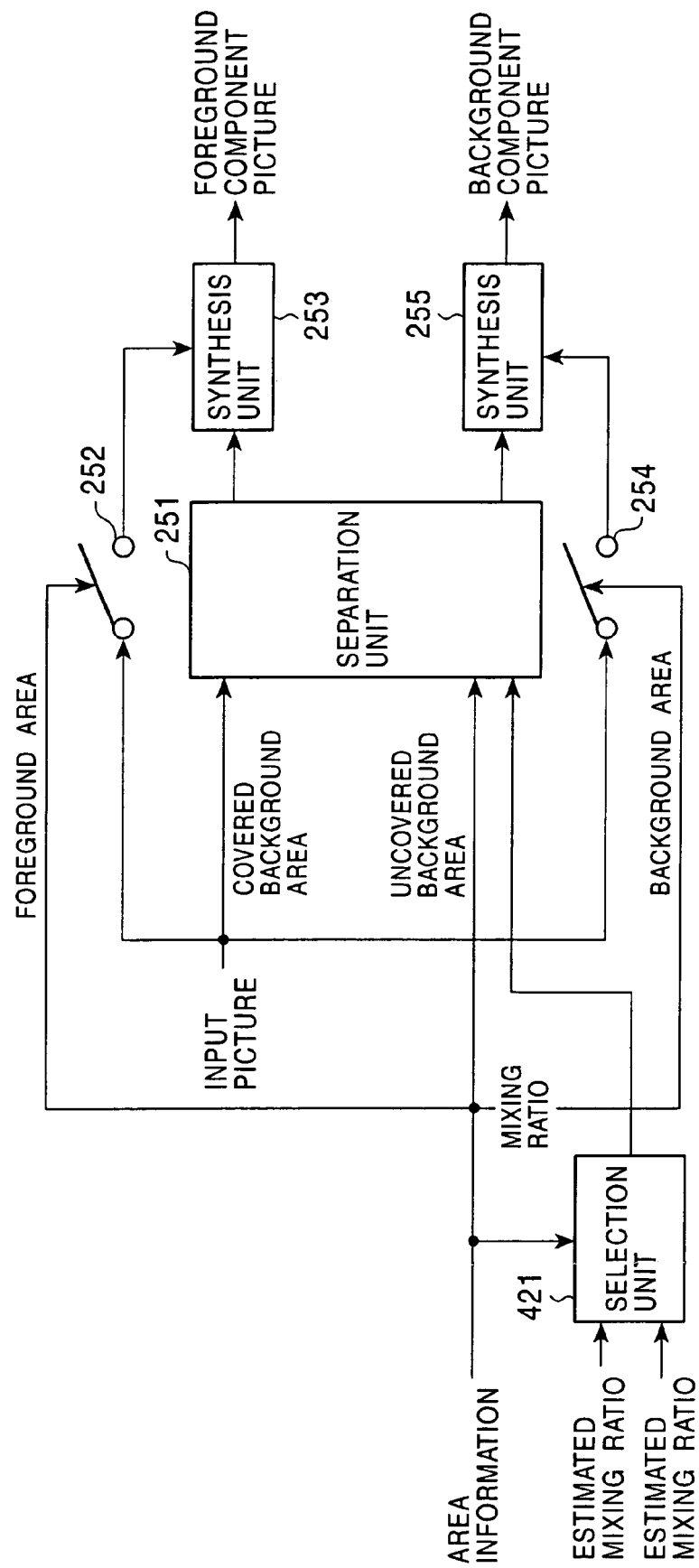
FIG. 71 is a block diagram showing a construction of a foreground/background separation unit 402.

FIG. 71 is a block diagram showing an example construction of the foreground/background separation unit 402.

Parts that are the same as those of the foreground/background separation unit 105 shown in FIG. 51 are designated by the same numerals, and descriptions thereof will be omitted.

Based on the area information supplied from the area specifying unit 103, a selection unit 421 selects either the estimated mixing ratio with an assumption that the pixel belongs to a covered background area, or the estimated mixing ratio with an assumption that the pixel belongs to an uncovered background area, supplied from the mixing ratio calculating unit 401, and supplies the selected estimated mixing ratio to a separation unit 251 as the mixing ratio α.

Based on the mixing ratio α and the area information, supplied from the selection unit 421, the separation unit 251 extracts foreground components and background components from the pixel values of pixels belonging to the mixed area, and supplies the extracted foreground components to the synthesis unit 253 and the background components to the synthesis unit 255.

The separation unit 251 may be constructed as shown in FIG. 56.

The synthesis unit 253 synthesizes and outputs a foreground component picture. The synthesis unit 255 synthesizes and outputs a background component picture.

The motion blurring adjustment unit 106 shown in FIG. 69 may be constructed as shown in FIG. 4. The motion blurring adjustment unit 106, based on the area information and the motion vector, adjusts the amount of motion blurring included in the foreground component picture supplied from the foreground/background separation unit 402, outputting the foreground component picture adjusted as to the amount of motion blurring.

The selection unit 107 shown in FIG. 69, based on a selection signal, for example, in accordance with a selection by the user, selects either the foreground component picture supplied from the foreground/background separation unit 402 or the foreground component picture adjusted as to the amount of motion blurring, supplied from the motion blurring adjustment unit 106, outputting the selected foreground component picture.

As described above, the signal processor 12 having the construction shown in FIG. 69 is capable of adjusting the amount of motion blurring included picture corresponding to a foreground object included in the input picture, and outputting the result. The signal processor 12 having the construction shown in FIG. 69 is capable of calculating the mixing ratio α that is buried, and outputting the mixing ratio α thus calculated, similarly to the first embodiment.

Figure 72:
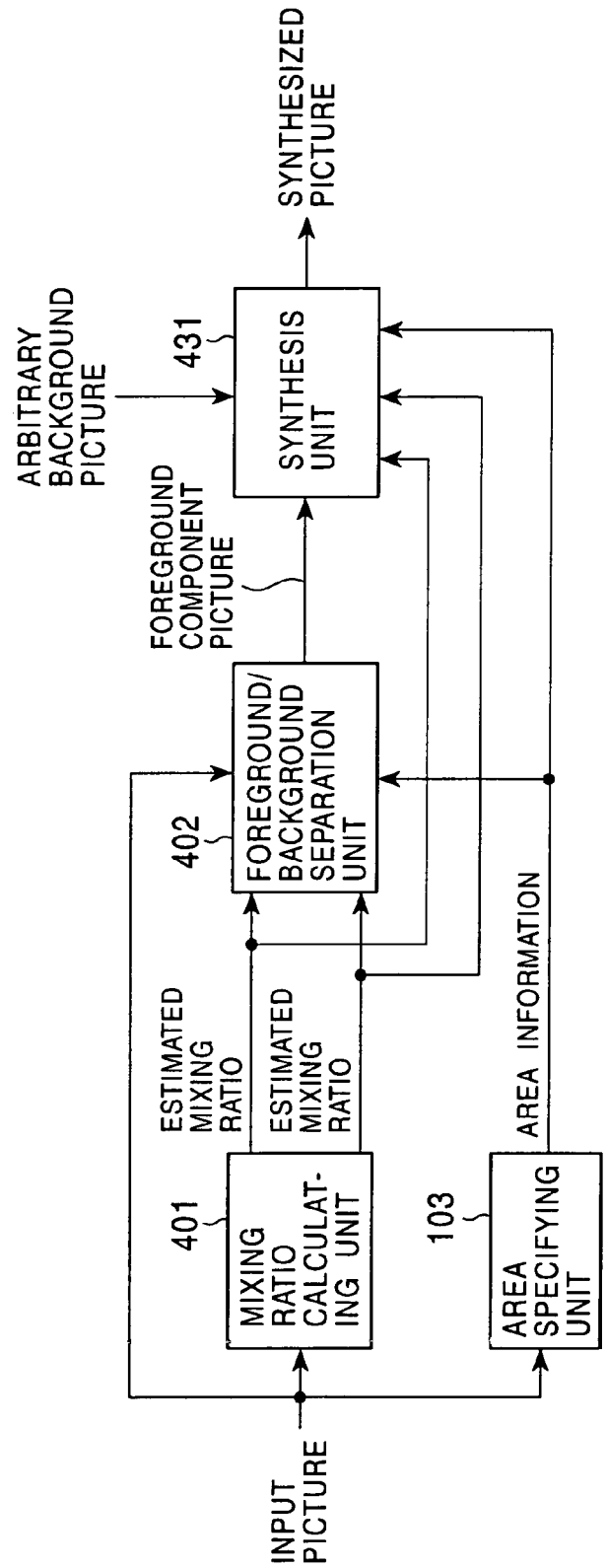
FIG. 72 is a block diagram showing still another implementation of the functions of the signal processor 12.

FIG. 72 is a block diagram showing another implementation of the functions of the signal processor 12, which synthesizes the foreground component picture with an arbitrary background picture. As opposed to the signal processor 12 shown in FIG. 67, which specifies areas and calculates mixing ratios α in a serial manner, the signal processor 12 shown in FIG. 72 specifies areas and calculates mixing ratios α in a parallel manner.

Functions that are the same as those shown in the block diagram in FIG. 69 are designated by the same numerals, and descriptions thereof will be omitted.

Based on the input picture, the mixing ratio calculating unit 401 shown in FIG. 72 calculates, for each of the pixels included in the input picture, an estimated mixing ratio with an assumption that the pixel belongs to a covered background area and an estimated mixing ratio with an assumption that the pixel belongs to an uncovered background area, and supplies the estimated mixing ratio with an assumption that the pixel belongs to a covered background area and the estimated mixing ratio with an assumption that the pixel belongs to an uncovered background area, thus calculated, to the foreground/background separation unit 402 and to a synthesis unit 431.

Based on the estimated mixing ratio with an assumption that the pixel belongs to a covered background area and the estimated mixing ratio with an assumption that the pixel belongs to an uncovered background area, supplied from the mixing ratio calculating unit 401, and on the area information supplied from the area specifying unit 103, the foreground/background separation unit 402 shown in FIG. 72 generates a foreground component picture from the input picture, and supplies the generated foreground component picture to the synthesis unit 431.

Based on the estimated mixing ratio with an assumption that the pixel belongs to a covered background area and the estimated mixing ratio with an assumption that the pixel belongs to an uncovered background area, supplied from the mixing ratio calculating unit 401, and on the area information supplied from the area specifying unit 103, the synthesis unit 431 synthesizes an arbitrary background picture and the foreground component picture supplied from the foreground/background separation unit 402, outputting a synthesized picture in which the arbitrary background picture and the foreground component picture are synthesized.

Figure 73:
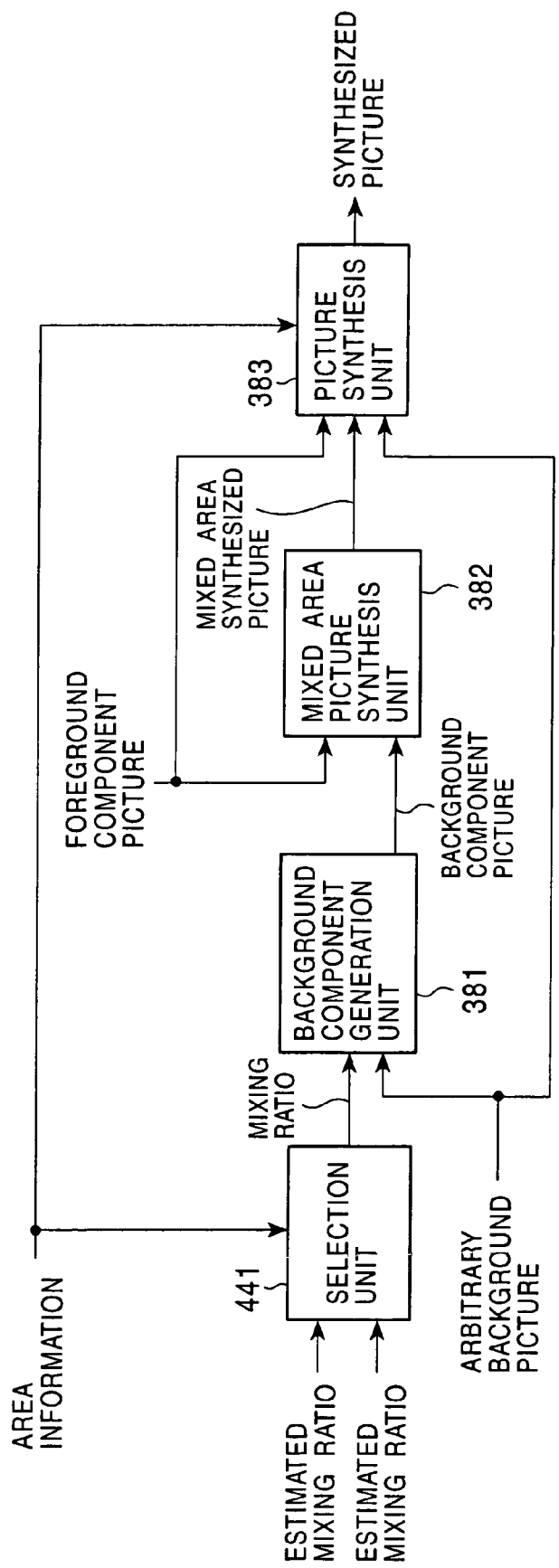
FIG. 73 is a diagram showing a construction of a synthesis unit 431.

FIG. 73 shows a construction of the synthesis unit 431. Functions that are the same as those shown in the block diagram in FIG. 68 are designated by the same numerals, and descriptions thereof will be omitted.

Based on the area information supplied from the area specifying unit 103, a selection unit 441 selects either the estimated mixing ratio with an assumption that the pixel belongs to a covered background area or the estimated mixing ratio with an assumption that the pixel belongs to an uncovered background area, supplied from the mixing ratio calculating unit 401, outputting the selected estimated mixing ratio to a background component generation unit 381 as the mixing ratio α.

Based on the mixing ratio α supplied from the selection unit 441 and an arbitrary background picture, the background component generation unit 381 shown in FIG. 73 generates a background component picture, and supplies it to the mixed area picture synthesis unit 382.

The mixed area picture synthesis unit 382 shown in FIG. 73 synthesizes the background component picture supplied from the background component generation unit 381 with the foreground component picture to generate a mixed area synthesized picture, and supplies the generated mixed area synthesized picture to the picture synthesis unit 383.

Based on the area information, the picture synthesis unit 383 synthesizes the foreground component picture, the mixed area synthesized picture supplied from the mixed area picture synthesis unit 382, and an arbitrary background picture, generating and outputting a synthesized picture.

As described above, the synthesis unit 431 is able to synthesize the foreground component picture with an arbitrary background picture.

Although the mixing ratio α has been described as representing a proportion of the background component included in a pixel value, it may represent a proportion of the foreground component included in a pixel value.

Although the direction of movement of an object constituting a foreground has been described as from left to right, obviously, the direction is not limited thereto.

The description has dealt with an example in which a picture of the real space having a three-dimensional space and time axis information is projected onto a time space having a two-dimensional space and time axis information using a video camera. However, the present invention is not limited to the example, and may be applied to correction of distortion caused by projection, extraction of significant information, or to a more natural synthesis of pictures, in a case where first information of a first, larger dimensions is projected onto second information of a second, smaller dimensions.

The sensor 11 is not limited to a CCD, and may also be a sensor implemented by a solid-state imaging device such as a BBD (Bucket Brigade Device), a CID (Charge Injection Device), and a CPD (Charge Priming Device). The sensor 11 is neither limited to a sensor having a matrix of detection elements, and may also be a sensor having a line of detection elements.

As shown in FIG. 3, a recording medium having recorded thereon a program for executing the signal processing according to the present invention may be a package medium distributed to users for providing the program separately from a computer, including a magnetic disk 51 (including a floppy disk), an optical disk 52 (including a CD-ROM (Compact Disk-Read Only Memory) and a DVD (Digital Versatile Disk)), a magneto-optical disk 53 (including an MD (Minidisk)), and a semiconductor memory 54. The recording medium may also be a ROM 22 or a hard disk included in the storage unit 28, provided to users by being preinstalled on a computer having the program recorded thereon.

In this specification, the step of writing a program to be recorded on a recording medium includes not only processes executed sequentially in the described order, but also processes executed in parallel or individually without limitation to sequential processing.

INDUSTRIAL APPLICABILITY

According to a first invention, a mixed area in which a plurality of objects is mixed can be detected.

According to a second invention, a mixed area in which a plurality of objects is mixed can be detected.

According to a third invention, a mixed area in which a plurality of objects is mixed can be detected.

The invention claimed is:

1. A picture processing apparatus for processing picture data made up of a predetermined number of pixel data acquired by an imaging device having the predetermined number of pixels each having a temporal integration effect, said picture processing apparatus comprising:
    a background picture generation unit configured to generate a background picture based on the picture data;
    a correlation value detection unit configured to detect a correlation value between each pixel in picture data of each frame and a pixel in the background picture at a position corresponding to the pixel in the picture data of the frame;
    a motion compensation unit configured to motion compensate, based on a motion vector of a frame in the vicinity of a frame under consideration, the correlation value, in picture data of the frame, backward frame of the frame, and a forward frame of the frame, detected by the correlation value detection means of the frame in the vicinity of the frame under consideration;
    an accumulation unit configured to accumulate the correlation value of the frame under consideration and the correlation value of the frame in the vicinity of the frame under consideration, having been motion-compensated by said motion compensation unit;
    a binarization unit configured to binarize the correlation value by comparing the correlation value with a threshold value;
    a mixed area detection unit configured to detect a mixed area in the frame under consideration, in which a plurality of real-world objects is mixed, based on a temporal change of the binarized correlation value of an output of said accumulation unit at each pixel position; and
    a weighting unit configured to weight the binarized correlation value;
    wherein said motion compensation unit motion-compensates the binarized correlation value in the frame in the vicinity of the frame under consideration, and
    wherein said accumulation unit accumulates the correlation value of the frame in the vicinity of the frame under consideration, having been motion-compensated and weighted.

2. A picture processing apparatus according to claim 1, further comprising a motion vector detection unit configured to detect the motion vector.

3. A picture processing apparatus according to claim 1, wherein said correlation value detection unit detects the correlation value based on pixels surrounding a pixel under consideration in the picture data of the frame under consideration and pixels in the background picture at positions corresponding to the surrounding pixels.

4. A picture processing apparatus according to claim 1, wherein said correlation value detection unit detects, as the correlation value, a differential value between pixels surrounding a pixel under consideration in the picture data of the frame under consideration and pixels in the background picture at positions corresponding to the surrounding pixels.

5. A picture processing apparatus according to claim 1, wherein said mixed area detection unit is further configured to detect a covered background area or an uncovered background area based on a temporal change of the correlation value at each pixel position.

6. A picture processing apparatus according to claim 1, further comprising a mixing ratio detection unit configured to detect a mixing ratio by which the plurality of objects is mixed in the detected mixed area.

7. A picture processing apparatus according to claim 6, further comprising a separation unit configured to separate the objects based on the mixed area and the mixing ratio.

8. A picture processing apparatus according to claim 7, further comprising an adjustment unit configured to adjust the amount of motion blurring included in the separated objects.

9. A picture processing method for processing picture data made up of a predetermined number of pixel data acquired by an imaging device having the predetermined number of pixels each having a temporal integration effect, said picture processing method comprising:
    generating a background picture based on the picture data;
    detecting a correlation value between each pixel in picture data of each frame and a pixel in the background picture at a position corresponding to the pixel in the picture data of the frame;
    motion-compensating, based on a motion vector of a frame in the vicinity of a frame under consideration, the correlation value, in picture data of the frame, backward frame of the frame, and a forward frame of the frame, detected by the correlation value detection step of the frame in the vicinity of the frame under consideration;
    accumulating the correlation value of the frame under consideration and the correlation value of the frame in the vicinity of the frame under consideration, having been motion-compensated in said motion compensation step;
    binarizing the correlation value by comparing the correlation value with a threshold value;
    detecting a mixed area in the frame under consideration, in which a plurality of real-world objects is mixed, based on a temporal change of the binarized correlation values of an output in said accumulation step at each pixel position; and
    weighting the binarized correlation value;
    wherein said motion compensating step motion-compensates the binarized correlation value in the frame in the vicinity of the frame under consideration, and
    wherein the accumulating step accumulates the correlation value of the frame in the vicinity of the frame under consideration, having been motion-compensated and weighted.

10. A computer readable recording medium having recorded thereon a computer-readable picture processing program for processing picture data made up of a predetermined number of pixel data acquired by an imaging device having the predetermined number of pixels each having a temporal integration effect, said picture processing program comprising the steps of:
    generating a background picture based on the picture data;
    detecting a correlation value between each pixel in picture data of each frame and a pixel in the background picture at a position corresponding to the pixel in the picture data of the frame;
    motion-compensating, based on a motion vector of a frame in the vicinity of a frame under consideration, the correlation value, in picture data of the frame, backward frame of the frame, and a forward frame of the frame, detected by the correlation value detection step of the frame in the vicinity of the frame under consideration;

accumulating the correlation value of the frame under consideration and the correlation value of the frame in the vicinity of the frame under consideration, having been motion-compensated in said motion compensation step;
binarizing the correlation value by comparing the correlation value with a threshold value;
detecting a mixed area in the frame under consideration, in which a plurality of real-world objects is mixed, based on a temporal change of the binerized correlation values of an output in said accumulation step at each pixel position; and
weighting the binarized correlation value;
wherein said motion compensation step motion-compensates the binarized correlation value in the frame in the vicinity of the frame under consideration, and
wherein the accumulating step accumulates the correlation value of the frame in the vicinity of the frame under consideration, having been motion-compensated and weighted.

11. A picture processing apparatus for processing picture data made up of a predetermined number of pixel data acquired by an imaging device, said picture processing apparatus comprising:
an imaging unit for outputting, as picture data made up of a predetermined number of pixel data, a picture of a target captured by an imaging device having the predetermined number of pixels each having a temporal integration effect;
a background picture generation unit configured to generate a background picture based on the picture data;
a correlation value detection unit configured to detect a correlation value between each pixel in picture data of each frame and a pixel in the background picture at a position corresponding to the pixel in the picture data of the frame;
a motion compensation unit configured for motion-compensating, based on a motion vector of a frame in the vicinity of a frame under consideration, the correlation value, in picture data of the frame, backward frame of the frame, and a forward frame of the frame, in the vicinity of the frame under consideration;
an accumulation unit configured to accumulate the correlation value of the frame under consideration and the correlation value of the frame in the vicinity of the frame under consideration, having been motion-compensated by said motion compensation unit;
a binarization unit configured to binarize the correlation value by comparing the correlation value with a threshold value; and
a mixed area detection unit configured to detect a mixed area in the frame under consideration, in which a plurality of real-world objects is mixed, based on a temporal change of the binarized correlation values of an output of said accumulation unit at each pixel position; and
a weighting unit configured to weight the binarized correlation value;
wherein said motion compensation unit motion-compensates the binarized correlation value in the frame in the vicinity of the frame under consideration, and
wherein said accumulation unit accumulates the correlation value of the frame in the vicinity of the frame under consideration, having been motion-compensated and weighted.

* * * * *

UNITED STATES PATENT AND TRADEMARK OFFICE
CERTIFICATE OF CORRECTION

| | | |
|---|---|---|
| PATENT NO. | : 7,412,075 B2 | Page 1 of 1 |
| APPLICATION NO. | : 10/240377 | |
| DATED | : August 12, 2008 | |
| INVENTOR(S) | : Kondo et al. | |

It is certified that error appears in the above-identified patent and that said Letters Patent is hereby corrected as shown below:

Title page, under item [30]

Foreign Application Priority Data,

Change "Feb. 1, 2001    (JP)    2001-258847" to

--Feb. 1, 2001    (JP)   2001-25847--.

Signed and Sealed this

Fourteenth Day of October, 2008

JON W. DUDAS
*Director of the United States Patent and Trademark Office*